Dec. 10, 1940.  A. W. MILLS  2,224,771
RECORD CONTROLLED PRINTING MACHINE
Filed Sept. 11, 1937  21 Sheets-Sheet 2

INVENTOR
ALBERT W. MILLS
BY
F. W. Lownitzer
ATTORNEY

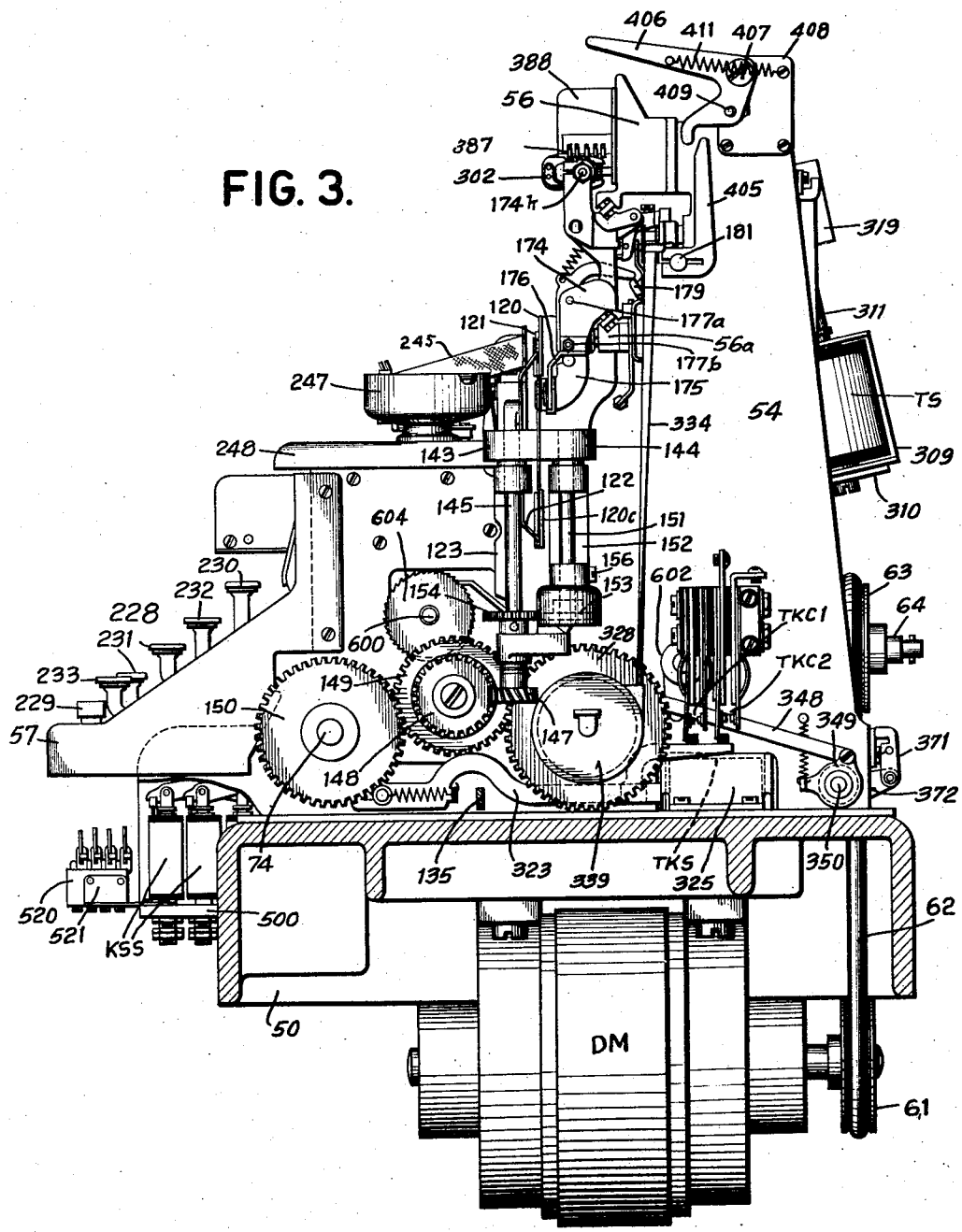

Dec. 10, 1940.   A. W. MILLS   2,224,771
RECORD CONTROLLED PRINTING MACHINE
Filed Sept. 11, 1937   21 Sheets-Sheet 4

INVENTOR
ALBERT W. MILLS
BY
J. W. Lomnitzer
ATTORNEY

Dec. 10, 1940.  A. W. MILLS  2,224,771
RECORD CONTROLLED PRINTING MACHINE
Filed Sept. 11, 1937  21 Sheets-Sheet 5

INVENTOR
ALBERT W. MILLS
BY
J. W. Lomnitzer
ATTORNEY

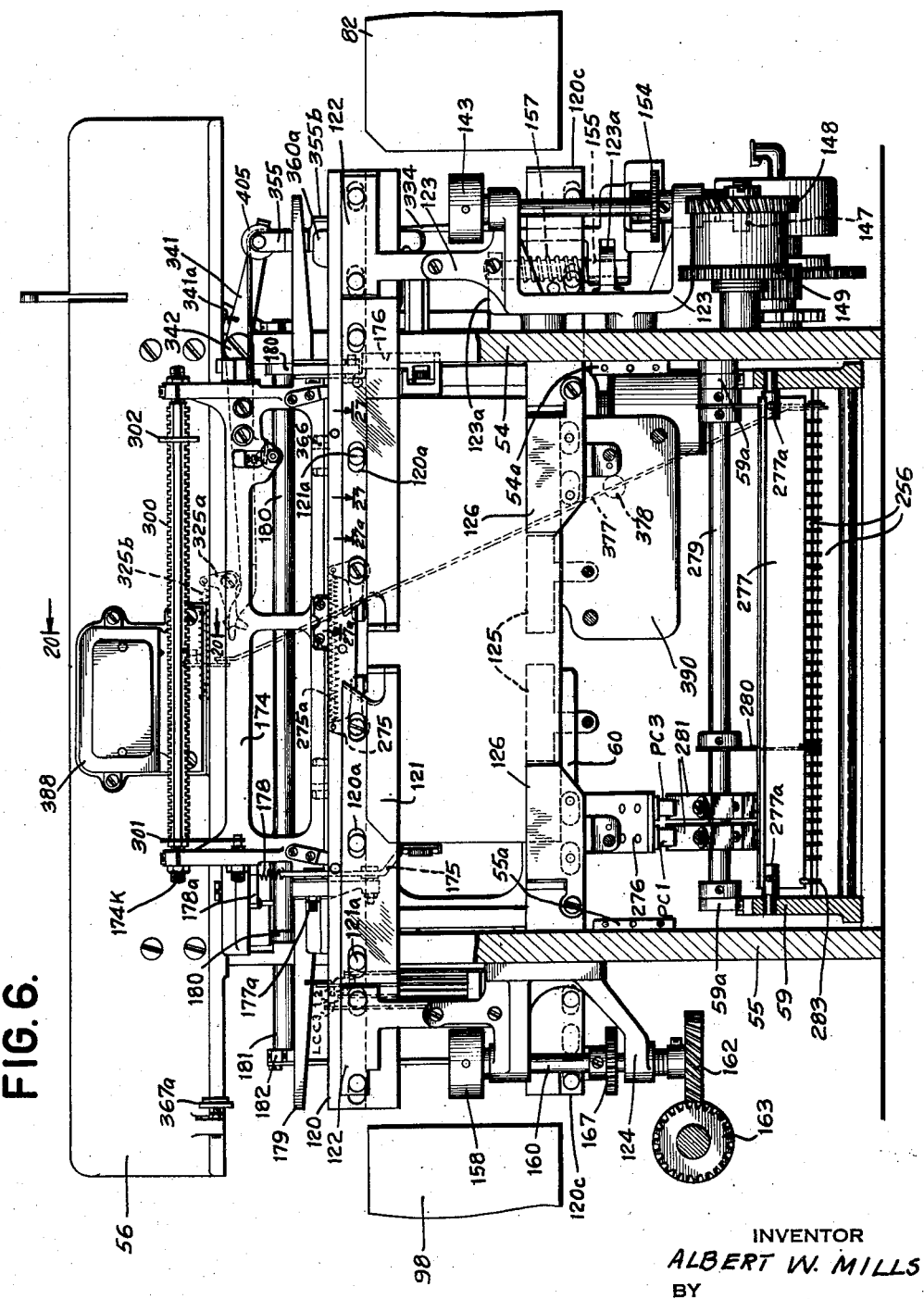

Dec. 10, 1940.     A. W. MILLS     2,224,771
RECORD CONTROLLED PRINTING MACHINE
Filed Sept. 11, 1937     21 Sheets-Sheet 7

INVENTOR
ALBERT W. MILLS
BY
J. W. Lownitzer
ATTORNEY

Dec. 10, 1940. A. W. MILLS 2,224,771
RECORD CONTROLLED PRINTING MACHINE
Filed Sept. 11, 1937 21 Sheets-Sheet 8

INVENTOR
ALBERT W. MILLS
BY
J. W. Lownitzer
ATTORNEY

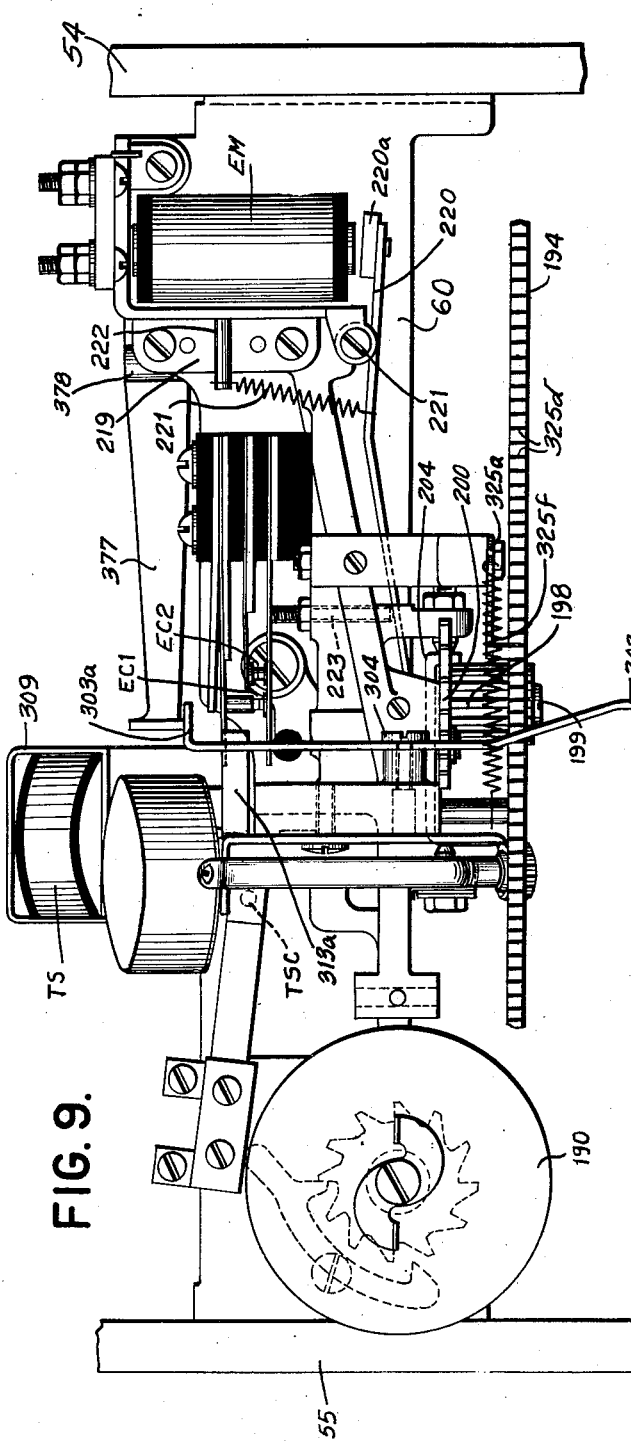
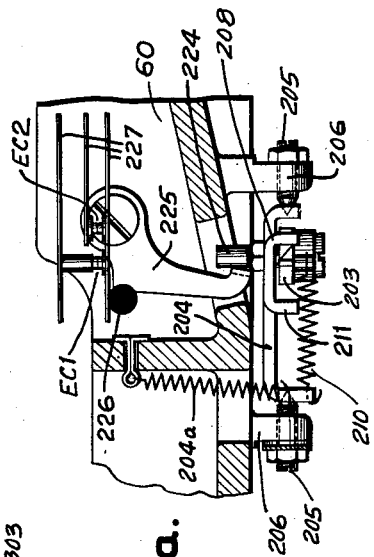
FIG. 9.
FIG. 9a.

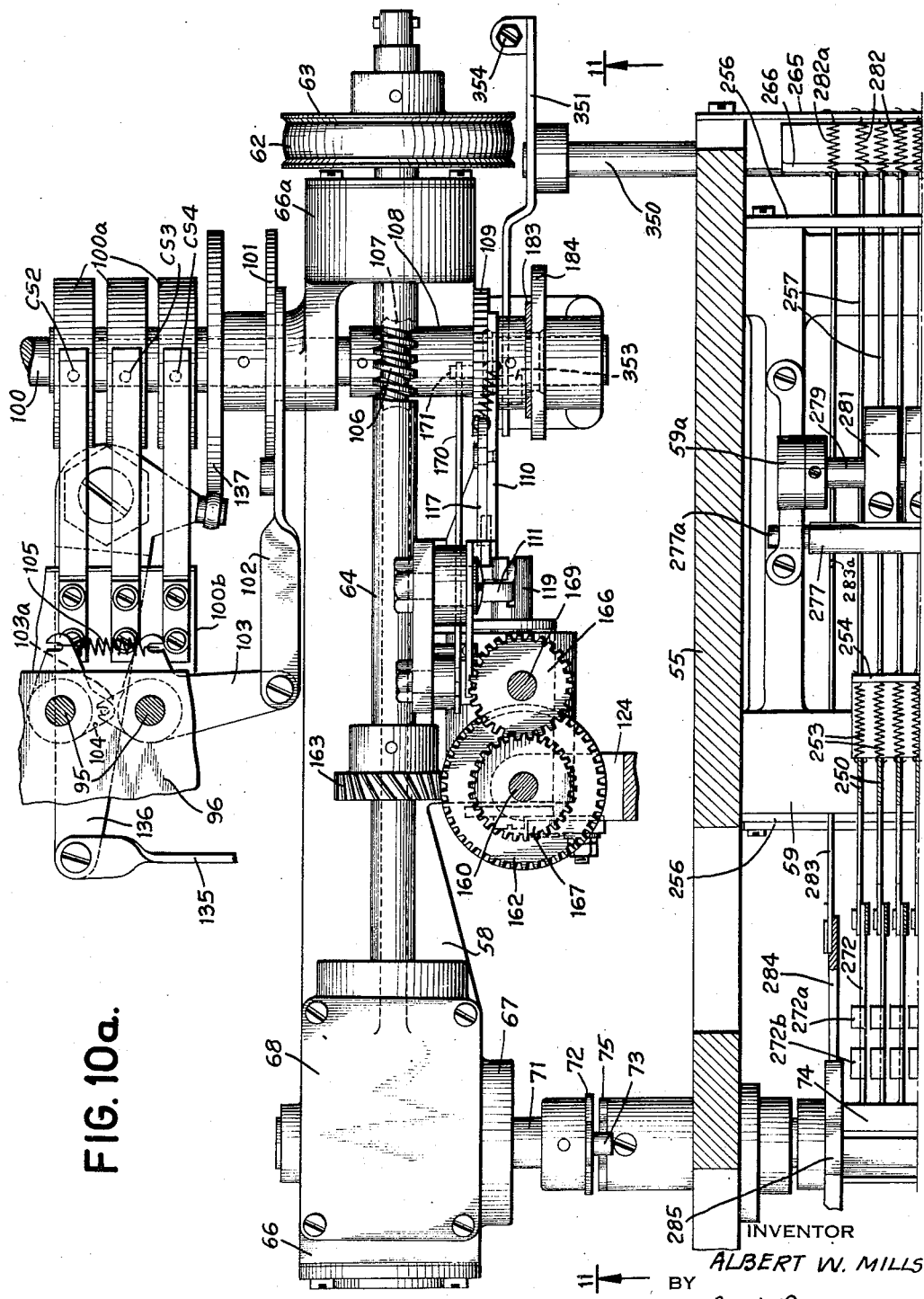

Dec. 10, 1940.  A. W. MILLS  2,224,771
RECORD CONTROLLED PRINTING MACHINE
Filed Sept. 11, 1937  21 Sheets-Sheet 11
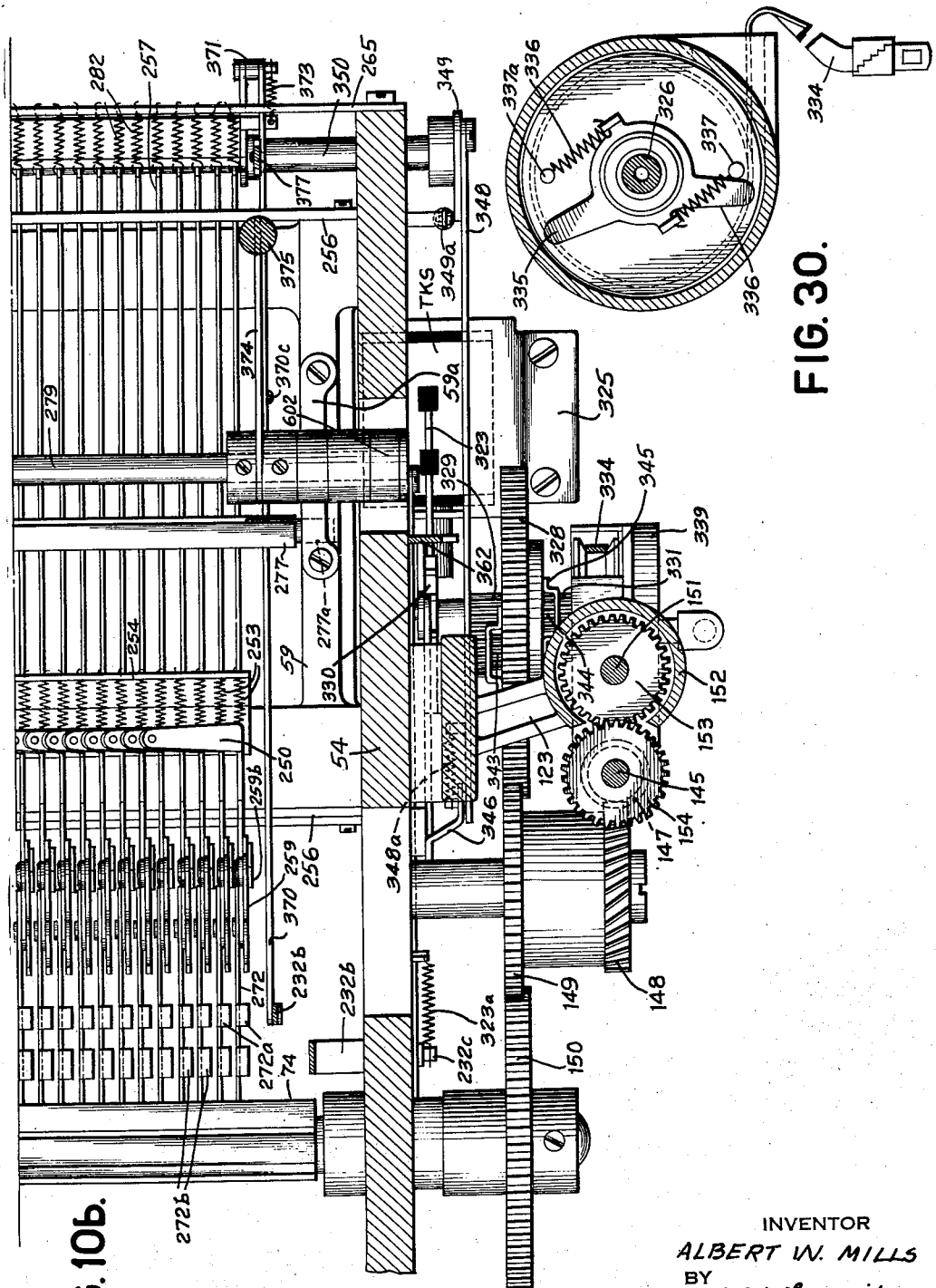

Dec. 10, 1940.  A. W. MILLS  2,224,771
RECORD CONTROLLED PRINTING MACHINE
Filed Sept. 11, 1937  21 Sheets-Sheet 12
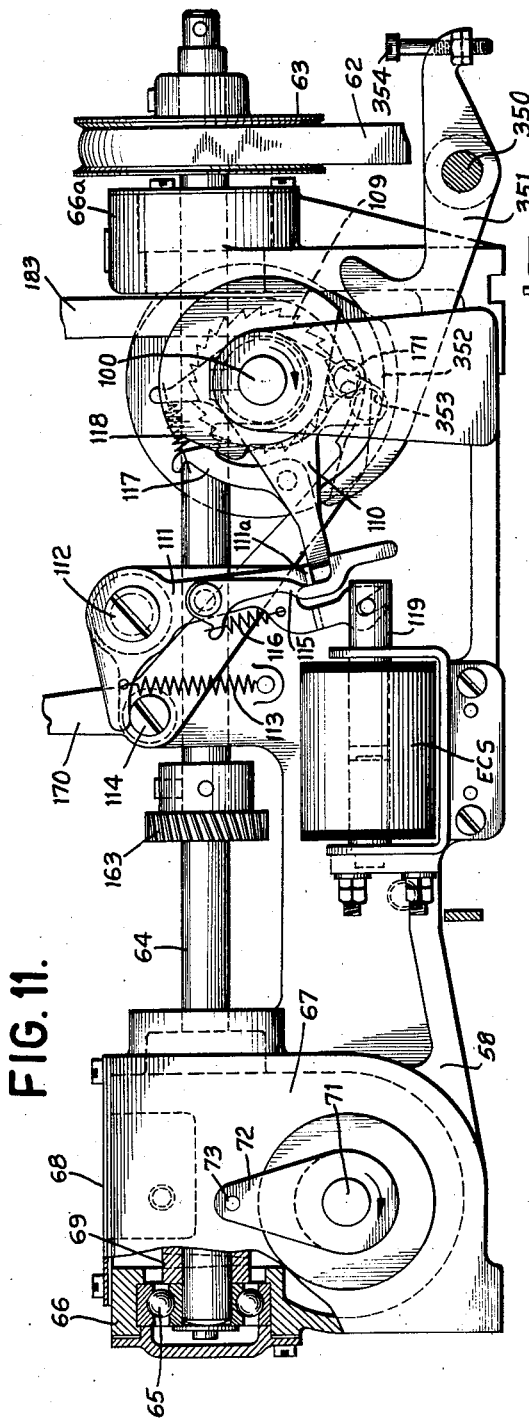
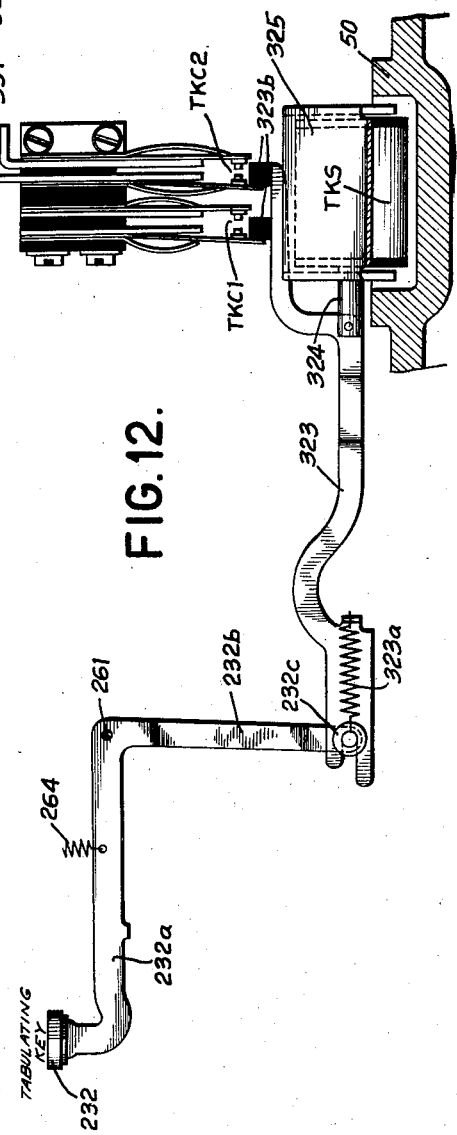
INVENTOR
ALBERT W. MILLS
BY
*J. W. Lomnitzer*
ATTORNEY

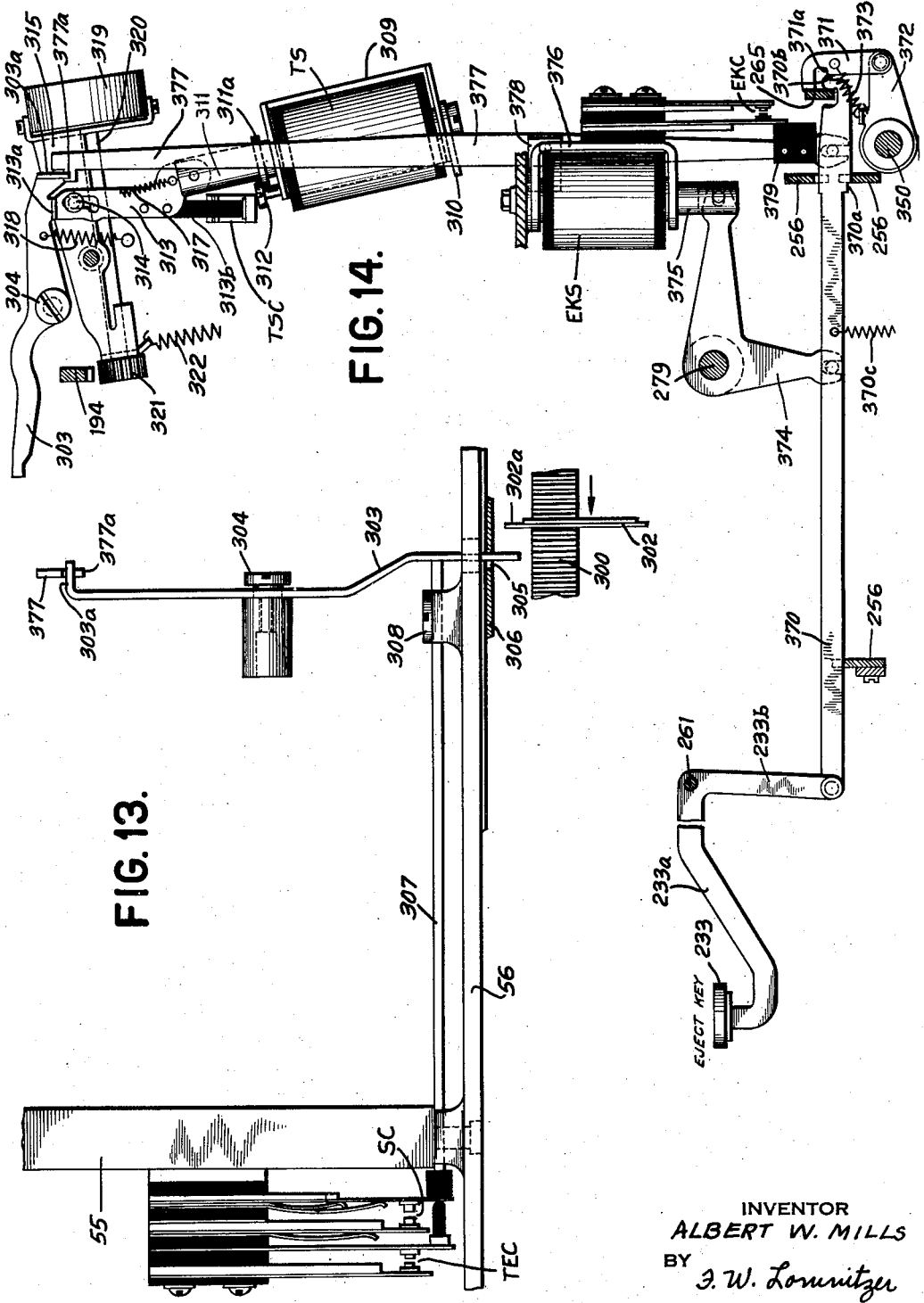

Dec. 10, 1940.   A. W. MILLS   2,224,771
RECORD CONTROLLED PRINTING MACHINE
Filed Sept. 11, 1937   21 Sheets-Sheet 14
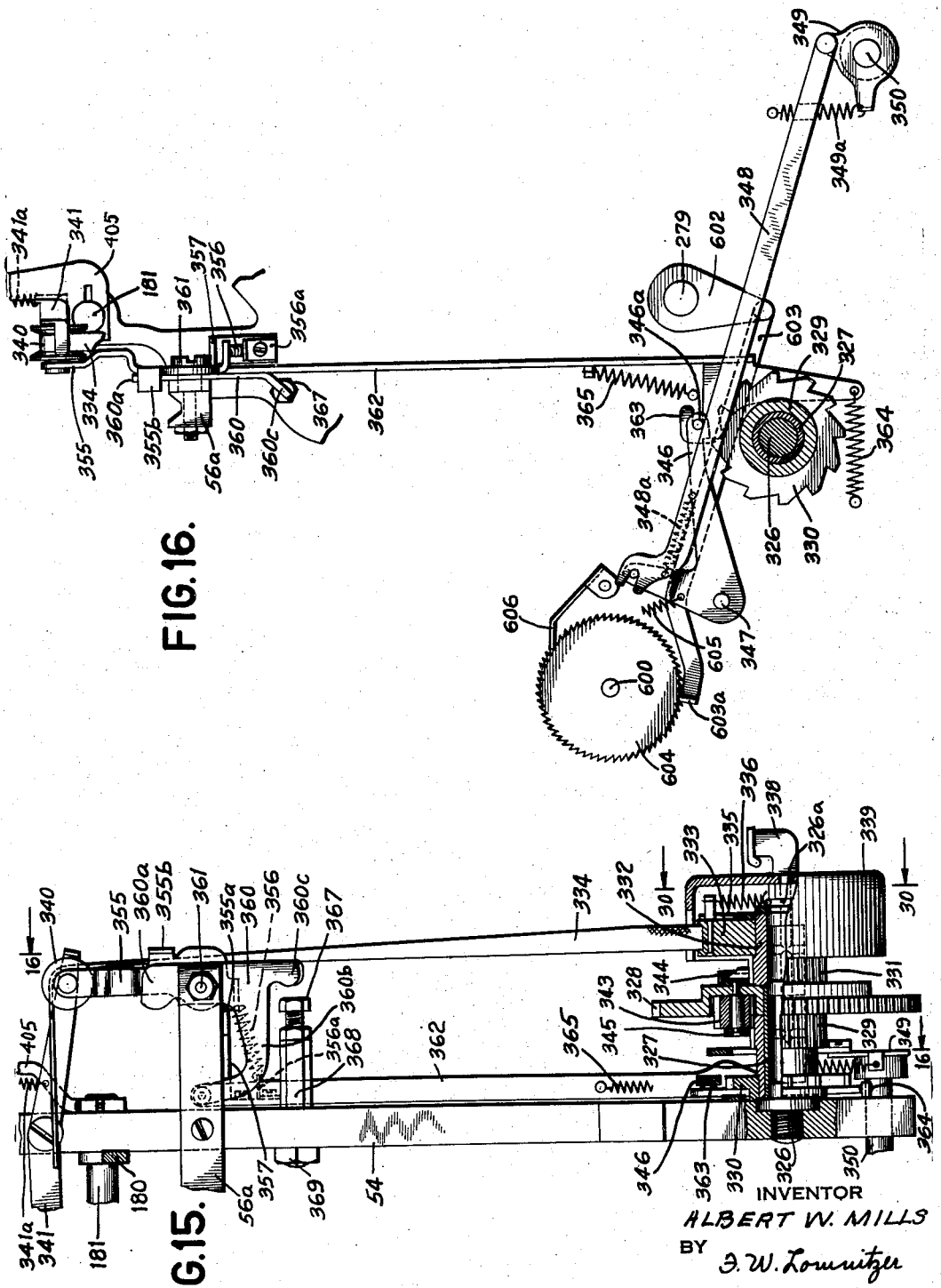
INVENTOR
ALBERT W. MILLS
BY
J. W. Lounitzer
ATTORNEY Dec. 10, 1940.  A. W. MILLS  2,224,771
RECORD CONTROLLED PRINTING MACHINE
Filed Sept. 11, 1937   21 Sheets-Sheet 15
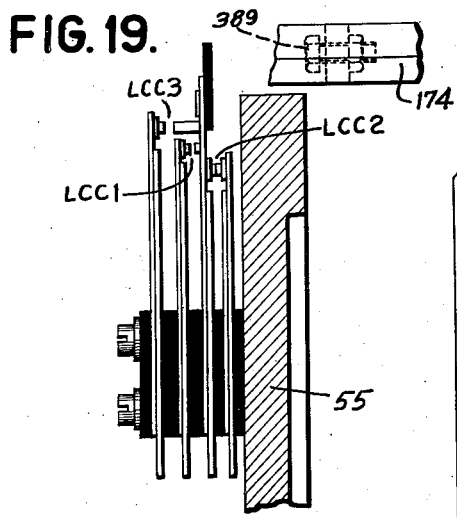
FIG. 19.
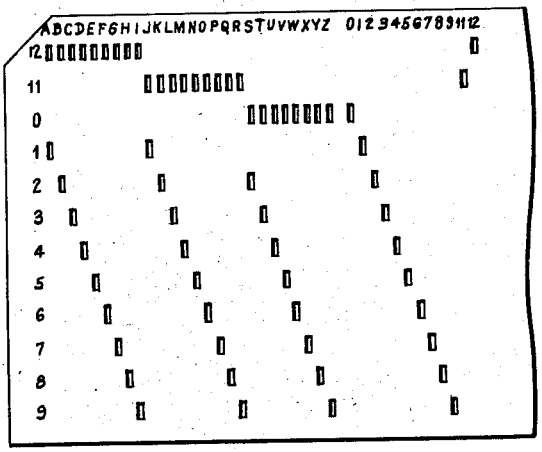
FIG. 22.
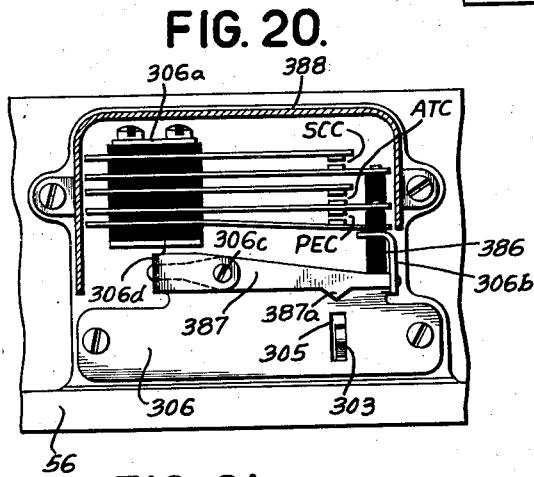
FIG. 20.
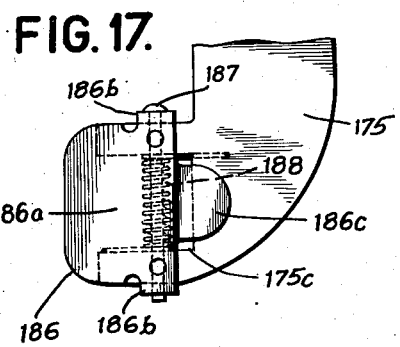
FIG. 17.
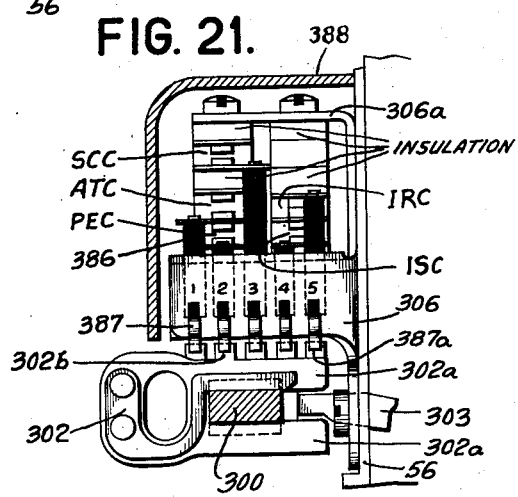
FIG. 21.
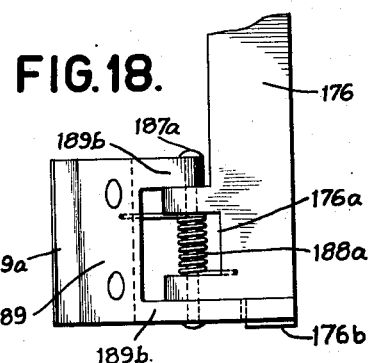
FIG. 18.
INVENTOR
ALBERT W. MILLS
BY
F. W. Lomnitzer
ATTORNEY Dec. 10, 1940. A. W. MILLS 2,224,771
RECORD CONTROLLED PRINTING MACHINE
Filed Sept. 11, 1937 21 Sheets-Sheet 16

INVENTOR
ALBERT W. MILLS
BY
*J. W. Lomnitzer*
ATTORNEY

Dec. 10, 1940.  A. W. MILLS  2,224,771
RECORD CONTROLLED PRINTING MACHINE
Filed Sept. 11, 1937   21 Sheets-Sheet 18

INVENTOR
ALBERT W. MILLS
BY
J. W. Lowritzer
ATTORNEY

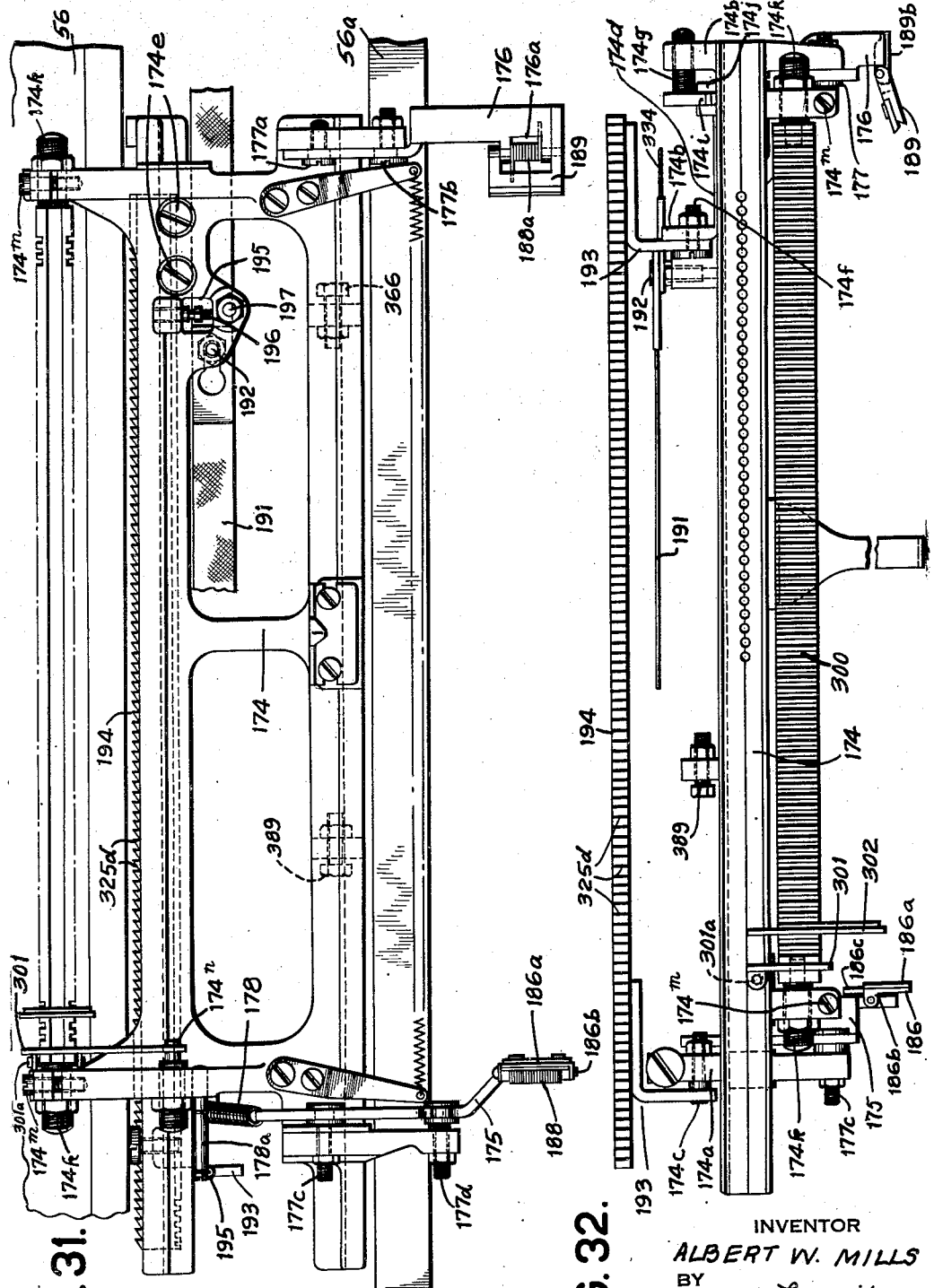

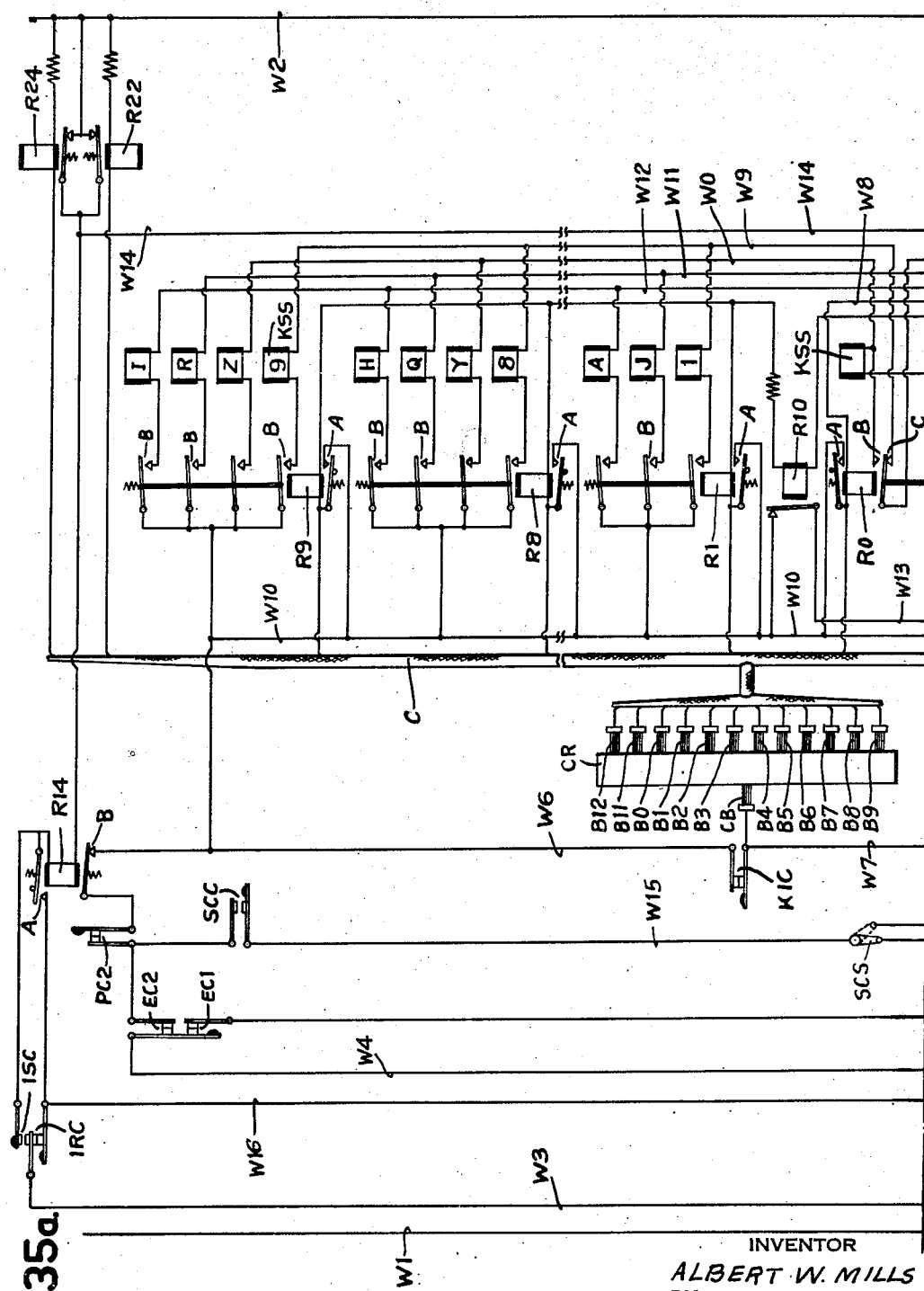

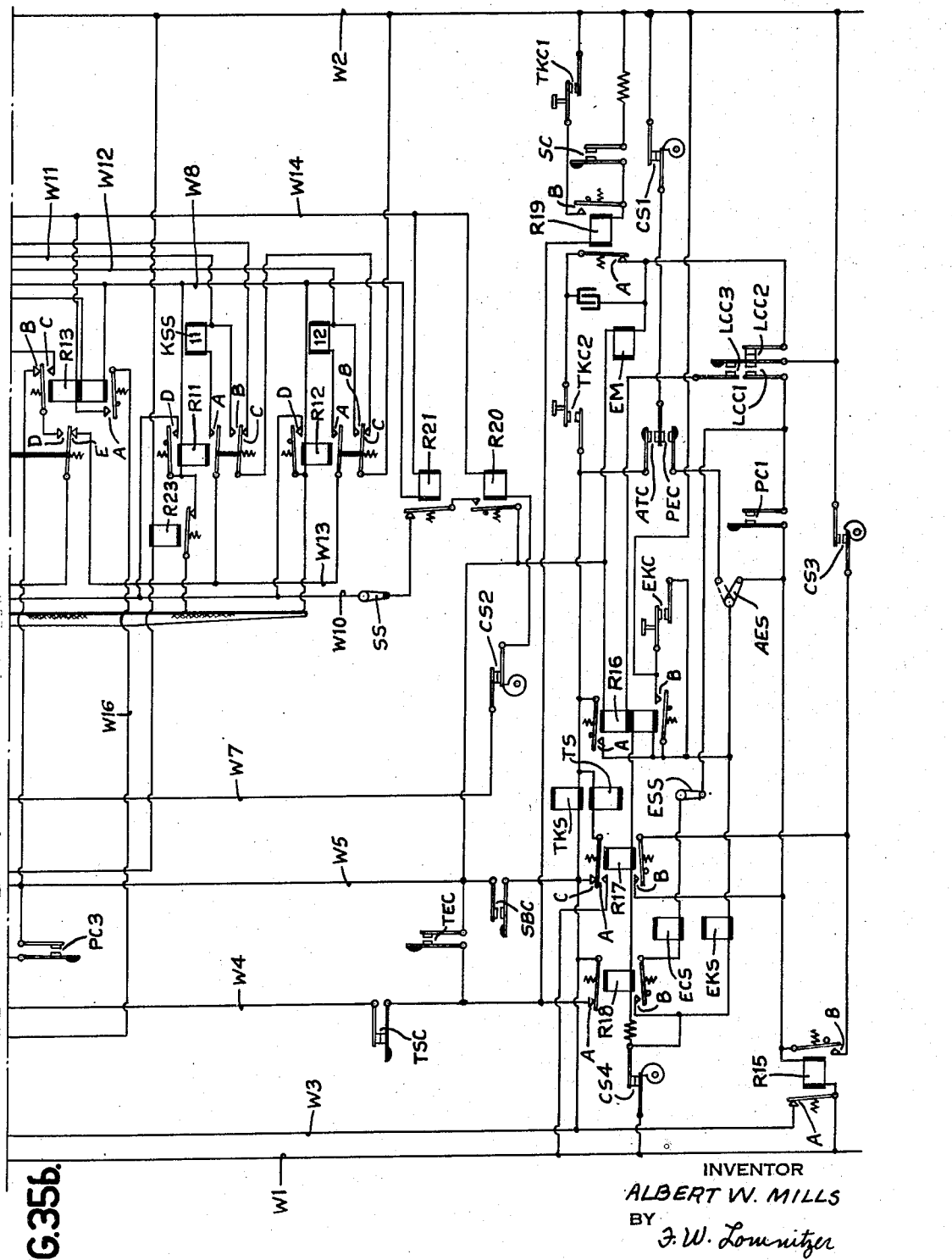

Patented Dec. 10, 1940

2,224,771

UNITED STATES PATENT OFFICE 2,224,771

RECORD CONTROLLED PRINTING MACHINE

Albert W. Mills, Endicott, N. Y., assignor to International Business Machines Corporation, New York, N. Y., a corporation of New York Application September 11, 1937, Serial No. 163,385

13 Claims. (Cl. 197—20)

This invention relates to record controlled machines, more particularly to that class of machines known as interpreters.

The broad object of the invention is to provide an improved interpreter for perforated accounting and statistical records.

An object is to provide automatic zero suppression means for preventing the printing of zeros to the left of the first significant figure recorded in any field.

Another object is to provide means whereby when two holes occur in the same column of a record, one of which designates a numeral and the other a special control, the effect of the latter hole is suppressed and only the numeral is printed on the record.

An object is to provide an interpreter which permits the capacity of the record card for recording data to be increased.

Another object is to improve the construction of the printing mechanism.

Still another object is to provide improved card guiding means.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 3 is a vertical section on the line 3—3 in Fig. 1;

Fig. 6 is a partial vertical section showing the card carriage, card guides, and card feeding roller mechanism;

Fig. 9 is a plan view of the parts shown in Fig. 8;

Fig. 9a is a horizontal section on the line 9a—9a in Fig. 8;

Figure 23:
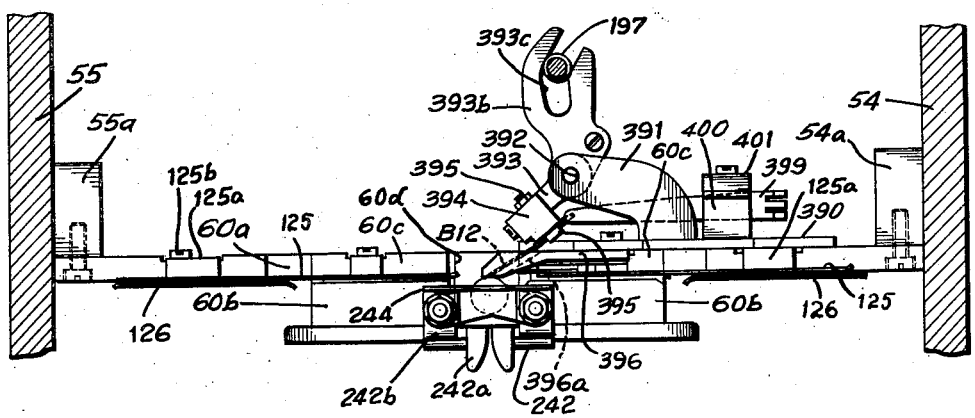
Figure 24:
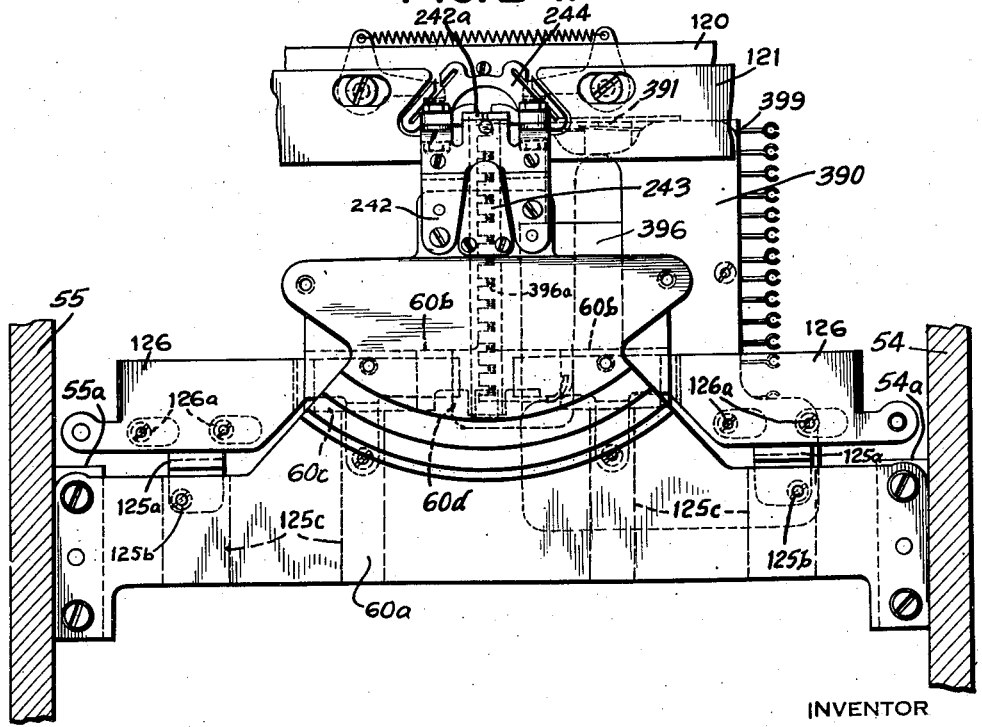

Figs. 10a and 10b together form a top plan view, partly in section, of the main power shafts and various driving and operating connections located in the base of the machine;

Fig. 11 is a vertical section on the line 11—11 in Fig. 10a;

Fig. 12 is a right side view of the tabulating key and its connections;

Fig. 13 is a top plan view of certain parts of the tabulating mechanism;

Fig. 14 is a right side view of the eject key and part of the tabulating mechanism;

Fig. 15 is a front elevation partly in section of the carriage return mechanism;

Fig. 16 is a vertical section on the line 14—14 in Fig. 15;

Fig. 17 is an enlarged right side elevation of the left hand card engaging finger;

Fig. 18 is a similar view of the right hand card engaging finger;

Fig. 19 is an enlarged front elevation of the last column contacts;

Fig. 20 is an enlarged front elevation of the contacts controlled by the column stops with the protecting cover shown in section;

Fig. 21 is an enlarged vertical section on the line 20—20 in Fig. 6;

Fig. 22 is a fragment of a card punched and printed to illustrate the combinational hole code;

Fig. 23 is a plan view of the lower card guides and card sensing brush mechanism;

Fig. 24 is an enlarged front elevation showing the card guides and card sensing brush mechanism.

Figure 27A:
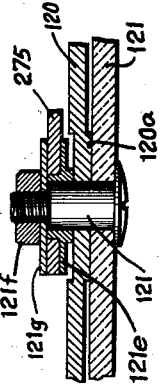
Figure 27:
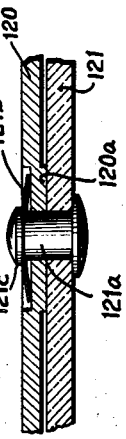
Figure 4:
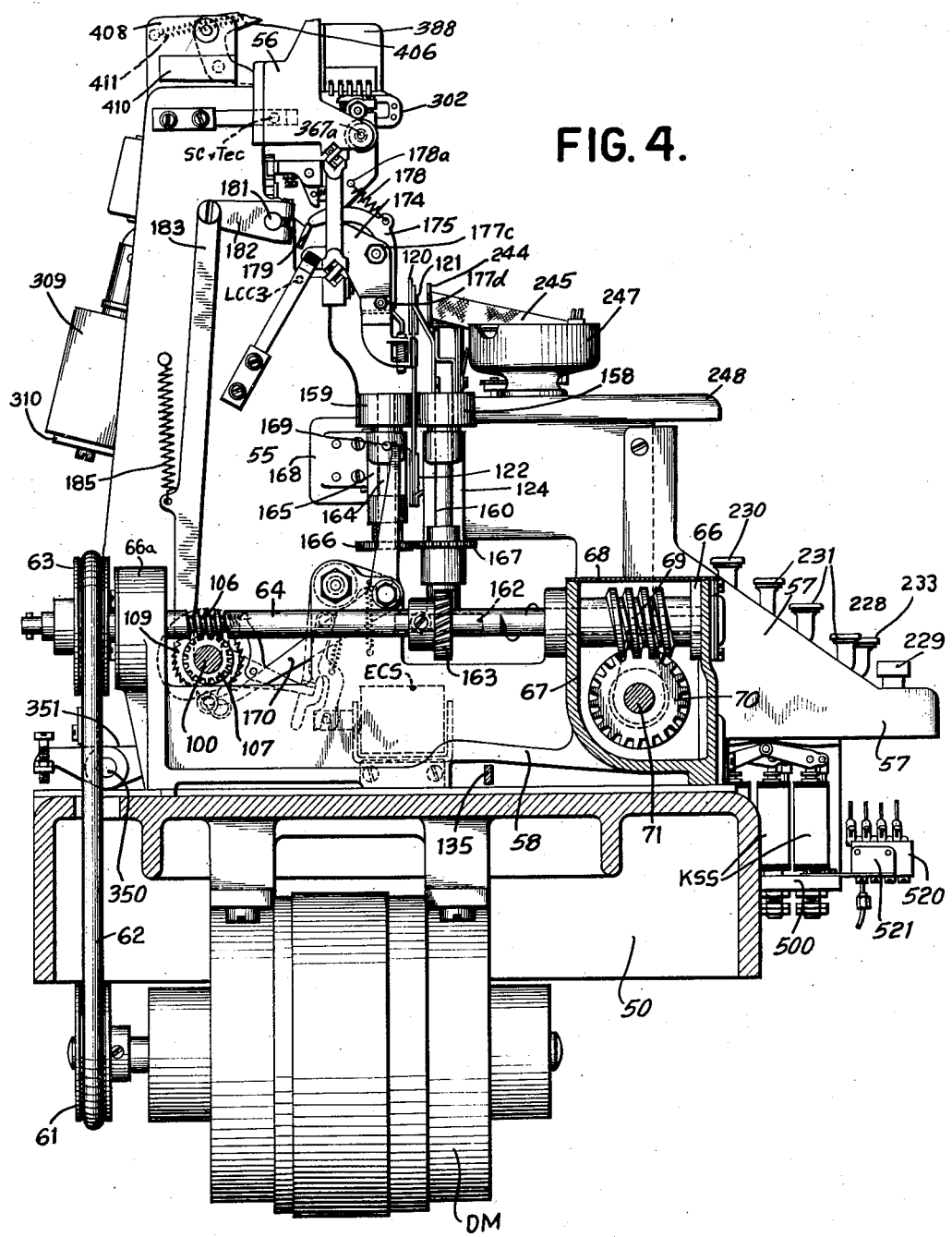
Fig. 4 is a vertical section on the line 4—4 in Fig. 1.
Figure 25:
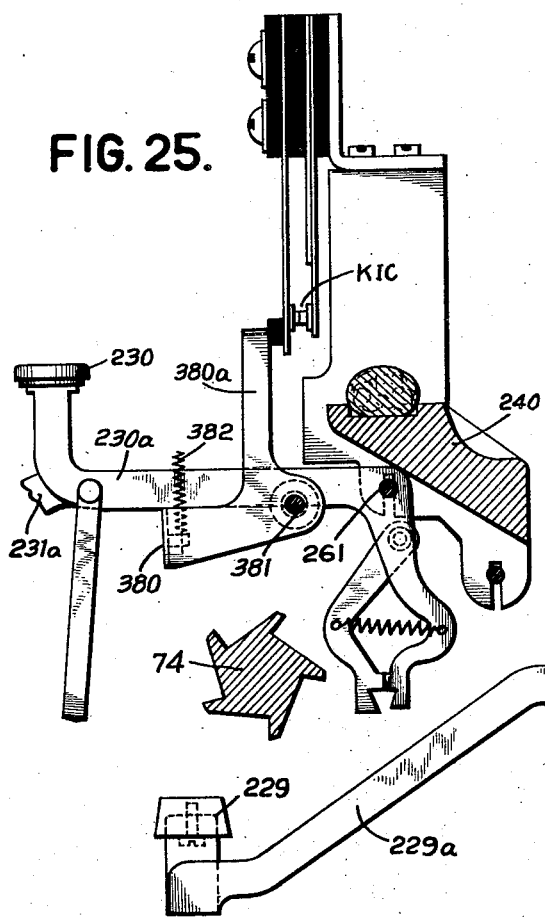
Figure 26:
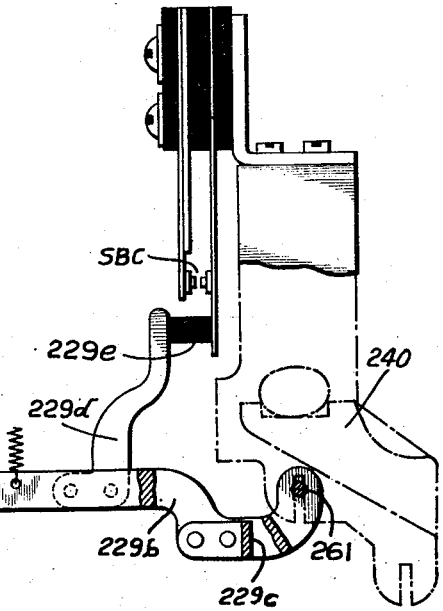

Fig. 25 is a large scale detail view of the mechanism for operating the key interlock contacts;

Fig. 26 is a large scale detail view of the space bar and its contacts;

Fig. 27 is a horizontal section on the line 27—27 in Fig. 6.

Figure 28:
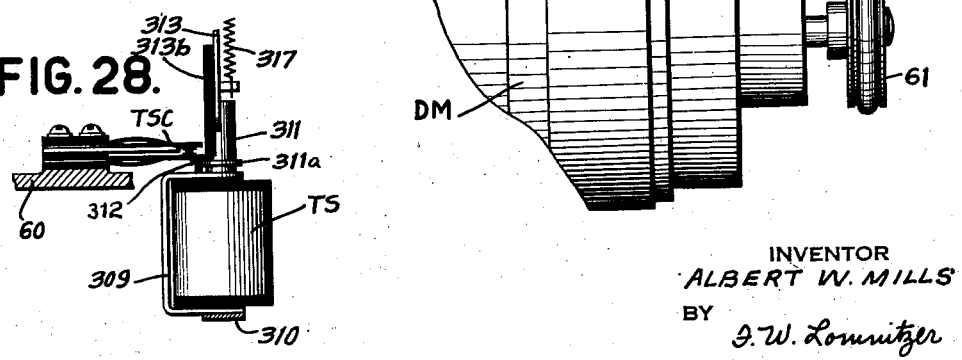
Figure 34:
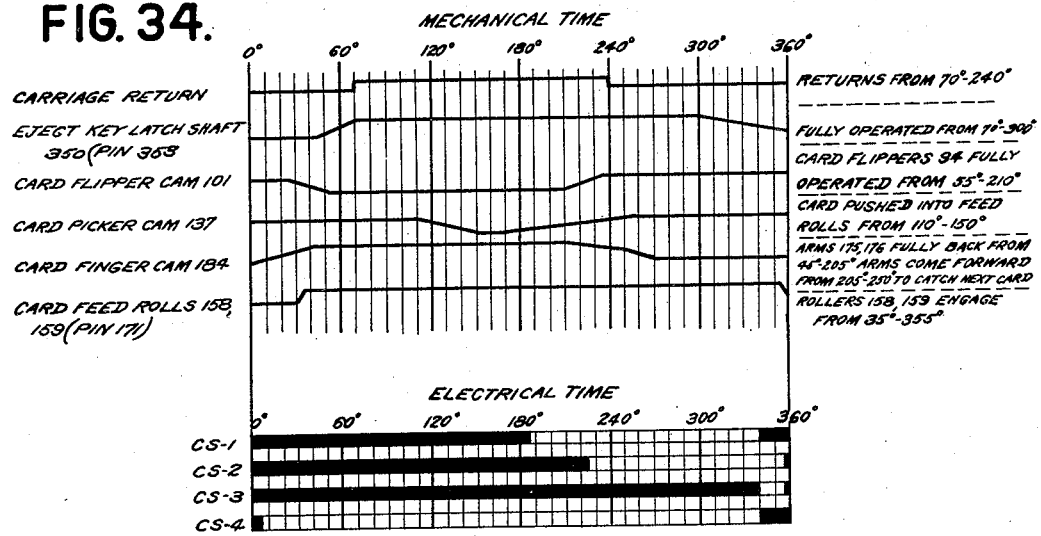
Figure 29:
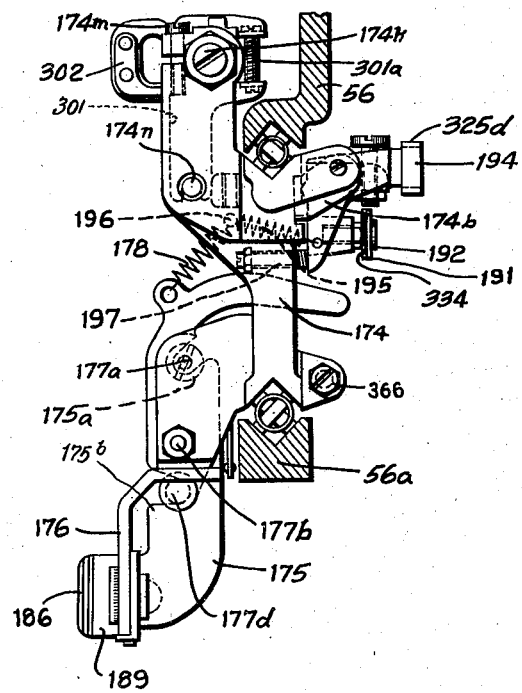
Figure 33:
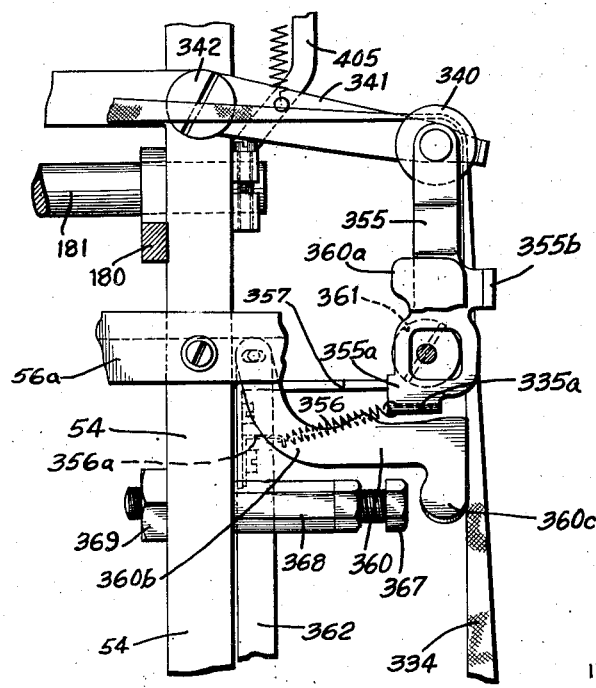

Fig. 27a is a similar section on the line 27a—27a in Fig. 6;

Fig. 28 is a detail view of the tabulating solenoid and associated contacts as viewed from the front of the machine;

Fig. 29 is an elevation of the right hand end of the card carriage;

Fig. 30 is a vertical section on the line 30—30 in Fig. 16;

Fig. 31 is a large scale front elevation of the card carriage;

Fig. 32 is a plan view of the card carriage;

Fig. 33 is a large scale detail view of certain parts shown in Fig. 15;

Fig. 34 is a chart showing the electrical and mechanical timing of the machine;

Figs. 35a and 35b together form a wiring diagram.

In the following description certain electrical devices such as contacts, magnets, relays, and switches will be mentioned from time to time. As a convenience in understanding their operation, tracing circuits, and so on, these various devices will be identified as far as possible by designating them with capital letters which are derived by taking the initial letters of the principal word or words comprising the name of the part. Thus the relays are designated R1, R2, etc., and the magnets are designated with the letter M preceded by the initial letter of the word denoting the function of the magnet. For example, EM denotes the automatic escapement magnet. This method of designating the electrical devices will make the wiring diagram (Figs. 30a, 30b) easier to understand and as nearly self-explanatory as possible.

I. The card

In Fig. 22 is shown the left hand half of a tabulating machine record card of a type now very commonly used in Hollerith electric tabulating machines as it would appear after the entire alphabet and all the numerals have been punched and printed in accordance with a standard code. It will be noted that the letters of the alphabet are designated by pairs of holes, each hole of a pair being located in one of the twelve index-point positions of a column. Thus the letter "A" is designated by holes in the "12" and "1" index point positions of the same column.

It will be noted by reference to the code in Fig. 22 that the alphabet is divided into three groups. The letters of the first group A to I are designated by different combinations of a hole in the "12" position with holes in the "1" to "9" positions; the letters of the second group J to R are designated by a hole in the "11" position in combination with holes in the "1" to "9" positions; while the letters of the third group S to Z are identified by the combinations of a "0" hole with holes in the "2" to "9" positions. If desired, "0" and "1" holes together could be used to designate a punctuation mark or an arbitrary character like "$," but, as punctuation marks and monetary unit symbols are rarely used in tabulating machines, there need not be any character represented by the combination of a "0" hole and a "1" hole.

The code shown in Fig. 22 is quite arbitrary, several codes having been used or developed heretofore which made use of different combinations of two holes to represent all the letters of the alphabet. The numerals are represented by single holes in the "0" to "9" positions.

Holes in the "11" and "12" positions do not ordinarily have any numerical significance but are often used for special control purposes in the tabulating machines, for instance, to identify debits and credits, for class selection purposes, and so on. The machine described herein must be capable of printing not only the letters of the alphabet and numerals, but also characters corresponding to holes in the "11" or "12" positions of the card. In the machine described herein the values "11" and "12" will be printed at the top of the card when "11" and "12" holes occur alone. When they are used as parts of combinations to designate letters, only the proper letters will be printed adjacent the top edge of the card as shown in Fig. 22.

The cards may have as many columns for the reception of punched and printed data as may be desired. Standard cards are in use having 34, 45, and 80 columns for the reception of data. The drawings illustrate a machine designed to print data under control of 80 column cards, but the machine could be designed to print under control of cards having different numbers of columns by suitable changes in the proportions of the machine and in the design of the carriage escapement mechanism to be described in detail herein.

The cards, when punched and printed in accordance with a predetermined plan, may be used in well known ways in electrically or mechanically controlled accounting and statistical machines, reproducing machines, non-printing card duplicating machines, and automatic multiplying and dividing card perforating machines of which a large number of each type are now in everyday use.

II. Framework

The entire mechanism is mounted on a suitable base 50 which is preferably made in one piece and supported by four legs (not shown). Secured to this base are a number of frames and sub-frames which are designated 52 to 60 in the various figures. Frames 52, 53 (Fig. 1) support the supply hopper for the perforated cards and the storage hopper for the printed cards, respectively. Frames 54, 55 (Figs. 1 to 6, 10a, 10b, 13, 15, and 19) are spaced parallel to each other and provide the principal support for the mechanisms of the machine. Sub-frame 56 (Figs. 1 to 6) rigidly joins together the upper ends of frames 54, 55. The composite frame 57 secured to frames 54, 55 near the front edge (Fig. 2) of base 50 encloses the keyboard. Frame 58 is mounted on base 50 to the left of frame 55 (Figs. 1, 2, 4, 9a, and 10) and supports the main drive shaft, cam shaft, and cam shaft clutch mechanism. Sub-frame 59 (Figs. 5 to 8, 10a, and 10b) joins frames 54, 55 together near base 50 and supports the slide bars corresponding to the type bars and parts associated therewith. Sub-frame 60 (Figs. 5, 6, and 8) is a relatively large central frame mounted on frames 54, 55 and supports the escapement mechanism and part of the tabulating mechanism. Sub-frame 60a, secured to blocks 54a, 55a carried by frames 54, 55 supports the type bar segment, part of the card guiding means, and the card sensing mechanism.

III. Power drive mechanism

Power to operate the machine is furnished by a drive motor DM (Figs. 1 and 4) having a driving pulley 61 connected by a belt 62 to a driven pulley 63 secured to the main drive shaft 64, the belt 62 passing through an opening in the base 50. The drive mechanism is shown in Figs. 1, 2, 4, 10a, and 11. The front end of shaft 64 is supported by a ball or roller bearing 65 (Fig. 11) mounted in a housing 66 formed in the front end of frame 58, while the rear end of said shaft is similarly supported in housing 66a forming part of the rear end of frame 58.

Near its front end, adjacent housing 66, frame 58 is formed as a gear case generally designated 67 in Figs. 1, 2, 4, 10a, and 11, which is closed by a cover 68 to exclude dirt and prevent spattering of gear lubricant in the case 67. Shaft 64 extends through gear case 67 and secured to said shaft within said case is a worm 69 (Fig. 4) meshing with a worm wheel 70 secured to a short shaft 71 journaled in the walls of the gear case below shaft 64. Shaft 71 extends toward frame 55 a short distance and secured to said shaft is an arm 72 (see Figs. 10a and 11) carrying a pin 73.

Coaxial with shaft 71 and journaled in frames 54, 55 is a fluted driver or universal actuator 74 to the left hand end of which is secured an arm 75 having an open slot adapted to embrace pin 73. The actuator 74 has the general shape of a ratchet wheel in transverse section (Figs. 5 and 8) and operates the type bars. Its operation and relation to other parts will be explained hereinafter at the proper points. Through suitable gearing, the right hand end of the actuator 74 also operates the carriage return mechanism and part of the mechanism for feeding the perforated cards into position to be gripped and fed by the card carriage. Shaft 64 and the actuator 74 rotate constantly while the machine is in use.

IV. Card hoppers

Figure 1:
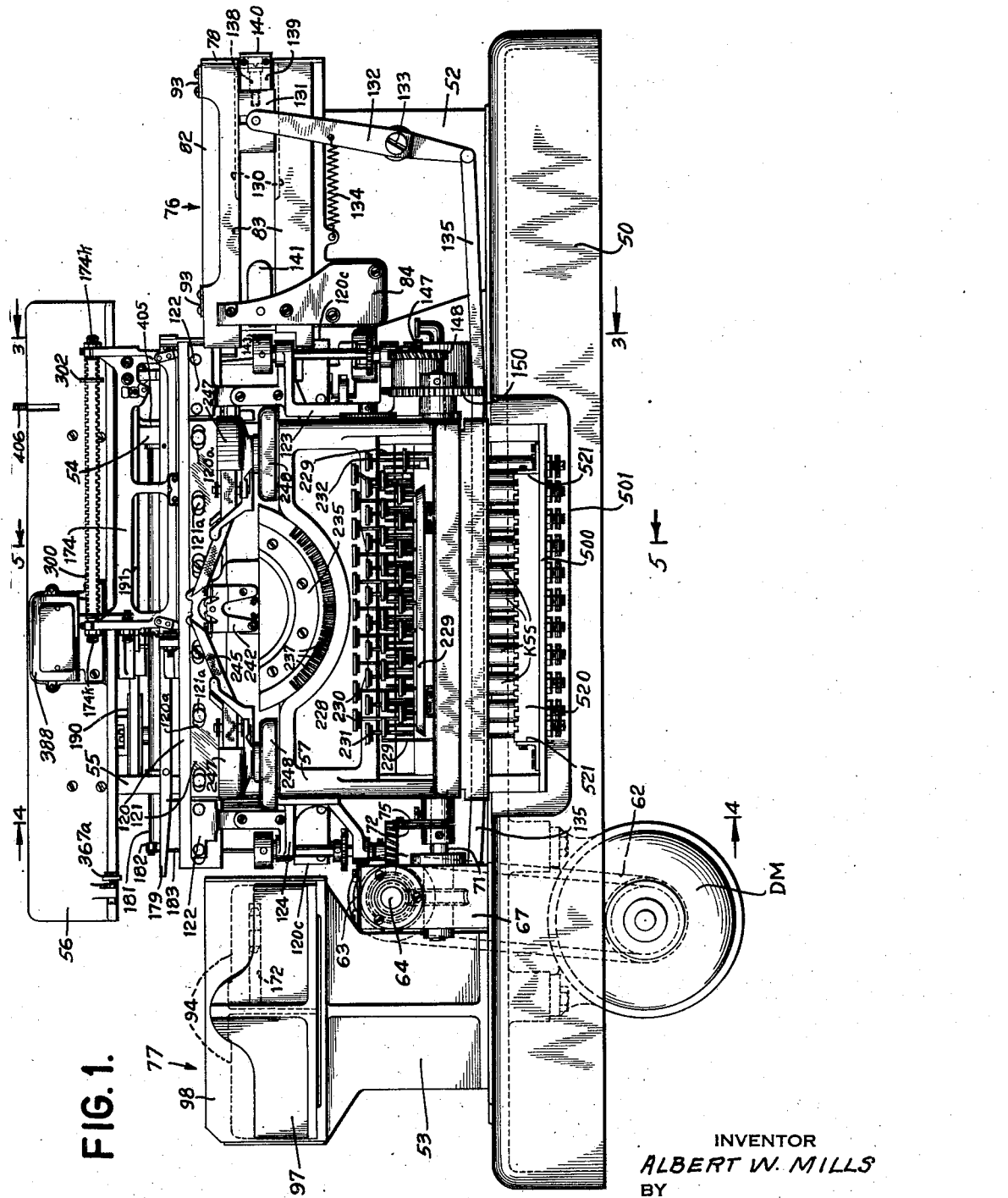
Fig. 1 is a front elevation of the machine.
Figure 2:
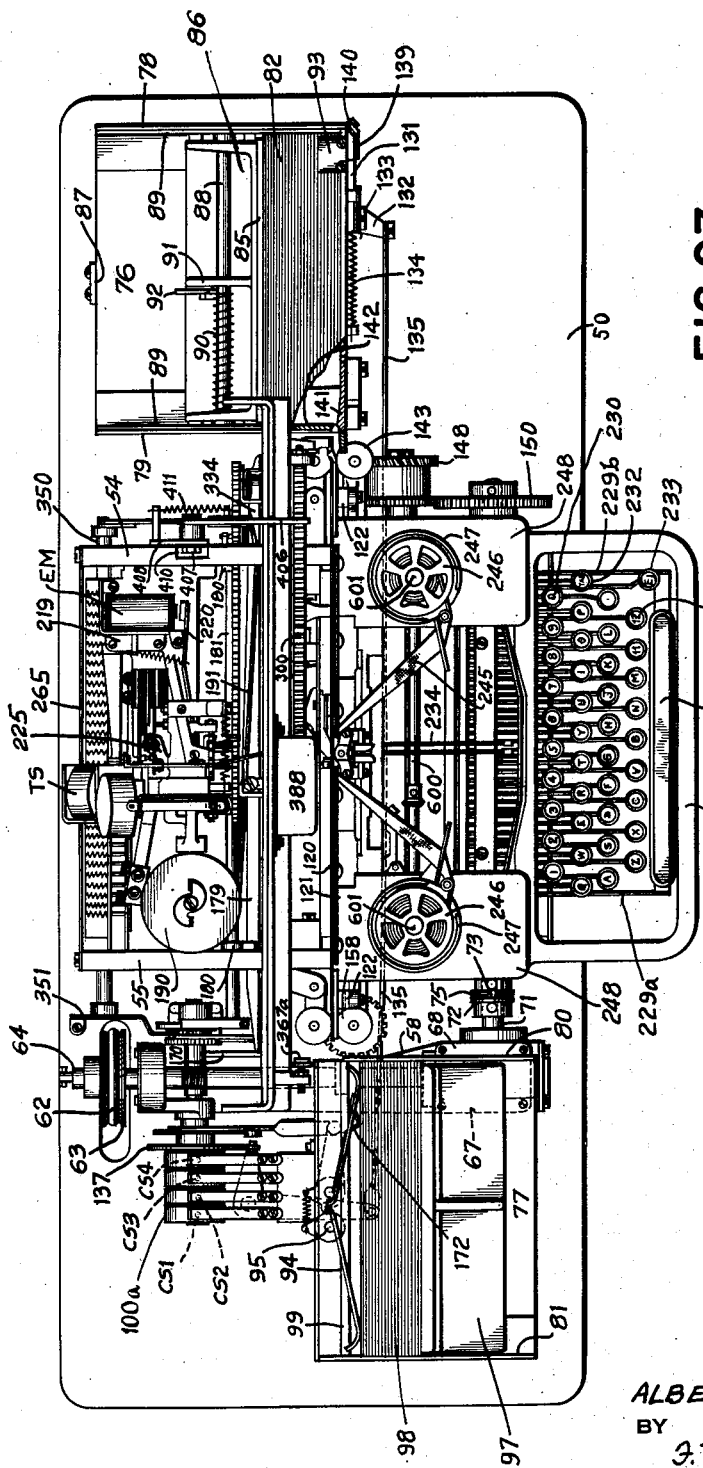
Fig. 2 is a top plan view.

There are two card hoppers, one, which is generally designated 76 in Figs. 1 and 2, for the punched cards, and the other, designated 77 in said figures, for the printed cards. These hoppers are mounted on the frame castings 52, 53, the substantially flat tops of which castings form the bottoms of the hoppers.

The sides of the hoppers are formed by plates 78, 79 (Figs. 1 and 2) in the case of the hopper 76, and plates 80, 81 in the case of the hopper 77, which plates are secured to the sides of the frame castings 52, 53, respectively. The punched and unprinted cards 82 are placed in the hopper 76 so that they stand upright, facing forward, with their lower edges resting on the top surface of casting 52, and with their ends held in fairly close alignment by the plates 78, 79.

The front of the hopper 76 is closed by a pair of guides 83 (Fig. 1), the right hand ends of which are secured to the front vertical edge of plate 78 while their left hand ends are supported by a bracket 84 secured to frame casting 52. The cards in hopper 76 are pressed toward guides 83 by means of a follower plate 85 (Fig. 2) carried by a frame 86 which is slidably mounted on the top of frame 52. Rearward movement of frame 86 is limited by a stop 87 secured to the rear edge of casting 52. Rotatably mounted in frame 86 is a shaft 88 to each end of which is secured a pinion (not shown). These pinions mesh with the undersides of suitable racks 89 secured to the top edges of plates 78, 79. A coil spring 90, surrounding shaft 88, has its ends secured to shaft 90 and a part of frame 86, and normally tends to rotate said shaft and pinions in such fashion that frame 86 and plate 85 tend to move forward and thereby press the punched cards against guides 83. Frame 86 is formed with a ring-shaped finger piece 91 which may be grasped to pull frame 86 and plate rearwardly when it is desired to insert a fresh batch of punched cards. A suitable spring-operated catch 92 is provided on frame 86 to snap over stop 87 to hold the frame against forward movement in response to spring 90 when the operator is inserting a batch of unprinted cards. Secured to the top edge of the upper guide 83 is a pair of plates 93 which accurately position the cards adjacent the guides 83.

The rear part of hopper 77 is positioned forwardly of the plane of the foremost punched card in hopper 76. The plates 80, 81 form the side walls, the top surface of casting 53 the bottom, while there is no rear wall but, instead, there is provided a pair of card flippers 94 (Fig. 2) secured to the upper ends of two vertical and parallel shafts 95. Shafts 95 are journaled in holes in the top of frame casting 53 (Fig. 2) and in a lug 96 (Fig. 10a) formed in said casting. The manner in which the flippers 94 are operated will be explained in more detail later at the proper point.

A follower weight 97 is provided for the printed cards 98 in hopper 77. This weight is a casting having two flat walls making an acute dihedral angle with each other, one of which walls rests on the top of casting 53 while the other wall slopes downwardly from front to rear. After each printed card 98 has been fed into the hopper 77 by means presently to be described, flippers 94 are moved forwardly thus pushing all of the cards in the hopper 77 and also the follower weight 97 forwardly an amount sufficient to clear the way for the next card 98 to enter the hopper.

The punched cards 98 in hopper 77 lean slightly forward due to the shape of weight 97. In order to keep the lower edges of the cards 98 from sliding rearwardly, the top rear surface of casting 53 has a shoulder or rib 99 (Fig. 2) whose top surface slopes rearwardly flush with the surface of casting 53 while the front edge is raised enough from the surface of casting 53 to provide an abutment in front of which the lower edge of each card 98 drops when pushed forward by pusher plates 94.

Normally the flippers 94 occupy the extreme forward position of Fig. 2 but are moved rearwardly at the proper time in each eject cycle to permit a finished card 98 to be fed into the hopper 77 in front of flippers 94 after which the latter are moved forwardly to push this card in front of rib 99. The rib 99 thus prevents the previously punched cards from sliding rearwardly when the flippers 94 are moved in the same direction.

Flippers 94 are operated by a cam shaft 100 which rotates only during eject cycles. This shaft is journaled in frame 58 (Figs. 4, 10a, and 10) beneath and at right angles to shaft 64. Secured to shaft 100 is a cam 101 (Fig. 10a) acting on a roller carried by a link 102 which is slotted to embrace shaft 100. Link 102 is pivoted to a rock lever 103 secured to the right hand shaft 95 which lever 103 has an arm 103a having a pin and slot connection to an arm 104 secured to the left hand shaft 95. A spring 105, connected to ears formed in lever 103 and arm 104, normally tends to rock both the flippers 94 rearwardly but such motion is controlled by rotation of cam 101. Obviously, as cam 101 rotates, the roller thereon will follow the periphery of the cam and at the proper time flippers 94 will be permitted to move rearwardly.

V. Eject clutch mechanism

The movements of cam shaft 100 are controlled by a clutch which will be termed the eject clutch for convenience. A worm 106 is cut in shaft 64 adjacent housing 66a (Figs. 4 and 10a) which worm drives a worm wheel 107 loosely mounted on shaft 100. Worm wheel 107 is secured to or is part of a sleeve 108 and fixed to the right hand end of such sleeve is a ratchet wheel 109. The latter rotates constantly while the machine is in use. Secured to cam shaft 100 is a three armed lever 110 (Figs. 10a and 11), one arm of which is considerably longer than the others and extends forwardly and downwardly to engage a bent-over lug 111a formed in the end of one arm of a latch lever 111 pivoted on a screw stud 112 carried by an extension of frame 58. The other arm of latch lever 111 is held by a spring 113 against the head of a screw stud 114 also carried by the extension of frame 58. Spring 113 is connected to a pin on frame 58 and normally tends to hold the lug 111a in the path of the longer arm of lever 110 and thereby prevent the latter and shaft 100 from rotating in a clockwise direction (Fig. 11). Lever 111 also carries a latch 115 held by a spring 116 against the front edge of the lug 111a and this latch 115 hooks over the end of the longer arm of lever 110 so as to prevent rotation of lever 110 and shaft 100 in a counterclockwise direction (Fig. 11). Thus shaft 100 and lever 110 are normally locked against movement in either direction.

Pivoted on the longer arm of lever 110 is a coupling pawl 117 having an arm which is engaged by the lug 111a in latch lever 111 so that the pawl 117 is also normally locked against movement in a clockwise direction. The pawl 117 is provided with a tooth which is normally just out of the path of the teeth in ratchet 109 but is adapted to engage said teeth. A spring 118, connected to an ear in pawl 117 and an ear formed in one of the other arms of lever 110, normally tends to rock pawl 117 clockwise to draw the tooth in said pawl between the teeth of ratchet 109.

Latch lever 111 has a pin and slot connection to the plunger 119 of a solenoid ECS mounted on frame 58 (Fig. 11). When solenoid ECS is energized, latch lever 111 will be rocked in a clockwise direction, withdrawing the lug 111a on said lever from engagement with the longer arm of lever 110 and the tail of pawl 117. Spring 118 will then rock pawl 117 in a clockwise direction to cause the tooth in said pawl to engage the teeth of ratchet 109. The latter will then drive the three armed lever 110 and shaft 100 positively in a clockwise direction. Deenergization of solenoid ECS permits spring 113 to restore the latch lever 111 to the position of Fig. 11 whereupon the lug 111a will be placed in the path of the tail of pawl 117. Eventually the tail of pawl 117 will strike lug 111a, causing the pawl to be rocked counterclockwise to disengage the tooth in said pawl from ratchet 109. Very shortly after this, the longer arm of lever 110 will strike lug 111a and pawl 115 will snap beneath the end of said arm thereby preventing said arm from rebounding after striking the lug 111a. The solenoid ECS will be termed the eject clutch solenoid hereinafter.

Shaft 100 extends to the left (Figs. 2 and 10a) and carries four cams 100a which are made of insulating material such as "Bakelite." These cams actuate four pairs of contacts designated CS1 to CS4 and insulatably mounted on a bracket 100b secured to the rear part of frame casting 53 (Figs. 2 and 10a). These contacts have certain interlock and control functions which will be more fully explained hereinafter at the proper point. The relative timing of contacts CS1 to CS4 is shown in Fig. 29 in which the thick black lines indicate the length of time the contacts are kept closed by the cams.

VI. *Card guides*

The punched cards are fed from the hopper 76 by picker mechanism to be described later, and are then conveyed from right to left to the entrance to hopper 77. During the course of this movement, typewriting mechanism, to be described hereinafter, prints data on the upper edges of the cards under control of the holes punched in the cards. The means for supporting and guiding the cards during their passage from the discharge opening of hopper 76 to the entrance of hopper 77 will now be described.

The upper edge of the card is guided by a guide assembly including a metallic bar 120 (Figs. 1, 2, and 27) and two transparent strips 121 mounted on the face of the bar. The bar 120 is supported by two I-shaped brackets 122 secured to extensions of two castings 123, 124 mounted on the sides of frames 54, 55. The bar 120 is made of sheet metal stamped with oval bosses 120a (see Fig. 27) on its front face which bosses space the strips 121 away from bar 120 and space bar 120 from brackets 122 a distance slightly greater than the thickness of a card. The bosses are in alignment to serve as guides for the upper edge of the card.

The transparent strips 121 are made of some material like Celluloid which has a different coefficient of expansion than steel. It has been found that when Celluloid, for example, is rigidly secured to metal, there is a tendency for the Celluloid to buckle with changes in temperature destroying its value as a card guide. In order to avoid this the strips 121 are mounted so as to be free to move longitudinally relative to bar 120 a small amount. The strips 121 are secured to the front faces of bosses 120a by means of studs 121a (see Fig. 27) which pass through holes in the strips, holes in the bosses, oval spring washers 121b and washers 121c which are riveted on shoulders in the studs. The holes in strips 121 are slightly longer than the diameters of studs 121a to allow a small amount of longitudinal movement of strips 121 relative to bar 120 with changes in temperature. The oval spring washers are slightly bowed and fit in the depressions in bar 120 made in forming bosses 120a and have a tendency to resiliently hold strips 121 on the faces of the bosses. Brackets 122 are riveted to the bosses at the ends of bar 120. Short guide bars 120c are riveted to the lower cross bars of brackets 122 from which brackets the bars 120c are spaced by bosses formed on said bars. The sides of bars 120c, the bosses thereon and brackets 122, guide the lower edges of the cards as they leave hopper 76 and enter hopper 77, respectively. The right hand ends of the members 120, 121 are beveled or bent slightly to prevent the left hand vertical edges of the cards from catching on said members.

The frame 60a is offset forwardly (Fig. 5, 7, and 23) to provide two wide aligned shoulders 60b and two narrower aligned shoulders 60c on the rear side of said frame (see Fig. 24 also). The frame 60a has a vertical curved recess 60d milled therein to provide sufficient space in front of a card in printing position to mount the part of the card sensing mechanism which must be in front of the card. The recess 60d extends downwardly well below the level of shoulders 60c for a purpose which will be explained hereinafter.

Two card guide assemblies are secured to the rear face of frame 60a and are substantially alike in respect to the shape of the parts. Each assembly comprises a rear guide element 125 and a front guide element 126. The rear guide elements are each formed from a single sheet metal blank with two long offset lugs 125a which are secured to the rear face of the frame 60a by means of screws 125b, the rear face of the frame 60a being provided with shallow vertical slots 125c to mount lugs 125a flush with said face. The rear guide elements are longer horizontally than the front elements 126 and extend toward the recess 60d so as to overlie the shoulder 60c. The portions of rear guide elements 125 nearest the frames 54, 55 are provided with oval bosses on the faces of which are secured the front elements 126 by means of rivets 126a.

The upper edges of the bosses are level with the shoulders 60c and the right hand ends of the elements 125, 126 are bent to prevent a card passing from right to left past the printing point from catching. The shoulders 60c are also beveled slightly for the same purpose.

The guide elements 120, 121, 125, 126 cooperate to guide the cards while they are between the frames 54, 55, the cards passing in front of elements 120, 125, behind the elements 121, 126 and over the shoulders 60c. Since the hoppers 76, 77 are spaced from the frames 54, 55, additional guides are necessary to guide the lower edges of the cards into and out of the guides 125, 126 for the space between the hoppers and frames 54, 55.

The center of bar 120 is braced by means of a bracket 127 (see Fig. 7) secured to the front face of the grooved rail 56a. This bracket also supports a disc platen 128 which is rotatable on a stud 129 secured to bracket 127.

VII. Card picker mechanism

Cards are removed from hopper 76 one at a time and the left hand ends pass between bars 122 and into the channels formed by guide elements 120, 120c, 121, 125, 126, (Fig. 6). Slidable in grooves 130 in guides 83 is a block 131 (Fig. 1) having a pin and slot connection to a lever 132 pivoted at 133 to frame casting 52. A spring 134, connected to the upper arm of lever 132 and a pin on frame casting 52, normally tends to draw the block 131 and the upper end of lever 132 to the left. A long link 135, pivoted to the lower arm of lever 132, extends almost the entire length of the machine, beneath frames 53, 54, 58, and to the left of frame 58 (Figs. 2 and 10a) said link is pivoted to one arm of a bell crank 136. The latter is pivoted on a post carried by base 50 and its other arm has a cam roller bearing on the periphery of a cam 137 secured to cam shaft 100. This cam controls the movement of block 131 in response to the pull of spring 134.

Pivoted on the right hand end of block 131 (Figs. 1 and 2), by means of a concealed screw 138, is a block 139 to the left edge of which is secured a picker knife 140. The latter is adjustably mounted on block 139 and projects rearwardly and to the left far enough from block 139 (against the rear surface of which the cards are pressed) to engage the right hand edge of the foremost punched card 82 so that movement of blocks 131, 139 to the left in response to spring 134 will cause the foremost card 82 to be pushed to the left into the channels formed by guide elements 120, 121, 127, 128. As it is essential that only one card at a time be so removed, there is provided an adjustable throat block 141 (Fig. 1) secured to the rear face of bracket 84 between guides 83 which block 141 cooperates with an adjustable throat knife 142 (Fig. 2) secured to the right side of plate 79 behind block 141. The throat block 141 and throat knife 142 are adjusted in a well known way to provide a narrow throat or gap just large enough to permit only one card at a time to pass to the left. This throat block and throat knife are well known features of card supply hoppers of record controlled machines such as tabulating machines, sorting machines, and record perforating machines; for this reason it is not shown or described in detail.

VIII. Card feed mechanism

The picker mechanism is capable of moving the cards only a short distance and, in order to bring each card moved by the picker into a position to print in the first column thereof and remove the card when the printing operation in the last column has been finished, two separate pairs of feed rollers are provided. These feed rollers and/or their driving connections are shown in Figs. 1 to 4, 6, 10a, and 10b.

Feed rollers 143, 144 are provided to feed the card to a position to be printed in the first column where the card carriage, hereinafter to be described, then assumes control of the movement of the card from right to left. Feed roller 143 (Figs. 3 and 6) is secured to the upper end of a shaft 145 journaled in the frame 123. A gear 147 is fixed to the lower end of shaft 145 and meshes with a gear 148 integrally connected to a gear 149 by means of a long hub or sleeve, gears 148, 149 being rotatable on a stud carried by frame 54. A gear 150 secured to the right hand end of the actuator 74 meshes with gear 149.

Feed roller 144 (Fig. 3) is fixed to the upper end of a shaft 151 journaled in a casting 152. A gear 153, secured to shaft 151, meshes with a similar gear 154 secured to shaft 145. Casting 152 is pivotally mounted on two lugs 123a formed in frame 123 as by means of a pin 155 (Fig. 6). This pin is secured in the lugs in casting 152 by means of a set screw 156 which is shown in Fig. 3. Pin 155 is also slotted at its upper end to permit a screw driver or key to be used to rotate the pin. A coil spring 157 (Fig. 6) surrounds pin 155 and is hooked to said pin and the casting 146. The set screw 156 may be loosened and pin 155 turned with a screw driver or key to wind spring 157 in a direction to cause the casting 152 to press feed rollers 143, 144 together, the set screw 156 being tightened when the proper pressure is attained.

Since shaft 64 and the actuator 74 rotate constantly when the machine is in use, it is plain that feed rollers 143, 144 will likewise be driven constantly through the train of gears 153, 154, 147, 148, 149, 150 and a card 82 pushed to the left by the picker mechanism will be gripped by said feed rollers and carried to the left until the right hand vertical edge of the card is released by the feed rollers.

Feed rollers 158, 159 are provided to remove each printed card from the card guides and carry the printed card into hopper 77 after the printing operations on such card have been completed. Feed roller 158 (Fig. 4) is secured to the upper end of a shaft 160 journaled in frame 124. A gear 162 mounted on the lower end of shaft 160 meshes with a gear 163 secured to shaft 64. The feed roller 159 is secured to the upper end of a shaft 164 journaled in a frame casting 165, and secured to the shafts 160, 164 are intermeshing gears 166, 167, respectively. Casting 165 is pivotally mounted on frame casting 168 in substantially the same fashion as frame casting 152 is mounted on frame 123, a slotted pivot pin and coil spring (not shown) being provided, which spring tends to press rollers 158, 159 together.

Casting 168 is secured to the left hand face of frame 55.

The feed rollers 158, 159 do not ordinarily make contact with each other but are kept separated a distance sufficient to permit the left hand end of the card which is being printed to move between said rollers without being gripped by them. A pin 169 (Fig. 4) on casting 165 is engaged by the upper arm of a rock lever 170 pivoted on stud 114 (Figs. 10a and 11). The other arm of lever 170 bears against a pin 171 projecting from the side of the three armed lever 110. When cam shaft 100 is at rest with lever 110 latched, as in Fig. 11, the pin 171 holds lever 170 and casting 165 in a position to keep rollers 158, 159 separated and thereby prevent a card from being gripped by said rollers. After cam shaft 100 and pin 171 has turned approximately 35° (see Fig. 34), pin 171 clears the end of lever 170 and the spring acting upon casting 165 forces rollers 158, 159 together to grip the card and carry it into the hopper 77.

Since the feed rollers 158, 159 must be mounted far enough to one side of the hopper 77 to clear the cards therein, the last few steps of movement necessary to bring the left hand edge of each card against plate 81 must be accomplished by the momentum of the card. It has been found that the cards have some tendency to rebound back into the card guides causing the card to become bent or torn when flippers 94 move forwardly. This is prevented by a spring finger 172 (Figs. 1 and 2) secured to the back of the right hand flipper 94 and having a V-shaped portion projecting through an opening in the right hand flipper 94. When the flippers 94 are in their extreme rearward position the V-shaped portion of finger 172 is in the path of each card fed from the card guides by rollers 158, 159 and tends to bend or warp the upper edge of the card very slightly forward, not enough to damage it, but enough to cause the card to tilt forwardly as it enters the hopper. The trailing edge of the card is thus sprung forwardly by the U-shaped portion after the card passes plate 80 and is thereby prevented by the plate from rebounding back into the card guides and being caught by the card guides or the rear edge of plate 80 when flippers 94 move forwardly.

IX. Card carriage

A card fed into the card guides by feed rollers 143, 144 is brought into a position to be gripped by a card carriage and thereafter is moved by said carriage from right to left during the process of printing the card under control of holes in the card. This card carriage is shown in Figs. 1 to 6, 29, 31, and 32, and comprises a main frame 174, best shown in Figs. 29, 31, and 32. This frame 174 is movable transversely of the machine, the lower edge of frame 56 and the upper edge of a rail 56a having grooves which confront similar grooves in the frame 174 with suitable anti-friction rollers riding in the grooves supporting the carriage frame after a fashion very common in typewriters.

The frame 174 carries two arms 175, 176 for engaging the ends of the card of which the arm 176 is secured to the right hand end of the frame by means of two studs 177a, 177b (Fig. 31), stud 177a serving as a pivot while the stud 177b works in an open curved slot cut in arm 176 concentric with stud 177a to permit adjusting the arm toward and away from the plane of a card between the arms. Arm 175 has an inclined slot 175a (Fig. 29) embracing a stud 177c on the left hand end of frame 174 (Fig. 31) and also has a curved slot 175b (Fig. 29) concentric with stud 177c and embracing a stud 177d. The arm 175 pivots on the stud 177c, being held in the position of Fig. 29 by a spring 178 anchored to an ear in arm 175 and a pin 178a on frame 174 (see Fig. 31 also). The studs 177c, 177d have opposed shoulders engaging the sides of arm 175 to prevent movement of said arm longitudinally of the frame 174 yet permit said arm to rock on the stud 177c transversely of frame 174, this movement being limited by stud 177d. Both arms 175, 176 project forwardly close to the path of the cards and carry card engaging fingers which will be described later herein.

The arm 175 is pivoted so it can be rocked counterclockwise (Fig. 29) to remove the finger carried by this arm from the path of the card to permit such card to pass into hopper 77.

The arm 175 is controlled by a bail which consists of a bar or rail 179 (Figs. 1, 3, 5, and 6) secured to arms 180 rigidly mounted on a shaft 181 journaled in frames 54, 55. Secured to the left hand end of the shaft 181 (see Figs. 1 and 4) journaled in frames 54, 55 is an arm 182 connected to a vertical link 183. The latter is slotted at its lower end to embrace the hub of a cam 184 secured to shaft 100 (Figs. 10a and 11). Link 183 has a cam roller constantly engaging cam 184, a spring 185, attached to said link and a part of the framework, tending to draw up said link and hold the roller in contact with the cam 184. Normally, the roller on link 183 rests in the dwell of the cam and in this position the bar 179 is in its lowest position permitting spring 178 to hold the lower end of arm 175 as far forwardly as it can go, limited of course by stud 177d. With arm 175 in this position the finger carried by arms 175, 176 will engage the ends of a card in the card guides and movements of the card carriage will be communicated to the card.

The card finger carried by arm 175 is designated 186 in the drawings and is best shown in Fig. 17 which is a large scale view of the finger as viewed from the right hand side of the machine. The body of the finger is formed from a sheet metal blank having a plate 186a of insulating material riveted to the right hand face (see Figs. 31 and 32 also). The finger is pivotally connected to the arm 175 by means of bent-over lugs 186b formed in said finger and a pin 187 which passes through holes in said lugs and a vertical hole in arm 175. A torsion spring 188 surrounding the pin 187 within a rectangular slot or recess 175c in arm 175 normally tends to rock the front end of finger 186 to the right (Figs. 31 and 32), this movement being limited by virtue of a lug 186c in said finger which lug engages the right hand side of arm 175.

The card finger carried by arm 176 is designated 189 and is mounted in very much the same fashion as finger 186. Finger 189 is best shown in Fig. 18 which is a large scale view of the finger as viewed from the front of the machine. The body of finger 189 is made from a flat metal blank cut away to form two lugs 189b which are pivotally connected to arm 176 by means of a pin 187a extending through vertical holes bored in the two lugs formed by a rectangular slot 176a in arm 176. The lower lug 189b is approximately twice as long as the other and is cut away at its end to engage a lug 176b formed by cutting away portions of arm 176 so that the front surface of the lower lug 186b as viewed in Fig. 18 is flush with the front surface of arm 176. A spring 188a, surrounding the pin 187a within the recess 176a, normally holds the finger 189 in the position shown in Fig. 32.

The front end of finger 189 is beveled as shown in Fig. 32 to provide a card engaging surface perpendicular to the plane of the cards and is recessed to accommodate a plate 189a made of insulating material riveted to finger 189. Thus the plate 189a cooperates with the front end of finger 189 to form a shoulder which engages both the right hand vertical edge of the card and the rear surface of the card adjacent the shoulder.

The operation of arm 175 and the action of fingers 186, 189 will be brought out more clearly hereinafter when the operations performed during an eject cycle are described. It will be assumed for the present that arm 175 is as far forward as it can go and both fingers 186, 189 are engaging a card in the card guides as shown in Fig. 6.

The left hand lug 174a is part of frame 174 (Fig. 32) and has a stud 174c loose in a hole in the left hand bracket 193 which is thereby both pivotally and slidably mounted on said stud. The right hand lug 174b is formed in the left hand end of a bracket 174d secured to frame 174 by means of screws 174e (Fig. 31). A shouldered stud 174f carried by lug 174b pivots the right hand bracket 193 to bracket 174d but lug 174b, and hence rack 194, are not movable relative to each other longitudinally of rack 194. A stud 174g screwed into a hole in a lug 174b formed in frame 174, has a flange 174i rotatable between two lugs 174j formed in bracket 174d. The holes for screws 174e are oval whereby bracket 174d may be moved longitudinally when the screws are loosened. The right hand end of stud 174g is slotted whereby it may be turned with a screw driver. By loosening screws 174e and turning stud 174g with a screw driver, the rack 193 may be moved longitudinally relative to frame 174 thereby providing a means of aligning the holes in the cards with the ends of the card sensing brushes to be described hereinafter.

Other details of the card carriage will be described hereinafter in connection with the mechanisms which may have certain essential parts actuated or controlled by parts mounted on the carriage, such as the escapement, tabulating, and carriage return mechanisms.

X. Escapement mechanism

Figure 8:
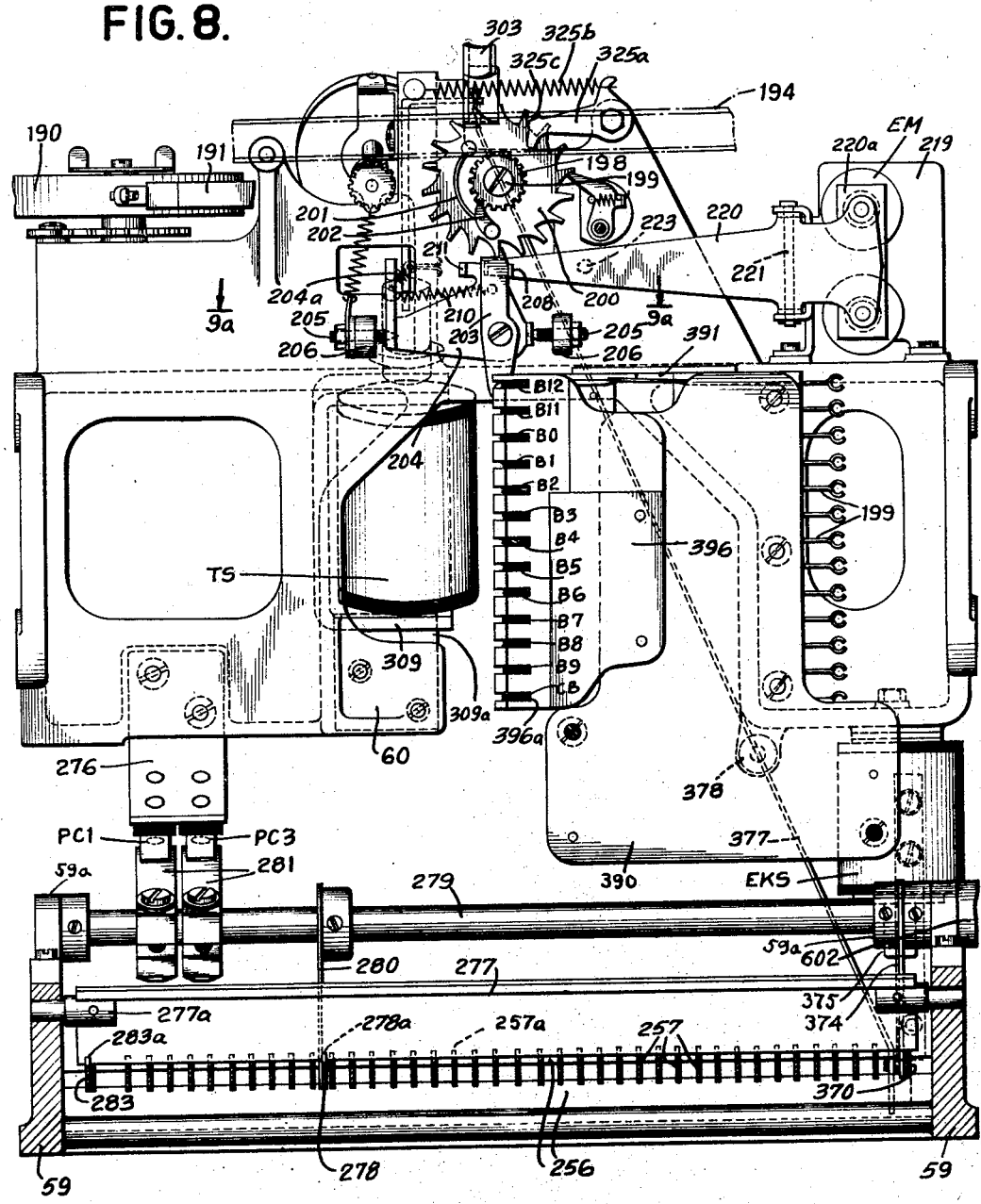
Fig. 8 is a front elevation of the card sensing mechanism and carriage escapement mechanism.

The carriage 174 is fed from right to left (Figs. 1, 2, and 6) step-by-step under control of suitable escapement mechanism of a conventional type. The escapement mechanism is best shown in Figs. 8 and 9. The carriage 174 is normally urged to the left by means of a spring motor 190 of conventional form (Figs. 2, 6, 8, and 9) mounted on top of frame 60 and connected to the carriage frame by means of a tape 191. The tape is anchored to a stud 192 screwed into a hole in a boss formed in the frame 174 near its right hand end.

Pivotally mounted on lugs 174a, 174b one at each end of frame 174 are L-shaped brackets 193 (Figs. 3, 4, 5, 29, 31, and 32) which support a rack 194 having gear teeth cut on its lower edge.

Figure 5:
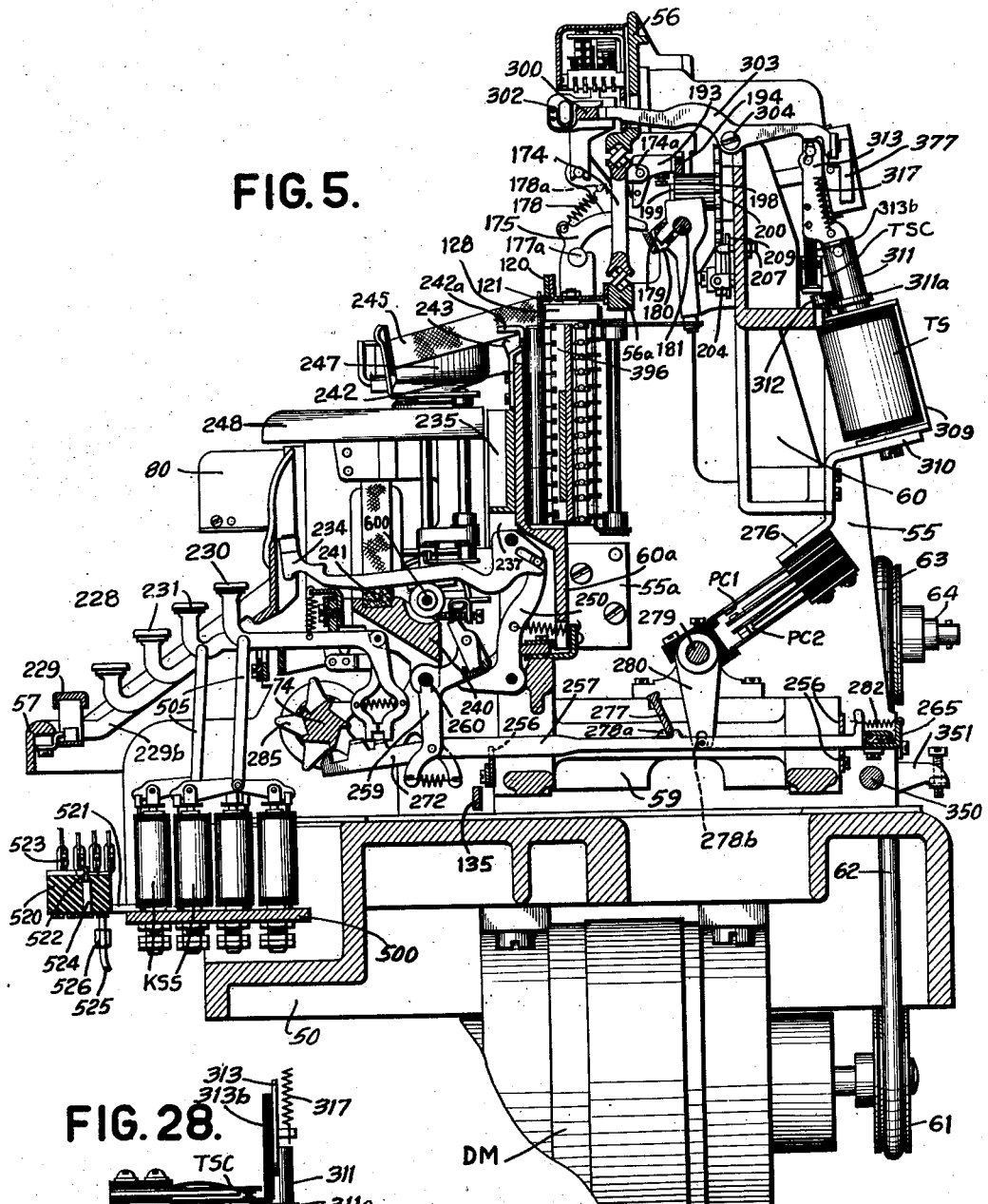
Fig. 5 is a vertical section on the line 5—5 in Fig. 1.

Springs 195 connected to the downwardly projecting arms of levers 193 and a pin 196 carried by frame 174 and to the pin 178a, respectively, normally hold the arms 193 and rack 194 downwardly with the lower arm of the right hand lever 193 abutting an adjustable stop stud 197 carried by frame 174. Normally rack 194 meshes with the upper side of a wide pinion 198 (Figs. 5, 8, and 9) rotatably mounted on a stud 199 carried by frame 60 (Figs. 5, 8, and 9). Also rotatably mounted on pin 199 directly behind pinion 198 is an escapement ratchet 200 which is connected to pinion 198 for driving purposes by means of a pawl 201 pivotally mounted on studs carried by ratchet 200. The pawl 201 is pressed into contact with the teeth in pinion 198 by means of a bow spring 202 socketed in a hole in a stud riveted to ratchet wheel 200.

Since the spring motor 190 tends to move the card carriage to the left, the rack 194 tends to rotate pinion 198 in a counterclockwise direction (Fig. 8) and this tendency is communicated to ratchet 200 by pawl 201. Movement of the ratchet 200 is controlled by an escapement including a pawl 203 pivoted on a rocker plate 204. The latter is pivoted on the conical ends of screw studs 205 carried by lugs 206 in frame 60 (Figs. 9 and 9a) whereby the plate may be rocked forwardly from a normal position in which the plate abuts an adjustable stop 207 carried by frame 60 (Fig. 5), a spring 204a holding the plate against the stop 207. Pawl 203 normally lies in the path of the teeth on ratchet 200 and the tendency of said ratchet to rotate causes said pawl to be forced against a stop lug 208 formed in plate 204 thereby normally preventing rotation of the ratchet and movement of the carriage to the left.

When plate 204 is rocked forwardly, a lug 209 (Fig. 5) similar in shape to the end of pawl 203 and formed in plate 204 directly behind pawl 203, engages the tooth which said pawl engages before the latter is fully disengaged from said tooth. A spring 210 (Fig. 8) connected to pawl 203 and plate 204 then rocks said pawl to the left against a stop lug 211 similar to lug 208. When the end of the pawl 203 engages lug 211 the pawl clears the teeth of the ratchet wheel 200 but the lug 209 still prevents movement of ratchet 200. When the plate 204 rocks back to its normal position, pawl 203 moves into the path of the next tooth of ratchet 200 before lug 209 clears the teeth of said ratchet. When lug 209 finally clears ratchet 200, the latter will be permitted to rotate one tooth space to force pawl 203 back against lug 208, the spring 210 being considerably weaker than the spring motor 190 thereby permitting such action. It is plain that one complete oscillation of plate 204 forward and back will cause ratchet 200 to turn the angular distance between two successive teeth in said ratchet. This movement allows the card carriage to move to the left the distance between two adjacent columns in the cards being printed, or a column space as it may be aptly termed.

Each time plate 204 rocks forwardly certain contacts are operated which will be termed the escapement contacts since they are operated every time the escapement mechanism is actuated. Pawl 203 (Fig. 9a) has a pin 224 extending rearwardly, through a hole in frame 60, to the right of a lug formed in a lever 225 and bent downwardly at right angles to the plane of said lever which is pivoted on top of a horizontal rib in frame 60. A lug formed in lever 225 extends upwardly and carries a pin 226 of insulating material. Pin 226 extends in front of the left hand free end of the foremost of three spring contact members 227 insulatably mounted on the rear face of frame 60.

These members 227 carry two pairs of contacts designated EC1, EC2 which are the escapement contacts mentioned above. Normally contacts EC1, EC2 are kept closed due to the superior tension of the spring in spring motor 190 but will be opened each time pawl 203 (Fig. 9) is rocked to the left by spring 210 and reclosed when the carriage moves a column space to carry pawl 203 back to its original position. This is due to the fact that when the upper end of pawl 203 moves to the left pin 224 moves to the right (Fig. 9a) thereby permitting pin 226 to move forward. The members 227 are spring biased forwardly but the support straps for the central and rearmost contact members prevent them from following the foremost member when pin 226 moves forwardly. It is plain that contacts EC1, EC2 will open every time the escapement mechanism operates. Thus escapement contacts EC1, EC2 are opened and reclosed each time escapement magnet EM operates the plate 204.

The means for oscillating plate 204 is electrical in nature. Mounted on frame 60 adjacent frame 54 is a magnet coil support frame 219 (Figs. 2, 8, and 9) in which are mounted the coils EM of a bi-polar electromagnet hereinafter to be called the escapement magnet. Magnet EM actuates an armature 220a secured to the right hand end of a lever 220 pivoted on a screw 221 passing through holes in vertically aligned lugs formed in both the frame 219 and lever 220. Lever 220 extends to the left (Figs. 8 and 9) behind plate 204 and, when the magnet EM is energized, the plate 204 is rocked forwardly against the tension of spring 204a. A spring 221 connected to the back of lever 220 and to a pin 222 normally holds lever 220 against an adjustable stop 223 on frame 60.

XI. Keyboard

The machine may be manually controlled by means of a keyboard which is generally designated 228 in Figs. 1 to 5 and comprises a space bar 229, character keys comprising numerical keys 230 and letter keys 231, a tabulating key 232, and an eject key 233. The arrangement of the character keys is substantially the same as in standard typewriter keyboards. Space bar 229 controls the escapement mechanism to cause the card carriage to move one column space to the left each time said bar is depressed. Numerical keys 230 control printing of the numerals 0 to 12 on the card while the letter keys 231 control printing of the letters A to Z. The tabulating key 232, as usual in typewriting machines, controls the tabulating mechanism by means of which the card carriage is caused to move a plurality of columns in which printing of data is not desired. The eject key 233, when depressed, initiates an eject cycle during which a finished card is placed or "ejected" into hopper 77 and the next punched card brought into position between arms 175, 176 on the card carriage. During the eject cycle the card carriage is also drawn to the right by carriage return mechanism to bring the carriage back to starting position. The various mechanisms controlled by the space bar 229 and keys 230 to 233 will be described hereinafter at the proper points.

XII. Printing mechanism

Printing of letters and numerals along the upper edge of the card is effected by means of a series of type bars 234 of more or less conventional form which are operated by the actuator 74 under control of keys 230, 231. Type bars 234 are pivotally mounted in a segment 235 secured to the front face of the offset portion of frame 60a mounted on frames 54, 55. Only two of the type bars 234 appear in Fig. 2 and only one in Figs. 5 and 7 in order to show more clearly certain parts beneath or adjacent the type bars. The latter are pivoted to segment 235 in a manner well known in the typewriter art, that is, the lower edge of the segment is arcuate in contour and provided with slots 237 (see Figs. 1, 5 and 7), radial of the center of curvature of the lower edge of segment 235, in which slots the type bars are pivoted by means of a curved wire or rod 238 mounted in a groove cut in the rear face of segment 235 and concentric with the lower edge of said segment. The wire 238 is removably held in place by means of suitable screws not shown. A segment of the type shown is sometimes called a "wire segment" because of the manner in which the type bars are pivoted to the segment.

Each type bar has a type head 239 (Fig. 7) on which is embossed or swaged a single type character. Normally the type bars 234 lie in a substantially horizontal position and are supported by a frame 240 (Fig. 5) carried by frames 54, 55. Frame 240 has its upper part curved concentrically with the lower edge of the segment 235 and secured in a groove or channel in this curved part of frame 240 is a rebound pad 241 of any suitable construction upon which pad the type bars rest. This pad reduces noise and prevents rebounding of the type bars when they are restored.

The type bars, as usual in the typewriter art, swing in an arc of a circle of approximately 90°, when operated in the manner hereinafter described, to strike the upper edge of the card at a point directly in front of platen 128. The striking position is shown by broken lines in Fig. 7. In order to secure accurate alignment and spacing of the printed characters, there is secured to the front face of segment 235, adjacent the upper edge, a type bar guide 242 (Figs. 1, 2, 5, 7, 23, and 24) which is bifurcated at 242a to guide the type heads 239 when they strike the card. A leaf spring 243 is secured to the front of the upper end of frame 60a and serves to reduce shock, minimize noise, and ensure that sticking of the type bears in guide 242 cannot occur.

The guide 242 also has two rearwardly bent lugs 242b supporting a ribbon guide 244 (Figs. 1, 5, 7) which guides the inking ribbon 245. The latter is wound on two spools 246 (Figs. 1 and 2) rotatably mounted in housings 247 carried by plates or covers 248 secured to frames 54, 55. The type heads always strike on the lower edge of the ribbon immediately above the space between the bifurcations 242a in guide 242.

Figures 7, 7A:
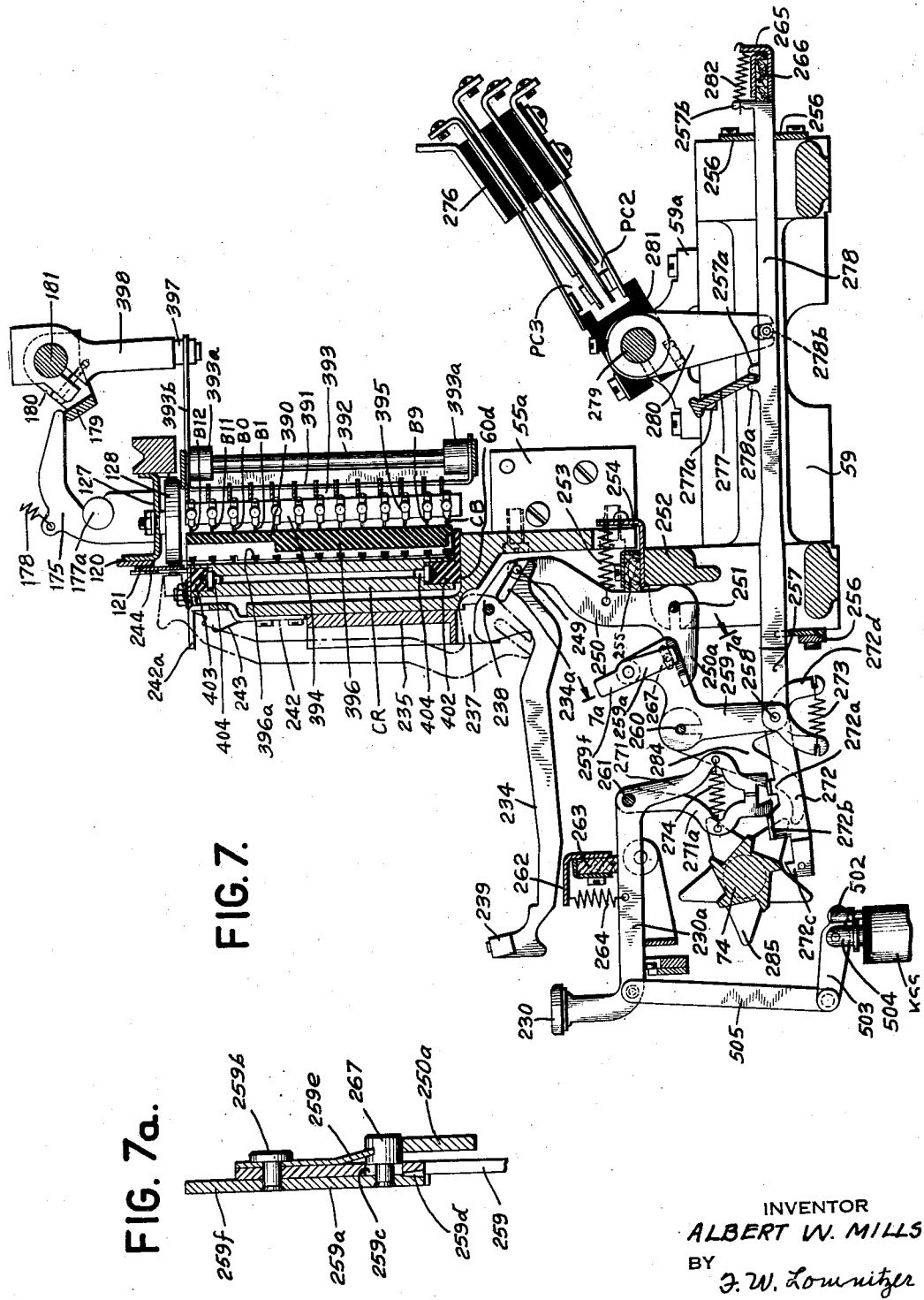
Fig. 7 is a large scale vertical section showing the keys, type bar operating mechanism, and card sensing mechanism.
Fig. 7a is a vertical section on the line 7a—7a in Fig. 7.

Each type bar 234 is slotted at 234a as shown in Fig. 7 to receive a pin 249 carried by one arm of a type bar operating sub-lever 250. The sub-levers 250 are pivoted on a wire 251 laid in a horizontal straight groove cut lengthwise of a cross piece 252 forming part of frame 59, each sub-lever 250 being mounted in a vertical slot cut in cross piece 252. Springs 253, each anchored to a lever 250 and to an angle strip 254 secured to cross piece 252, hold sub-levers 250 against the edge of a strip of "Bakelite" or similar material 255 secured to the top of angle strip 254 by the screws which secure said strip to said cross piece. The strip 255 helps to prevent rebound of sub-levers 250 and their associated type bars and also makes these parts operate quietly.

The vertical arms of sub-levers 250 carrying the pins 249 vary in length and are bent to right or left of the planes of the horizontal arms to compensate for the varying heights of the type bars 234 above cross piece 252 due to the curved shape of the lower edge of segment 235 (see Fig. 10b). Obviously counterclockwise movement of any sub-lever 250 (Fig. 7) will cause the associated type bar 234 to be rocked in a clockwise direction due to the camming effect of pin 249 on the walls of the slot 234a in the type bar.

Slidably mounted in three combs 256 supported by frame 59 is a plurality of slide bars 257, the forward ends of which are pivoted at 258 to the vertical arms of bell cranks 259. The latter are pivoted on a wire 260 secured in a horizontal groove cut in frame 240 and mounted in vertical slots cut in the frame 240. The wires 251 and 260, like the wire acting as pivot for type bars 234, are held in their respective slots by suitable screws. The above described method of mounting type bars 234 and levers 250, 259, greatly facilitates assembly, repair or replacement of the type bars and levers.

The key levers 230a to 233a of keys 230 to 233 are pivoted in frame 240 by means of a wire 261 (Fig. 7), said space bar and keys being mounted in the same slots which receive levers 259 (see Fig. 5). Secured to the front of frame 240 is an angle bar 262 (Fig. 7) and "Bakelite" strip 263 like the angle bar 254 and strip 255. Anchored to angle bar 262 are springs 264 attached to the key levers 230a to 232a. Similar springs are attached to two arms or levers 229a, 229b of a bail supporting the ends of space bar 229. Springs 264 normally hold the key levers and space bar arms 229a, 229b against the strip 263, which acts as a sound deadening adjustable stop, and said springs return the keys to normal position after being depressed. A similar angle strip 265 is secured to the rear edges of frames 54 and 55 and carries a "Bakelite" strip 266 acting as a stop for the bars 257, against which strip the rear ends of said bars normally abut.

Each lever 259 has a rearwardly and upwardly extending arm 259a on which is mounted a pin 267 which overlies and is in contact with the forwardly extending arm 250a of one of the sub-levers 250. When a slide bar 257 is drawn forward, that is, to the left (Figs. 5 and 7), its associated lever 259 will be rocked clockwise thereby rocking the associated sub-lever 250 counterclockwise, and the operated sub-lever 250 will in turn propel the corresponding type bar toward printing position. There is a bar 257, a lever 259, a sub-lever 250, and a type bar 234 associated with each of the keys 230, 231.

Slide bars 257 are operated by power derived from the actuator 74 and for that purpose may be selectively coupled to said driver by means of keys 230, 231. The actuator 74, as shown in Figs. 5, 7, 10a, and 10b, is shaped in section like a ratchet wheel having five teeth and closely resembles a straight reamer with five flutes in general appearance. It constantly rotates in bearings carried by frames 54, 55 and extends crosswise of the machine almost directly in front of the forward ends of slide bars 257 and beneath all the key levers 230a, 231a.

Each key lever 230a, 231a has a downwardly extending arm 271 (see Fig. 7). Pivoted to each slide bar 257 at 258 is an operating hook 272 having two bent-over lugs 272a, 272b, a hook shaped portion 272c, and an arm 272d. A spring 273, connected to each arm 272d and an extension of lever 259, normally tends to rock each hook 272 clockwise to hold lug 272a against the lower end of one of the arms 271. When the operating hooks 272 are in this position, both the lugs 272b and the hook portions 272c are clear of the ribs formed by the flutes in the actuator 74.

Associated with each arm 271 is a second arm 271a which is pivoted on arm 271. Both arms 271, 271a of each key are notched at their extreme lower ends to provide a recess which confronts the lug 272a immediately below. Arm 271a extends slightly further downwardly than arm 271. A spring 274 connected to both arms 271, 271a tends to draw said arms toward each other to hold a bent-over lug in arm 271a in contact with a projecting part of arm 271.

When a numerical key or letter key is manually depressed, its arm 271 moves rearwardly (or to the right in Fig. 7) until arm 271a catches on the front edge of lug 272a and is stopped. This creates a space into which lug 272a slips, thereby releasing the associated operating hook 272 which will then be rocked slightly clockwise by its spring 273. As a result the hook portion 272c will slip into one of the flutes or grooves in actuator 74 and eventually will be positively engaged by a rib. As the actuator continues its rotation, the operating hook 272 and its slide bar 257 will be drawn to the left thereby operating the type bar corresponding to the selected key to print the selected letter or numeral on the top edge of the card.

During movement of the selected operating hook to the left, its lug 272b will be carried into the path of the next succeeding rib on the actuator 74 and will be engaged by such rib with the result that the operating hook will be gradually cammed out of engagement with the actuator, this action occurring after the type bar has moved approximately 45°, so that the actual impression on the card is made with a hammer blow due to inertia of the type bar.

Also, while operating hook 272 is moving to the left, arm 271a will be pushed forwardly or to the left by lug 272a to a position slightly beyond the normal position of arm 271a. When the hook is cammed downwardly due to lug 272b engaging a rib on the actuator, arm 271a will be freed from the lug 272b and be drawn by its spring 274 back into engagement with arm 271 and will then occupy a position above lug 272a, which at this time will have been displaced to the left the maximum distance.

Assuming that the selected key has been promptly released by the operator, spring 253 will now restore arms 250, 259, slide bar 257, and hook 272 to the position of Fig. 7. While hook 272 is moving to the right, lug 272a will pass underneath the lower end of arm 271a which will, by engaging said lug, prevent reengagement of hook portion 272c and lug 272b with the ribs on the actuator 74. When the hook 272 arrives in the position of Fig. 7 the lug 272a will slip off the end of arm 271a and rise slightly to resume its position behind the arm 271a and abutting the end of arm 271.

If the operator should hold a key down too long, either deliberately or by failure to promptly remove his fingers from the keys, or if sticking of the parts should prevent prompt return of the selected key to normal position, arm 271a, when freed from lug 272a, will be drawn by spring 274 to the right of the normal position of arm 271a. In this position arm 271a will overlie lug 272a and hold the hook 272 out of engagement with the ribs of the actuator 74 when said hook is almost fully returned to its normal position.

Upon release of the key, it will be moved by its spring 264 back to the position of Fig. 7, lug 272a rising to its normal position behind the lower end of arm 271a when the key reaches its normal position.

The purpose of arm 271a is to prevent repeated operation of a type bar in case a key is held down too long, or slight sticking may make the keys sluggish in returning to normal position. This result is obtained by making arm 271a slightly longer than arm 271 and by making the recess formed by the notches in the ends of arms 271, 271a when said arms are in normal position too small to ordinarily receive lug 272 so that the arms must be moved apart far enough to expand the recess sufficiently to allow the lug 272a to enter such recess. Obviously the only time the recess can be expanded is when arms 271, 271a are in the normal position of Fig. 7 with lug 272a behind the lower end of arm 271a.

It is customary in typewriting mechanisms to propel the type bars positively to a predetermined point in front of the platen and then permit the type bar to move the remaining distance by virtue of the kinetic energy stored therein by the propelling means which, in the present case, is the power actuator 74, the object being to effect the impression of the type by percussion in order to produce a clear impression. The point at which kinetic energy takes effect is variable in commercial machines and depends largely upon such factors as the mass of moving parts such as the type bar and other parts in the train of operating connections. As a general rule, the type bar is positively driven through 85% or 90% of its stroke and the remaining 10% or 15% is effected solely by the kinetic energy stored in the type bar, the propelling means ceasing to control the type bar during the period in which it is under the influence of kinetic energy. While the point at which kinetic energy takes effect is variable in different machines, for the same machine it is approximately constant for all type bars.

Owing to the fact that it is necessary to make the sub-levers 250 of graduated lengths and also to bend them toward the segment, it is necessary to use separate blanking and forming dies for each individual sub-lever. Naturally, even with precision manufacture of the sub-levers, type bars, and other parts in the train of operating connections, small inaccuracies occur, particularly in the sub-levers, which have the effect, in the assembled machine, of causing variations in that portion of the stroke of the type bar which is effected positively. In other words, the type bar actuating means is likely to move the type bars different extents before relinquishing control of the type bars for further movement thereof by virtue of kinetic energy stored therein. This means that the point at which kinetic energy takes effect to complete the stroke of the type bars is different for each type bar and is dependent upon such inaccuracies of manufacture as may be present in the type bars and their operating connections.

Another fact of importance is that the areas of the type faces vary considerably whereby, to produce clear impressions, it is desirable that the type bars strike the platen with a force which is commensurate with the area of the type face; otherwise, the characters of small area will tend to emboss the paper or card in front of the platen whereas the characters having a large area of type face may receive only enough impulsive force to cause them to print clearly. In commercial machines, the point at which kinetic energy takes effect to complete the stroke of the type bars, while variable for different makes, is predetermined by design of the type bars and operating connections so that all type bars strike so heavily as to make the impressions uniform. In other words, some type bars will receive an excessive impulsive force in order that the impressions may be uniform, the object being to cause the type bars to strike with such force as to obliterate any tendency to produce non-uniform impressions. As a result, many type bars operate more noisily than others and have a tendency to emboss the work sheet, which, in the present machine, is a card.

In order to compensate for the variations in the length of the sub-levers 250, made necessary by the fact that the type bars 234 are located on different levels, and for inaccuracies of manufacture, and at the same time to minimize the noise of impact on the type bars on the card, means is provided whereby the stroke of the type bars under the influence of the power operating mechanism may be adjusted after the machine has been assembled. The adjustment of the stroke of the type bars is effected by movably mounting the pins 267 on the levers 259 whereby the radial distances of the pins 267 from the center of pivot wire 260 may be varied commensurately with the length of the associated sub-levers 250, any inaccuracies that may be present in the train of operating connections between the associated type bar and the power mechanism, and in accordance with the type face area of the character carried by the type bar. For the purpose of adjusting the radial distance of each pin 267 from center of wire 260, the pin is mounted upon an arm 259a (Figs. 7 and 7a) which is pivoted to the lever 259 by means of a rivet 259b. The pin 267 extends through an arcuate slot 259c formed in the lever 259 whereby the arm 259a may be rotated so as to move the pin 267 radially of the wire 260. In order to retain the arm 259a in its adjusted positions, the lower end of the arm 259a is serrated as at 259d and the lever 259 is correspondingly serrated to interlock with the serrations in the end of arm 259a. The pin 267 has a slot cut in the upper side thereof receiving the notched end of a leaf spring 269e (Fig. 7a) which is loosely secured to the opposite side of the lever 259 to the arm 259a by means of rivet 259b. By moving the lower end of arm 259a to the left in Fig. 7a sufficiently far to disengage the serrations 259d thereon from the serrations in lever 259, the arm 259a may be rocked either clockwise or counterclockwise to decrease or increase, respectively, the stroke of the associated type bar 234. It is obvious from Fig. 7 that moving the pin 267 toward the wire 260 will shorten the radial distance from the center of wire 260 to pin 269 and thereby shorten the stroke of the type bar 234. On the other hand, if the pin 267 is moved to the right in Fig. 7, the radial distance from wire 260 to said pin will be increased and a longer stroke will be produced in the type bar. In other words, moving the pin 267 to the right or left will have the effect of changing the driving ratio between lever 259 and the arm 250a of sub-lever 250.

It will be noted that the rotation of the arm 259a on the rivet 259b will have an inconsequential effect upon the normal position of the type bar because the edge of the arm 259a which contacts with the pin is tangent to the arc of a circle containing the point of contact of pin 267 with said arm and with its center in the axis of rivet 259b. Any slight tendency for rotation of the arm 259a to affect the normal position of the type bar 234 may be prevented by making the upper edge of arm 259a curved to correspond to an arc of a circle generated by the point of contact of pin 267 with the arm 250a when arm 259a is rotated. The arm 259a is formed with a tab 259f which extends upwardly and provides a means whereby the arms 259a may be adjusted with a suitable tool after the machine has been assembled.

The types 239 strike the upper edge of the card directly in front of platen 128. In order to prevent binding of the card during its movement past the platen it is necessary to so space the guides that the card is slightly loose and capable of a slight vertical movement above the shoulders 60c in frame 60a. As this looseness would cause uneven alignment of the characters printed on the edge of the card, means is provided to yieldingly press the card firmly on the shoulders 60c without binding or hampering free movement of the card in its movement from right to left.

This means is shown in Figs. 6 and 27a and consists of a pair of pressure shoes 275 which have the general shape of bell cranks and are pivoted behind bar 120 on each side of the type guide 242. The means for securing strips 121 to bar 120 is modified as shown in Fig. 27a for the purpose of providing pivots for the shoes 275. Instead of a rivet, a shouldered stud 121d is used to secure the innermost ends of strips 121 to the bar 120 on each side of the guide 242 and for each stud a double shouldered washer 121e is provided instead of an oval spring washer. Each shoe 275 is pivoted on one of the shoulders of the washer while the other shoulder projects into the shallow space made in bar 120 in the process of forming the bosses. Nuts 121f and washers 121g clamp the strips 121 and washers 121e to bar 120 but the shoulders carrying shoes 275 are wide enough to permit the latter to pivot freely.

One of the arms of each shoe is connected with an arm of the other by a spring 275a while the other arms project toward each other and have forwardly bent beveled lugs which project through cut-away portions of the bar 120 and overlie the top edge of the card. The effect of spring 275a is to cause the shoes to press the card down lightly on the shoulders 60c thus ensuring that the card will not bounce vertically due to vibration of the machine or the impact of the type bars.

The movement of slides 257 is utilized to operate certain contacts which control the escapement magnet EM and other contacts which have special functions. Three sets of contacts designated PC1, PC2, PC3 are provided and are mounted on a bracket 276 secured to frame 60 (Figs. 5 to 8). These contacts are constructed in a well known manner and consist of pairs of flat spring members provided with contact points and spaced from each other and bracket 276 by means of flat strips of insulating material. Contacts PC1, PC3 are normally open while contacts PC2 are normally closed. Contacts PC1, PC2 are mounted in superposed relation on the left hand side of bracket 276 while contacts PC3 are mounted on the right hand side (see Figs. 6 and 8).

A long blade 277 (Figs. 6 and 8) extends crosswise of all the slides 257 and is pivotally mounted in frame 59 by means of trunnions 277a. Each slide 257 has a rounded lug 257a (Figs. 5 and 7) engaging the lower edge of blade 277 whereby movement of any slide during the printing operation causes blade 277 to rock clockwise (Fig. 7).

A slide 278 (Fig. 8) is guided by combs 256 between two of the slides 257 and has two lugs like the lug 278a (Fig. 7) engaging both sides of blade 277 whereby slide 278 is moved forwardly in unison with any slide 257 which may be operated. A shaft 279 is journaled in pillow blocks 59a mounted on frame 59 and carries a downwardly projecting arm 280 having a slot embracing a pin 278b on the slide 278. Thus shaft 279 is rocked clockwise (Fig. 7) whenever any slide 257 is drawn forwardly during the printing operation. Secured to shaft 279 is a pair of blocks 281 of insulating material, each block being slotted and provided with a clamping screw to adjustably secure it to the shaft. The blocks are also provided with rectangular slots or recesses so as to form two rearwardly projecting lugs in each block which lugs project underneath and support the free ends of the longer blade of each pair of contacts PC1, PC2, PC3. The lower lug of the right hand block 281 is superfluous and has no function. It is clear that each clockwise movement of shaft 279 caused by operation of any slide 257 will effect closure of contacts PC1, PC3 and opening of contacts PC2.

Springs 282, anchored to lugs 257b formed in slides 257 and the angle strip 265, tend to restore slides 257 to the position of Figs. 5 and 7. As there is danger of some of the parts, such as the slides 257, sticking due to gummy oil, dirt, and other causes, positive means is provided to restore the slides 257 and hooks 272 to normal position after each impression.

A slide 283 is guided by combs 256 adjacent frame 55 (Figs. 8 and 10a) and is similar in shape to the slides 257 but has a lug 283a in front of blade 277 as well as behind said blade. The slide 283 has a spring 282a anchored to angle strip 265. At its forward or left hand end (Figs. 5, 7, and 10a), slide 283 is pivoted to a gooseneck lever 284 pivoted on the wire 260. The gooseneck lever normally clears the lobes of a star cam 285 mounted on the left hand end of actuator 74 and having as many lobes as there are ribs in said actuator.

When any slide 257 is drawn forward during a printing operation, slide 283 is moved in unison with the operated slide, thus forcing the rounded nose of gooseneck lever 284 between two of the lobes of cam 285. The gooseneck lever is mounted in such a relation to actuator 74 that one of the lobes of the star cam will barely touch the gooseneck lever at about the time the operated hook 272 is freed from the actuator by the engagement of one of its ribs with the lug 272b of the operated hook. Normally the springs 253, 282, 282a and the resiliency of the blades of contacts PC1, PC2, PC3 will cooperate to restore the operated hook 272, its slide 275, slides 278 and 283, gooseneck lever 284, and shaft 279 to normal position, the gooseneck lever 284 being withdrawn from cam 285 without being positively actuated by such cam. If any of the parts connected to slides 257, 278, 283 should stick or be sluggish in restoring under the influence of the above mentioned springs, the gooseneck lever 284 will be engaged by one of the lobes of cam 285 and slide 283 will be forced to the right (Fig. 10a) thus positively restoring the slide 278 and the operated slide 257 to their normal positions.

XIII. *Tabulating mechanism*

The operation of the tabulating mechanism may be initiated by depression of key 232 and is controlled electrically by both the key and by column stops settable at the proper points on a stop bar mounted on the carriage and designated 300 in Figs. 1, 2, 5, 6, 13, 21, 29, 31, and 32. The ends of the bar are supported by the shouldered ends of screw studs 174k threaded into holes in the ends of the frame 174 and locked by clamping screws 174m, the frame 174 being slotted adjacent screws 174m as shown in Figs. 29 and 32 to enable screws 174m to clamp the studs 174k. This permits longitudinal adjustment of the bar to compensate for slight inaccuracies of the assembled parts. As the bar would be likely to turn on the conical points of the screw studs 174k, there is provided a plate 301 best shown in Figs. 29, 31, and 32, having a rectangular notch which fits snugly in slots cut in opposite sides of bar 300 near its left hand end. The other end of the plate 301 has a vertical slot which embraces the end of a stud 174m carried by frame 174. A screw 301a, threaded into the lower of a pair of lugs formed in plate 301, clamps said plate securely to the bar 300. Plate 301, and hence bar 300, is thereby prevented from turning without interference with longitudinal adjustment of bar 300 when necessary.

Bar 300, as usual in typewriting machines, is provided with slots on the upper and lower sides, there being a pair of vertically aligned slots for each column of the card. In these slots may be set column stops 302 which may have the same general shape as others now in common use in typewriters, differing only in certain details to adapt them for use in the machine described herein. Affixed to the front of bar 300 is a suitable numerical scale to indicate the columns on the cards with which the pairs of slots correspond or, if desired, the scale may be directly engraved or embossed on bar 300. Stops 302 are somewhat longer than is usually the case and extend rearwardly of the bar 300 (see Fig. 21) to provide stop portions 302a which are adapted to cooperate at the proper time with a stop finger 303 pivoted at 304 to frame 60 (Figs. 5, 9, 13, and 14). Normally the forward end of lever 303 occupies a position directly behind bar 300 and between the lines of travel of the stop portions 302a in stops 302.

Stop finger 303 extends through a large opening in frame 56 and a rectangular slot 305 (Fig. 20) cut in a contact supporting frame 306 secured to the face of frame 56. Slot 305 is long enough and wide enough to permit the free end of finger 303 to move vertically into the path of one of the upper stop portions 302a and also, when struck by said stop during movement of the carriage to the left, to permit finger 303 to move to the left a slight amount relative to frames 56 and 306.

This latter movement is utilized to operate two pairs of contacts TEC and SC (Figs. 2, 4, and 13), called the tabulating escapement and stop contacts, respectively, which are mounted on the left-hand side of frame 55. A rod 307 (Fig. 13) is slidably mounted in grooves cut in lugs formed in frame 56 and carries on its left-hand end a button of insulating material, while the right hand end of rod 307 abuts the forward end of finger 303. Rod 307 is loosely held in the left-hand slot in frame 56 by the presence of frame 55 and in the right-hand slot by the head of a screw 308. Each time a stop portion 302a strikes the free end of finger 303 the latter will be forced to the left (Fig. 13) against the left wall of slot 305 pushing rod 307 to the left to close contacts TEC and SC.

The stop finger 303 may be rocked in a vertical plane by means of a tabulating solenoid mounted on frame 60 (see Figs. 2, 3, 5, 8, 9, and 14). The tabulating solenoid includes a coil TS, a U-shaped frame 309 supporting the coil TS and mounted on a bracket 310 secured to frame 60, and a plunger 311 slidably mounted in coil TS and the frame 309. A flange 311a is formed in plunger 311 and cooperates with the head of a stud 312 screwed tightly into frame 309 and with said frame to limit movement of the plunger in coil TS.

Pivoted to the upper end of plunger 311 is a link 313 (Fig. 14) which extends vertically and is slotted to hook over a headed stud 314 riveted to a frame 315 pivoted at 316 to frame 60. A spring 317, anchored to frame 60 and a pin on link 313, normally holds link 313 in the position of Figs. 5 and 14 with the flange 311a engaging the head of stud 312. The upper end of link 313 is provided with a bent-over lug 313a upon which rests the rear end of stop finger 303, a light spring 318 attached to a pin on frame 60 and the rear end of finger 303 holding the latter in contact with lug 313a.

Frame 315 preferably is formed from a single stamping and is provided with ears supporting a governor 319 which may be of a form well known in the typewriter art. The front end of the shaft 320 of governor 319 is journaled in a lug formed in the front end of frame 315 and is provided with a pinion 321 located beneath rack 194 but normally just out of mesh with such rack. A spring 322, superior in tension to spring 318 and attached to a tab formed in the front end of frame 315 and to frame 60, normally holds the frame 315 in the position of Figs. 5 and 14, with stud 314 in the upper end of the slot in link 313.

Solenoid TS may be controlled either by the tabulating key 232 or by a stop 302 on bar 300. When energized, solenoid TS draws plunger 311 and link 313 downwardly thereby rocking frame 315 clockwise (Fig. 14), lifting pinion 321 into engagement with rack 194, thereby raising the latter a distance sufficient to disengage it from the escapement pinion 198 (Fig. 5). Spring 318, acting on the rear end of stop finger 303, causes said finger to rock clockwise in response to downward movement of link 313, thereby elevating the forward end of the stop finger 303 into the path of the upper lugs 302a of the stops 302. The parts are so proportioned that finger 303 will move into the path of a lug 302a before rack 194 clears pinion 198. When the last named movement takes place, the spring operated drum 190 and tape 191 become effective to draw the carriage to the left (Fig. 2) until the upper stop portion 302a of a stop 302 strikes stop finger 303 and moves the latter to the left a slight amount thereby closing contacts TEC and SC. The carriage is thus arrested in its leftward movement and closure of contacts SC, as will be explained hereinafter in connection with the wiring diagram, effects deenergization of the coil TS. This permits the parts to return to normal position, pinion 198 reengaging rack 194 before stop finger 303 is fully released from the stop portion 302a of the column stop now abutting said stop lever.

The key lever 232a of tabulating key 232 (Fig. 12) has a downwardly extending arm 232b provided with a headed pin 232c working in a slot formed in a horizontal link 323. A spring 323a, connected to a lug formed in link 323 and the pin 232c on arm 232b, holds the pin in the righthand end of the slot. The rear end of link 323 is pivoted to the plunger 324 of a solenoid mounted on a shallow recess cast in base 50, the frame 325 supporting the coil TKS of the solenoid being secured to base 50 adjacent the recess. Link 323 has an upwardly and rearwardly extending portion provided with two pieces of insulating material 323b abutting the ends of the longer blades of two sets of contacts TKC1, TKC2, hereinafter to be termed the tabulating key contacts. When the key 232 is depressed manually, both sets of contacts close. This result can also be secured by energizing coil TKS. The solenoid TKS will be termed hereinafter the tabulating key solenoid. Solenoid TKS may be initially energized under control of one of the column stops 302 as will be explained later in connection with the wiring diagram.

XIV. Rebound mechanism

It has been found by experience that the carriage has a tendency to rebound while it is being fed by the escapement mechanism and this is particularly the case when the stops 302 are arrested by the stop finger 303. In order to prevent rebound there is provided a simple rebound mechanism which includes a rebound pawl 325a (Figs. 6, 8, and 9) pivotally mounted on frame 60. This pawl is operated by a spring 325b attached to an ear formed in the pawl and a pin on frame 60. The pawl has a bent-over lug 325c engaging ratchet teeth 325d formed in the top edge of rack 194. There are as many teeth 325d as there are teeth in the lower edge of rack 194 adapted to engage pinion 198.

As is usual in typewriting machines, the finger 303 will engage a stop 302 and arrest the carriage 174 about halfway between two successive columnar positions and at this point the lug 325c will drop behind a tooth 325d and prevent rebound of the carriage to the right. This is to ensure that rack 194 will remesh with pinion 198 properly and avoid the possibility that a tooth in rack 194 might engage point-to-point with a tooth in pinion 198 and be liable to pass by the active tooth in pinion 198 when finger 303 is freed from a stop 302. This action, if permitted to occur during tabulating movement of the carriage, would cause the carriage to stop one column space further to the left than desired.

Thus the combined action of stop finger 303 and the rebound pawl 325a is to positively stop the carriage approximately halfway between two successive column positions.

XV. Carriage return mechanism

After the printing of each card has been finished and it has been gripped by the feed rollers 158, 159, the card carriage is returned to a position to receive an unprinted card. This return movement takes place during an eject cycle and is effected by power. The power driven carriage return mechanism is illustrated in Figs. 3, 6, 10b, 15, 16, and 30.

Screwed into a threaded hole in frame 54 and projecting toward the right (Fig. 15) is a long stud 326. Rotatably mounted on shoulders formed on this stud is a thin walled sleeve 327 to the right hand end of which is secured a gear 328 meshing with gear 149. Obviously gear 328 and sleeve 327 will rotate continuously while the machine is in operation. Loosely mounted on sleeve 327, to the left of gear 328, is a wide pinion 329 to which is secured a ratchet wheel 330. A second pinion 331 is loosely mounted on the shoulders in stud 326 to the right of gear 328 and is integral with a sleeve 332. Preferably pinion 331 and sleeve 332 are formed from a single piece. Loosely mounted on sleeve 332 is a narrow tape drum 333 to which is secured one end of a carriage return tape 334. Secured to the right hand end of sleeve 332 is a double armed member 335 (Fig. 30). Springs 336, anchored to ears formed in member 335 and to pins 337, 337a carried by drum 333, normally hold one of the arms of member 335 against pin 337, with the other arm of said member spaced from the second pin 337a.

The assembly of parts mounted on sleeves 327, 332 is held against axial movement on the stud 326 by means of a split ring sprung into a groove 326a (Fig. 15) in said stud, a loose washer being interposed between said ring and the right hand end of sleeve 332. Stud 326 is drilled longitudinally and radially to provide oil holes which connect the spaces between sleeves 327, 332 and the shoulders in stud 326 with an oil cup 338 screwed into the right hand end of stud 326. A cover 339 is also mounted on the right-hand end of stud 326 and is held in place by the oil cup 338. A throat is moulded or stamped in cover 339 to permit the tape 334 to wind or unwind freely. The tape 334 passes over a pulley 340 (Fig. 15) rotatably mounted on a lever 341 pivoted at 342 (Fig. 6) to the front edge of frame 54 and said tape is secured to the carriage 174 by hooking it over the stud 192 (Figs. 29 and 32).

Gear 328 carries two intermeshing pinions 343 and 344 (Fig. 15) which are rotatably mounted in communicating recesses in the gear on pins supported partly by the gear and partly by brackets 345 fastened to opposite sides of the gear (Figs. 10b and 16). Pinion 343 meshes with pinion 329 while pinion 344 meshes with pinion 331. By this means the pinions 329, 331 and gear 328 are always operatively connected.

Normally the tension exerted by the tape 191 is considerably greater than the friction between the parts assembled on stud 326 so that, with the carriage 174 at rest, drum 333 remains stationary, pinion 344 rolls over pinion 331, and ratchet 330 is thereby driven idly by pinion 343. If the ratchet 330 is positively arrested by means about to be described, pinion 329 will become immovable, pinion 343 will roll about pinion 329, and pinion 344 will drive pinion 331 and drum 333, as the driving force exerted by gear 328 is superior to the force exerted by tape 191. As a result tape 334 will be wound on drum 333 and the carriage 174 will be drawn to the right (Fig. 6).

The stoppage of ratchet 330 is effected by means of a hook 346 (Fig. 16) pivoted at 347 to frame 54 and adapted to engage the teeth of ratchet 330. A long link 348 has a slot embracing a pin 346a on an arm forming part of hook 346 and is pivoted to a bell crank 349 fixed to the right-hand end of a shaft 350 journaled in frames 54, 55

(Figs. 2 to 5, 10a, 10b, and 11). A spring 48a, connected to a pin on link 348 and the pin on hook 346, provides a yielding connection between said pin and link. Secured to the left-hand end of shaft 350 (Figs. 4, 10a, and 11) is a rock lever 351 best shown in Fig. 11. One arm of the lever 351 has an arcuate cam surface 352 normally engaging a pin 353 carried by the three armed lever 110 which, it will be recalled, also carries the eject clutch coupling pawl 117. A bent-over lug formed in the other arm of lever 351 has a stop screw 354 adapted to limit clockwise movement of lever 351 by striking base 50. A spring 349a (Figs. 10b, 15, and 16) normally holds the arcuate cam surface 352 in contact with pin 353 in which position hook 346 is clear of ratchet 330 so that the latter may rotate freely. The spring 349a also tends, through link 348, to engage hook 346 with ratchet wheel 330.

During each eject cycle pin 353 will move in a clockwise direction (Fig. 11) and clear the cam surface 352 after about 70° of rotation of shaft 100 (Fig. 34), thereby permitting lever 351 and shaft 350 to rock clockwise until adjusting screw 354 strikes base 50. This results in drawing link 348 to the right (Fig. 16) permitting the hook 346 to engage ratchet 330 and arrest movement of the latter. As a result the tape 334 will be wound on drum 333 as described, drawing the carriage to the right (Figs. 2 and 6).

Before the carriage can be returned, however, it is necessary to disengage the rebound pawl 325a from rack 194. For this purpose lever 341 extends to the left (Fig. 6) underneath the lugs in said pawl. The initial tensioning of tape 334 causes pulley 340 and the right-hand end of lever 341 to be drawn downwardly against the tension of a spring 341a (Fig. 15) thereby raising the left-hand arm of lever 341 and lifting pawl 325a out of engagement with teeth 325d.

Lever 341 is held in the position just described by means of latch 355 pivoted to the right hand end of lever 341 (Figs. 15 and 16) by means of the stud carrying pulley 340. Latch 355 has a lug 355a and a spring 356, attached to said latch and a bracket 356a secured to frame 54, normally holds the lug 355a against the right hand edge of a bracket 357 secured to frame 54. When the lever 341 is rocked as described lug 355a snaps under the edge of the bracket 357 and holds the lever in rocked position.

A three-armed lever 360 is pivoted on a stud 361 carried by rail 130. Stud 361 projects through a rectangular opening in latch 355 large enough to permit the latch 355 to move the limited amount necessary for latching purposes. One arm 360a of lever 360 projects upwardly to the left (Fig. 15) of a bent-over lug 355b formed in latch 355. Another arm 360b of lever 360 is curved to the left and upwardly to a point near frame 54 and pivoted at this point to arm 360b is a vertical link 362 having a bent-overhook shaped part 363 embracing a stud 346a in hook 346. A spring 364, attached to frame 54 and to the lower end of link 362, holds the lower end of the link in contact with the hub of ratchet 330. A second spring 365 attached to farme 55 and link 362, normally tends to pull the link downwardly.

When the carriage is in the column 1 position, the head of stud screw 366 (Figs. 6, 29, and 31) carried by a lug formed in carriage 174 engages the arm 360a and holds lever 360 in a position with arm 360a engaging lug 355b. In this position of the parts hook 346 is held out of engagement with ratchet 330 and cannot engage the latter even if shaft 350 has not been restored. Also the third arm 360c of lever 360 does not quite engage the head of a screw stud 367 threaded into a stud 368 attached to frame 54 by a nut 369. In any columnar position other than column 1 the parts occupy the position of Fig. 15 in which only the pin 346a in the slot of link 348, by engaging said link at the end of the link, prevents engagement of hook 346 with ratchet 330. When shaft 350 rocks clockwise to initiate a carriage return operation, hook 346 is drawn downwardly into engagement with ratchet 330. This causes link 362 to move downwardly, rocking lever 360 slightly counterclockwise from the position of Fig. 15.

Near the end of the carriage return movement of the carriage, the head of screw 366 will strike arm 360a and rock it clockwise (Fig. 15), disengaging latch 355 from bracket 357, thereby lifting link 362 far enough to disengage hook 346 from ratchet 330. Arm 360c strikes screw stud 367 when the carriage has traveled slightly farther to the right than the column 1 position. This slight overthrow of the carriage ensures that the pawls 202 (Fig. 8) will drop behind the proper teeth of pinion 198 before the returning movement of the carriage ceases. The carriage is drawn back to the column 1 position by the spring drum 190 and tape 191. The screw stud 367, and a stop screw 367a, carried by the left hand end of frame 56 (Figs. 1, 2, 4, and 6), limit movements of the carriage to the right and to the left, respectively.

XVI. Eject key mechanism

An eject cycle may be initiated by depression of the eject key 233. The mechanism controlled by this key is best illustrated in Figs. 8, 10b, and 14.

The eject key lever 233a is provided with a downwardly extending arm 233b pivoted to a horizontal link 370 guided by combs 256. Forwardly of the two rear combs 256 the link 370 has a step or shoulder 370a adapted, when the key 233 is depressed, to permit the link to be drawn downwardly slightly by a spring 370c and lock the key in depressed position by contact with the rear side of the lower rear comb 256. The rear end of the link 370 has another shoulder 370b and also abuts the free end of a hook-shaped coupler or latch 371 pivoted on an arm 372 secured to shaft 350 adjacent frame 54. A spring 373, connected to latch 371 and arm 372, holds the latch in the normal position of Fig. 14 with the nose of the hook portion of the latch bearing against the rear side of angle strip 265.

Link 370 has a pin and slot connection to one arm of a bell crank 374 pivoted on shaft 279. The other arm of said bell crank has a pin and slot connection to the plunger 375 of a solenoid whose coil is designated EKS. The coil EKS is mounted in a solenoid frame 376 secured to frame 60. This solenoid will be termed the eject key solenoid. Obviously energization of solenoid EKS will cause depression of the eject key 233 and movement of link 370 rearwardly to latching position.

When link 370 is moved rearwardly, either by the solenoid EKS, or manually by depression of key 233, the link 370 is latched by its shoulder 370a and also moves latch 371 away from angle strip 265. The subsequent rotation of shaft 350 as described to initiate a carriage return operation causes arm 372 to be depressed, pulling down latch 371 until a shoulder 371a therein slips underneath shoulder 370b of link 370, spring 373 then rocking latch 371 back against the angle strip 265. Near the end of an eject cycle, or after about 300° of rotation of shaft 100 (Fig. 34), shaft 350 starts to return to normal position and, by coaction of latch 371 with shoulder 370b, lifts the link 370 far enough to free shoulder 370a from comb 256 and permit the key 233 and link 370 to return to normal position as in Fig. 14. The actual point at which the key 233 returns is somewhat indefinite due to the small size of shoulder 370a and permissible slight variations in the dimensions of the parts permitted by production standards. This does no harm as the last 40° of shaft 100 is mainly idle movement.

Link 370 also has a pin and slot connection to a long lever 377 pivoted on a slotted stud 378 secured to frame 60. Lever 377 extends diagonally upwardly (Figs. 6 and 9) behind frame 60 to a point beneath the rear end of stop finger 303 which has a slotted bent-over lug 303a in the slot of which the upper end of lever 377 is guided, a lug 377a in lever 377 extending into the slot in said lug. The slot in lug 303a is long enough to permit the stop finger 303 to rock clockwise (Fig. 14) as described above, the lug 377a merely guiding the finger 303. When the eject key is depressed the upper end of lever 377 moves into the slot in the finger 303 and, by engagement with the end wall of the slot, obstructs movement of said finger into the path of any of the stops 302. Lever 377 is provided to prevent movement of stop finger 303 during eject cycles.

Secured to the lower end of lever 377 is a block of insulating material 379 (Fig. 14) abutting one member of a pair of contacts EKC which are mounted on frame 376. When the eject key 233 is depressed, block 379 is moved to the right closing contacts EKC. These contacts will be termed the eject key contacts.

XVII. Miscellaneous control contacts

There are a number of special control contacts, not mentioned so far, which will now be described in detail.

The space bar 229 actuates certain contacts called the space bar contacts and designated SBC in Figs. 26 and 35b. These contacts are normally open and are mounted on the left hand end of frame 240. The arms 229a, 229b of the bail which supports the space bar 229 are joined by a stiffening cross bar 229c riveted to said arms. Riveted to arm 229b is a finger 229d carrying at its upper end an insulating button or stud 229e which normally keeps contacts SBC separated. When the space bars is depressed, however, finger 229d moves forwardly and permits contacts SBC to close. These contacts control escapement magnet EM as will be explained more fully hereinafter.

Extending beneath arms 229a, 229b and key levers 230a to 233a, inclusive, is a bail 380 (Fig. 25) pivoted on studs 381 carried by frames 54, 55. A spring 382 connected to a pin at the midpoint of bail 380 and the angle bar 262, normally holds the bail against the lower edges of the key levers. The right hand end of bail 380 has an arm 380a carrying an insulating button bearing against one member of a pair of contacts KIC, hereinafter to be termed the key interlock contacts. Normally spring 382 holds the contacts KIC closed but depression of any key or the space bar 229 causes contacts KIC to open. As will be shown later herein, contacts KIC interrupt the automatic reproducing circuits when printing is being controlled by manual operation of the keys.

The stops 302 on the carriage control a group of contacts to cause certain operations to be initiated or terminated automatically without requiring depression of keys or other manual operations. There are six possible automatic controls which can be effected automatically under control of the stops 302. The respective contacts for these controls are listed below together with their function.

1. Automatic tabulating contacts ATC cause operation of the tabulating mechanism to be initiated at any desired column position of the carriage 174.

2. Predetermined eject contacts PEC automatically initiate eject cycles with the completion of printing operations at any desired column of a card.

3. Single column space contacts SCC have two functions which depend on the setting of a switch SCS (Fig. 35a). In one position of this switch, closure of contacts SCC will cause the carriage to move one column space automatically. In the other position of switch SCS, the machine is so controlled by contacts SCC that if a "11" hole occurs in combination with a hole in any of the other positions of a given column, the "11" hole has no effect so far as printing is concerned.

4. Interpreting stop contacts ISC control the machine to stop automatic printing under control of the holes in the cards in order to permit other data to be printed.

5. Interpreting restart contacts IRC cause automatic restarting of printing operations under control of holes in each card.

The five sets of contacts enumerated above are actuated by stops 302 and are carried by two rows of spring contact members insulatably mounted on a bent over lug 306a (Figs. 20 and 21) which is formed in the frame 306 already mentioned. These contacts are controlled by suitable cam lugs 302b (Fig. 21) formed in the stops 302. There are five different stops 302 so provided with cam lugs 302b which are located different distances from the ends of stop portions 302a. The stop having its lug 302b farthest from the stop portion 302a will be called the No. 1 stop, the one foremost in Fig. 24 the No. 2 stop, and so on, from left to right. The first or left-hand vertical row of contacts (Fig. 21) comprises the contacts PEC, ATC, and SCC while the right-hand row comprises contacts ISC and IRC, reading from the bottom up in each case.

These contacts are operated by five pins 386 of insulating material which are secured to certain of the contact members and guided by vertical holes in a flange formed in a comb 306b integral with frame 306. Each pin bears on top of the right hand end (Fig. 20) of a lever 387 pivoted on a long stud 306c carried by a second comb 306d also integral with frame 306. Each lever 387 is guided in the slots formed in combs 306b, 306d, which slots are open at the bottom. The upper ends of the slots limit the movement of the levers 387 to the small amount necessary to operate the various contacts. The levers 387 have cam projections 387a adapted to be engaged by the respective cam lugs 302b of the stops 302 during movement of the carriage 174 which movement causes the levers to be pushed upwardly to operate the respective contacts.

The No. 1 stop 302 causes the extreme left hand pin to be pushed upwardly. This pin is secured to the end of the contact member common to contacts ATC and PEC so that contacts ATC close when this pin is pushed upwardly. The second pin from the left is secured to the lowest contact member in the first row and has the effect of closing contacts PEC when pushed up by the action of the No. 2 stop. The third pin on the right is secured to the second contact member from the top in the first row and, when pushed upwardly by the action of the No. 3 stop, causes contacts SCC to close. The fourth and fifth pins from the right are secured to the lowest and uppermost members of the second row, respectively, so that contacts ISC close and IRC open when their respective pins 386 are pushed upwardly in response to coaction of the Nos. 4 and 5 stops with their levers 387.

The five positions of the cam lugs 302b are indicated in Fig. 21 by the small numerals 1 to 5 above the slots in comb 306b. Figs. 20 and 21 show the normal position of the contacts. A cover 388 secured to frame 56 protects the contacts from dirt and from accidental damage and tampering by the operator.

In addition to stops provided with lugs 302b, there may be one or more stops 302 which do not have such lugs. These latter stops will be termed the No. 6 stops and merely engage the stop finger 303 during tabulating operations to arrest the carriage when it is being tabulated either automatically, under control of a stop with lug 302b in the first position, which causes contacts ATC to close, or manually under control of the tabulating key 232. If desired, any one of the stops provided with a lug 302b may be used for stopping tabulating movement by reversing its position on the rack so that its lug 302b projects below instead of above the rack 300. By means of these various stops 302, the machine may be completely automatically controlled in various ways so as to operate continuously without the intervention of the operator other than to insert or remove the punched cards from the hoppers when necessary. The manner in which these different stops automatically control the various operations with which they are concerned will be brought out more fully hereinafter in connection with the wiring diagram.

When the carriage is moving from the next-to-the-last column position to the last column position, certain contacts called the last column contacts are operated. These contacts are best shown in Fig. 19 and are designated LCC1, LCC2, LCC3 in the drawings. These contacts are mounted on the left-hand side of the frame 55 (see Figs. 2 and 4 also) with the longer member, which is common to all three sets of contact points, projecting into the path of a stud 389 mounted on the carriage 174. The stud 389 is adjusted so that contacts LCC2 are opened and LCC1, LCC3 closed as the carriage moves from the next-to-the-last column position.

The group of contacts LCC1, LCC2, LCC3, besides having certain interlock functions, also initiate an eject cycle automatically when the carriage reaches the last column position in which the printed card is to be ejected and an unprinted punched card is to be substituted therefor.

Associated with the tabulating solenoid TS is a pair of contacts TSC termed the tabulating solenoid contacts. These contacts are mounted on frame 60 (Figs. 5, 9, 14, and 28) and are operated by a strip of insulating material 313b to open contacts TSC whenever the tabulating solenoid TS is energized to draw link 313 downwardly.

XVIII. Card sensing mechanism

The holes in the card are sensed by means of twelve card sensing brushes designated B0 to B9, B11, and B12, respectively, to correspond to the index point positions which they sense. Thus brush B0 senses the "0" position, brush B1 the "1" position, and so on. The brushes B0 to B9, B11, and B12 are disposed in a vertical row behind the card guides with their free ends positioned to be capable of resting upon any given column of a card fed by carriage 174 when the latter is in position to print at the top of the given column. As the carriage moves from right to left the card brushes will sweep across the card from left to right, relatively speaking, and the machine will be controlled in a fashion to cause characters to be printed at the top of each column in accordance with the positions of the hole or holes in such column. Under certain circumstances, printing under control of the holes in the card may be wholly or partly suppressed as will be more fully described in following sections of the description. The present section will deal with the mechanical construction of the card sensing mechanism while the electrical control exercised thereby will be described in the following sections.

The sensing mechanism is shown in Figs. 5, 7, 8, 23, and 24. A plate 390 is secured to the rear face of frame 60a and extends upwardly to a point level with the top surface of lugs 242a of the type bar guide 242 (Figs. 7 and 23) and is located wholly to the right of said guide. Secured to the rear face of the plate 390 is a bracket 391 having two arms supporting a shaft 392. A bail 393 is pivotally mounted on shaft 392 by means of two hubs 393a secured to the arms of the bail. Secured to bail 393 is a bar of insulating material 394 having thirteen shallow transverse slots in which lie the shanks of the brushes B0 to B12 and a thirteenth brush CB, the latter being located below the bottom edge of a card in the guides. Brushes CB and B0 to B12 are secured in the slots by means of eye bolts 395. Secured to the front face of plate 390 is a brush guide comb 396 made of insulating material and having thirteen slots 396a (see Fig. 24) for guiding the free ends of brushes CB and B0 to B12 to prevent them from being bent vertically sufficiently to touch each other.

The bail 393 has an arm 393b provided with a cam slot 393c (Fig. 23) which embraces a roller 397 carried by an arm 398 (Fig. 7) secured to shaft 181. Whenever shaft 181 is rocked clockwise during an eject cycle to move the fingers 175 rearwardly as described hereinbefore, the arm 198 moves forwardly, and by the cooperation of roller 197 with cam slot 393c, causes arm 393b and hence bail 393 to be rocked clockwise in Fig. 23. This causes the brushes CB and B0 to B12, inclusive, to be lifted clear of the card in the guides.

The circuits of the machine are connected to brushes CB and B0 to B9, B11 and B12 by means of thirteen terminal blades 399 (Figs. 7, 23, and 24) pressed into transverse slots formed in a bar 400 of insulating material secured to the rear face of plate 390. A clamping strip 401 prevents the blades 399 from being displaced from the slots, common screws being used to secure both the bar 400 and strip 401 to the plate 390. Each blade 399 tapers toward its left hand end (Fig. 23) and presses lightly against the shank of one of the brushes CB and B0 to B12 which shanks extend beyond bar 394 for this purpose. The blades 399 are wide enough at the left hand end to remain in engagement with the shanks of their respective brushes when said brushes are lifted away from the card as described. The claw-like terminal lugs formed in the right hand ends of blades 399 provide a means for securing the circuit wires to said blades.

Cooperating with the free ends of brushes CB and B0 to B9, B11, and B12 is a metallic contact roll CR which is pivotally mounted at its ends on two brackets 402, 403 (Fig. 7) made of insulating material. The bracket 402 is mounted in the recess 60d while bracket 403 is mounted on the lugs 242b supporting the ribbon guide 244. Each bracket has a metal pivot pin 404 on which the contact roll CR rotates freely. The contact roll CR extends below the edge of a card in the card guides so as to be engaged by the common brush CB notwithstanding the presence of the card.

As it occasionally happens that a card may jam in the card guides, or fail to become properly located by the card feeding fingers, means is provided to manually move the brushes out of engagement with the card to permit its removal. This manual means is coupled with a switch to stop motor DM to prevent accidental depression of a key, such as the eject key, from resulting in damage to the machine. Obviously the machine might be damaged if, while the operator was removing a jammed card the eject keys were depressed, as the carriage might return and be caught by the jammed card with the possibility of breaking the carriage return tape or, if no actual breakage occurred, the card feeding mechanism would feed a new card which, due to the small clearance in the card guides, would jam against the card the operator is attempting to remove.

A lever 405 is secured to the right hand end of shaft 181 (Figs. 1, 3, 6, 15, 16, and 33) and extends upwardly behind one arm of a hand lever 406 best shown in Fig. 3 pivoted on a stud 407 carried by a plate 408 secured to frame 54. The lever 406 has a hole loosely engaged by the lever 409 of a small toggle switch 410 (see Fig. 4) of conventional form secured to the left hand face of plate 408 above the edge of frame 54. A spring 411 connected to pins on hand lever 400 and plate 408, normally holds the lever 406 in the position shown in Fig. 3 with spring 411 above the center of stud 407, thereby holding the lever of the toggle switch in closed position. When the lever 406 is depressed it engages and rocks arm 405 and shaft 181 in a clockwise direction (Fig. 3) and at the same time operates the lever of switch 410 to open the motor circuit. The movement of shaft 181 not only results in the lower ends of card fingers 175, 176 being moved rearwardly as described above, but also causes the brushes CB and B0 to B9, B11, and B12 to move away from contact roll CR.

The spring 411 swings below stud 407 when the lever 406 is depressed and holds the lever in depressed position leaving the operator's hands free to remove a damaged or improperly located card. Spring 411 is considerably superior in tension than the spring 185 (Fig. 4) so as to be capable of holding the sensing brushes and fingers 175, 176 in the position to which they are moved by lever 406.

XIX. *Key selecting mechanism*

The brushes B0 to B9, B11, and B12 control the keys 230, 231 through key selecting solenoids designated KSS in Figs. 1, 3 to 5, 7, 35a, and 35b. The electrical connections and operation of solenoids will be explained more fully hereinafter in connection with the wiring diagram.

As shown in Figs. 1, and 3 to 5, inclusive, the solenoids KSS are adjustably secured to the top of a plate 500 and project upwardly beneath the key levers of the numeral and letter keys 230, 231. There is a solenoid KSS for each numeral and letter key. Plate 500 is secured to forwardly and downwardly extending parts of frames 54, 55. In order to provide room for mounting plate 500 and solenoids KSS beneath the keys, the base 50 is formed with a shelf portion 501 (Figs. 1 and 5). There are four rows of solenoids KSS which are arranged according to the same general plan as the keys so that there is a solenoid KSS directly beneath each key 230, 231. Solenoids KSS are of the iron clad type in which the coils are completely enclosed by a shell which forms parts of the magnetic circuit and secured to the upper end of each shell is a slotted fulcrum post 502 in the slot of which is pivoted one end of a short lever 503. Adjacent fulcrum posts 502 the levers 503 are pivoted in the slotted ends of the plungers 504 of the solenoids KSS. The levers 503 of the two rear rows project forwardly while the reverse is the case with the two forward rows. The free ends of the levers 503 are pivotally connected to the corresponding key levers 230a, 231a by means of links 505 arranged in two rows.

Obviously the energization of any solenoid KSS will cause its associated key lever to be depressed and the machine will operate to print on the card in exactly the same manner as when the key lever is manually depressed. The card sensing brushes B0 to B12 control the selection of the solenoids KSS through certain brush relays R0 to R9, R11, and R12 of which only six are shown in Figs. 35a and 35b. The operation of these relays under control of the card sensing brushes will be explained in a following section. The coils of the brush relays are connected directly to the card sensing brushes through the wires of a cable C. The keys which the relays KSS control are indicated by the letters and numerals within the magnet symbols identified by the letters KSS in Figs. 35a and 35b. For example, the top four solenoids in Fig. 35a operate the I, R, Z, and 9 keys respectively.

In order to facilitate assembly, repair or replacement, adjustment, and testing of the solenoids KSS, there is provided a terminal board 520 mounted on two forwardly projecting brackets 521 secured to plate 500 (Figs. 1, 3 and 5). This terminal board consists of a bar of insulating material having at least twice as many transverse slots cut in its top surface as there are solenoids KSS. These slots are intersected by vertical holes which receive clamping screws or eye bolts 522 (Fig. 5), the upper ends of which have rectangular openings adjacent the slots. Into each of these openings in screws 522 projects one arm of an L-shaped terminal lug 523 which arm also is pressed in the corresponding slot in bar 520 and thereby the screws and lugs are prevented from turning about the longitudinal axis of the screws. The lower ends of the clamping screws are threaded into the ends of slotted clamping sleeves or thimbles 524 received in the lower ends of the vertical holes in bar 520. By turning thimbles 524 with a screw driver, the screws 522 are drawn downwardly thus securely clamping the terminal lugs 523 in the slots in bar 520. The two ends of the winding of each solenoid KSS are connected to two separate lugs 523. In order to secure compactness and at the same time prevent danger of electrical contact between the different lugs 523, the vertical holes in bar 520 are staggered and arranged in four parallel rows. The wires 525 which connect the solenoids KSS to the various relays and circuits of the machine are provided with plugs 526 which are forced into the holes in the slotted ends of thimbles 524. Said plugs fit the bores of thimbles tightly enough to prevent the plugs from loosening readily but they may be easily withdrawn by means of pliers or a similar tool.

XX. Inking ribbon feed mechanism

The inking ribbon feeding mechanism forms no part of the present invention and only a few parts have been shown in Figs. 2 and 5, mainly the shaft 600 from which the feeding movement is derived and the short vertical shafts 601 which connect shaft 600 to the ribbon spools 246. This section will deal only with the means for rotating said shafts. The mechanism connected to shaft 600 by means of which the feed motion imparted to spools 246 by shafts 601 is automatically reversed may take any well known form and will not be described herein. Shaft 600 always rotates in a counterclockwise direction (Figs. 3, 5, and 16) and derives its movement from shaft 279. The latter extends to the right and terminates just flush with the left hand face of frame 54 and on the right hand side of said frame (Figs. 3 and 16) an arm 602 is secured to shaft 279 by means of a long hub extending through a hole in frame 54. Pivoted to arm 602 is a link 603 extending forwardly beneath a ratchet wheel 604 secured to the right hand end of shaft 600. The free end of link 603 has a bent-over beveled lug 603a adapted to engage the teeth of the ratchet 604. A spring 605, attached to link 603 and frame 54, holds the lug 603a against ratchet 604. Obviously, the link 603 will be vibrated to the left and back (Fig. 16) each time shaft 279 oscillates during a printing operation and will cause the ratchet wheel 604 and shaft 600 to rotate an increment. This movement is communicated to shafts 601 and ribbon spools 246 through the ribbon reversing mechanism. A pawl 606 carried by frame 54 prevents reverse movement of ratchet 604.

XXI. Operation with manual control

It will be assumed that the card carriage 174 is in its extreme right hand or column 1 position and that no card is between the arms 175, 176. In order to get a blank card in position to be punched, it is necessary to initiate an eject cycle by depressing eject key 233. With the automatic eject switch AES and eject stop switch ESS in full line positions (Fig. 35b) the following operations take place when the eject key is depressed:

Eject key contacts EKC close (Figs. 14 and 35b) and the eject key is latched down by shoulder 370a. A circuit is then established as follows: Line wire W1, contacts CS4, the coils of relays R18, R17, lower coil of relay R16, and eject key contacts EKC, to line wire W2. Relay R18 opens its contacts A and closes its contacts B. The eject key solenoid is also energized in parallel with relays R16, R17, R18 through contacts CS4 whereby solenoid EKS holds the eject key down thereby keeping contacts EKC closed supplementing for a short period latching shoulder 370a. Relay R17 closes its contacts A and opens its contacts C to transfer the tabulating solenoid TS from wire W5 to the line wire W1, and closes its contacts B. Relay R16 closes its contacts B to establish a holding circuit for relays R16, R17, R18, and closes its contacts A thereby completing a circuit through tabulating solenoid TS extending from line wire W1, contacts A of relay R17, tabulating solenoid TS, contacts A of relay R16, and eject contacts EKC and contacts A of relay R16 in parallel, to line wire W2. Closure of contacts EKC and contacts B of relay R16 also energizes relay R15 through switch AES. Relay R15 opens its contacts A and disconnects wire W3 from line wire W1 thereby ensuring that key selecting solenoids will remain deenergized. The circuit for relay R15 extends from line wire W1 the coil of relay R15, switch AES, and contacts EKC, to line wire W2. Contacts B of relay R15 establish a holding circuit for said relay through cam contacts CS3 which takes effect when shaft 100 (Fig. 10a) starts to turn (see Fig. 34 also).

The energization of the tabulating solenoid TS (see Fig. 14) causes the rack 194 to become disengaged from pinion 198 but the stop finger 303 will be prevented from moving into the path of a stop portion 302a due to the action of lever 371 connected to the eject key as described in Section XIII.

As a result, the carriage will move completely to the left until stopped in the last column position by the stop 367a (Fig. 6) and the last column contacts LCC1, LCC3 will be closed and LCC2 opened, respectively. The opening of contacts LCC2 disconnects the escapement magnet EM from line wire W2, while closure of contacts LCC1 completes the initiation of an eject cycle by a circuit established as follows: Line wire W1, contacts CS4, contacts B of relay B18, eject clutch solenoid ECS, eject stop switch ESS, and contacts LCC1, to line wire W2. The energization of the solenoid ECS causes shaft 100 (Figs. 10a and 11) to be driven for one revolution by shaft 64 as described in Section V.

During the first part of the eject cycle the arm 175 (see Fig. 34) and the card flippers 94 are moved rearwardly. The feed rollers 158, 159 are also engaged about this time. Then the pin 353 releases arm 351 (Fig. 11) allowing shaft 350 to rock clockwise (Fig. 16) and cause the carriage return mechanism to start returning the card carriage 174 as described in Section XV. Near the middle of the cycle (Fig. 34), while the carriage is returning, cam 137 operates the card picker (Figs. 1 and 2) to push the first blank card toward feed rollers 143, 144 which then grip the card and commence feeding it into the card guides (Fig. 6).

After about 240° of rotation of shaft 100 (Fig. 34), the carriage reaches its column 1 position. By this time cam 184 has moved the arm 175 into the position where the finger 186 on arm 175 is in the path of the left edge of the first blank card. Between 250° and 270° the card strikes finger 186 on arm 175, the latter moving to its foremost position. Subsequently finger 189 springs forwardly to engage the right hand vertical edge of the card as it passes the end of finger 186. The cams are so timed that the card strikes finger 186 on arm 175 at or very shortly after the 250° point in the cycle. The carriage return mechanism is disconnected by stop screw 366 at about the 240° point. Shaft

350 is restored to normal position by pin 353 between the 300° and 360° points. During this portion of the cycle the eject key is released by the action of latch 371 (Fig. 14), also the feed rollers 158, 159 are disengaged by the action of pin 171.

Contacts LCC1 open when the carriage starts to return at the 70° point in the eject cycle. Cam contacts CS4 open early in the eject cycle and break the circuit through relays R16 to R18 and cause solenoid ECS to become deenergized, but cam contacts CS3 keep relay R15 energized until close to the end of the cycle. The tabulating solenoid TS is deenergized when the contacts B of relay R17 open early in the cycle under the influence of contacts CS4.

When the eject cycle comes to an end the card carriage will occupy its column 1 position with an unpunched card between the arm 175 which will occupy its foremost position, and finger 189 which is now in position to push the card to the left when the carriage moves. The operator can now operate the numerical and letter keys to print on the card if desired. The manner in which the printing and escapement mechanisms operate has been described in detail in Sections X and XII.

Depression of the space bar 229 (Fig. 26) during manual printing operations causes space bar contacts SBC to close establishing a circuit as follows: Line wire W1 (Fig. 35b), contacts A of relay R15, space bar contacts SBC, escapement magnet EM, and contacts LCC2, to line wire W2. Energization of magnet EM (Fig. 9) operates the escapement mechanism as described in section X. Magnet EM is energized each time a printing operation takes place by a similar circuit through contacts PC3 and contacts A of relay R18.

It will be assumed that when the carriage reaches a predetermined column position, say column 8, it is desired to tabulate the carriage to another column, say column 40. A No. 6 stop will be placed on bar 300 in the column 39 position before commencing operation of the machine. After column 7 has been printed the carriage will space to column 8 by the normal operation of the escapement mechanism and the operator will depress tabulating key 232 closing contacts TKC1, TKC2 (Fig. 12). The following circuits will be established: Line wire W1 (Fig. 35b), contacts A of relay R15, wire W3, tabulating key solenoid TKS, also contacts C of relay R17 and tabulating solenoid TS; contacts TKC2, contacts A of relay R19, and contacts LCC2, to line wire W2. Solenoid TKS holds key 232 in depressed position as explained in Section XIII so that contacts TKC1, TKC2 remain closed. Solenoid TS causes the escapement rack 194 to become disengaged from pinion 198 and the card carriage 174 will be drawn to the left by the spring motor 190 and tape 191 (Fig. 9). Also stop finger 303 (Fig. 14) will be raised into the path of the stop portion 302a of the No. 6 stop 302 in the 39th column position of rack 300.

Eventually the finger 303 will be struck by the stop portion 302a and will be forced to the left (Fig. 13) closing contacts SC and TEC. This action takes place when the carriage is between the 38th and 39th column positions. Contacts SC energize relay R19 by a circuit through contacts A of relays R15 and R18 causing contacts A of relay R19 to open and thereby deenergize solenoids TS and TKS. Contacts B of relay R19 close and establish a momentary holding circuit for relay R19 through contacts TKC1. The deenergization of tabulating solenoid TS permits springs 317, 318, 322 (Fig. 14) to restore frame 315, stop finger 303, and solenoid plunger 311 to normal position, thereby releasing finger 303 from the No. 6 stop in column 39.

Contacts TEC energize escapement magnet EM by establishing the following circuit: Line wire W1 (Fig. 35b), contacts A of relay R15, wire W3, contacts A of relay R18, tabulating escapement contacts TEC, magnet EM, and contacts LCC2, to line wire W2. The escapement magnet EM operates the escapement mechanism, opening contacts EC1, EC2 while the card carriage is moving from the 38th to the 39th column position.

Deenergization of tabulating key solenoid TKS permits the tabulating key to return to normal position, reopening contacts TKC1, TKC2. Relay R19 becomes deenergized when contacts SC reopen due to the stop finger 303 being restored to normal position.

The operation of escapement magnet EM while the carriage is between the 38th and 39th column positions causes the pawl 203 to move to the left (Fig. 9) before the finger 303 is restored to normal position. When the finger 303 is finally disengaged from the No. 6 stop 302, the carriage, instead of moving approximately one-half a column space to the 39th column position, will move one and one-half spaces to the 40th column position.

It has been stated that the stops are not placed in the column position of bar 300 in which printing is to begin but instead, are placed in the last column position of a field to be skipped. This is contrary to the usual practice in the typewriter art and is done because it has been found by practical experience that certain misoperations of the automatic printing mechanism are likely to occur. For instance, when the machine is conditioned for automatic printing preceded by automatic column skipping, the spreading of the brushes B3 to B12 by pressure on the master card may cause a strand or two of the brushes to project through one or more holes in the card while the carriage is in a position half-way between two successive column positions with finger 303 engaging a stop 302. This might cause undesired circuits to be established through the duplicating relays when solenoid TS is subsequently deenergized and contacts TSC reclose. In other words, it is possible that contacts TSC may reclose to establish printing circuits at the end of a field to be skipped before the carriage can move to the first column position of a field to be automatically printed. By stopping the carriage approximately one and one-half column spaces from the position at which duplicating is to commence and causing magnet EM to be energized to space the carriage the remaining distance, the contacts EC2 will be opened and prevent any duplicating circuits from being established until the carriage comes to rest exactly in the first column position of the field to be duplicated.

There is also a second possibility, that, even if the brushes do not spread sufficiently to do any harm, the magnet EM may be automatically energized when the brushes come to rest on the card material between the holes in two successive columns, thereby causing the carriage to stop in the second column of the field to be duplicated instead of the first. As will be explained more fully hereinafter, it is desirable to automatically space the carriage one space for each unpunched column in a field containing holes designating alphabetical data to be automatically printed. For this purpose a switch SS (Fig. 35b) is closed and its effect is to place magnet EM in series with contacts EC1, EC2, TSC. It will be seen that if TSC reclosed before the carriage started to move the half space that in ordinary tabulating mechanisms would be necessary to carry it to the first column position of a field to be automatically printed, magnet EM might be automatically energized to operate the escapement mechanism permitting the carriage to move one column space further than desired. This action is prevented by causing the last step of movement of the carriage during a tabulating operation to be effected by means of the escapement mechanism instead of by a direct tabulating movement in which a stop like 302 arrests the carriage in its ultimate position. As many No. 6 stops 302 may be placed on the bar 300 as desired.

When the printing operations on the card are completed it will be necessary to eject the completed card by feeding it into the hopper 77 and replace the printed card with another blank card. This may be done in several ways when the machine is operating under manual control.

If the carriage is left in a position other than the last column position when printing operations are completed, the eject key 233 may be depressed. This causes the machine to operate in exactly the same way as described in the beginning of this section. During the eject cycle the feed rollers 158, 159 will engage at about the 35° point in the cycle and feed the printed card into the hopper 77. As the card enters the hopper, spring finger 172 will warp the card forwardly causing the right hand upper corner of the card to snap forward when it clears the edge of plate 80 (Figs. 1 and 2) and prevent rebound of the card. The card flippers 94 then move forward to the position of Fig. 2 from 210° to 235° in the cycle (Fig. 34) forcing the card in front of shoulder or rib 99 (Fig. 2).

If the last column of the card is to be printed, the eject cycle will be initiated automatically provided switches ESS and AES are in the positions of Fig. 35b. Contacts LCC1, LCC3 close and LCC2 open when the carriage moves from the next-to-the last column to the last column. When the appropriate key is then operated to print in the last column, the machine will operate in the usual way so far as printing is concerned but the escapement mechanism will not operate since contacts LCC2 are now open and prevent energization of magnet EM.

During this last column printing operation, contacts PC1 (Fig. 8) close as described in Section XII and complete two circuits. One circuit extends from line wire W1, through the coil of relay R15, and contacts PC1, LCC1 to line wire W2. The other extends from line wire W1, through contacts CS4, eject key solenoid EKS, switch AES, and contacts PC1, LCC1, to line wire W2. Contacts B of relay R15 close and establish a holding circuit for relay R15 through contacts CS3. This causes the eject key 233 to be drawn downwardly closing contacts EKC. An eject cycle then takes place exactly as if key 233 had been depressed manually.

When eject stop switch ESS is open the closure of contacts LCC1 will have the same general effect as described above but clutch ECS will not be energized when contacts B of relay R18 close and the eject cycle will not take place. Instead the card carriage will remain stationary in the last column position.

If the next-to-the-last column is to be printed, but not the last column, the space bar 229 may be used to initiate an eject cycle. Contacts LCC3 close when the carriage moves to the last column position. Depression of the space bar closes contacts SBC thereby energizing relay R16 by a circuit from line wire W1, contacts A of relay R15, contacts SBC, upper coil of relay R16, and contacts LCC3, to line wire W2. Contacts B of relay R16 close and have the same effect as the closure of the eject key contacts EKC. This feature is quite important, as in usual touch systems of operating typewriters, the operator's thumbs are always in position to depress the space bar, whereas to operate the eject key requires of the operator a certain amount of extra effort and frequently an involuntary glance at the keyboard.

XXII. *Automatic eject in a predetermined column*

The machine may be caused to eject the cards automatically when the last printing operation is effected with the carriage in a position other than the last column position. This is accomplished by placing a No. 2 stop 302 on bar 300 in the column after the last one printed. Assume that the card printing operations are to end in column 35, for example. A No. 2 stop 302 is placed on bar 300 in the column 36 position and the automatic eject switch AES is placed in the dotted line position (Fig. 35b).

When the 35th column is printed, the card carriage will escape to the 36th column and cam lug 302b on the No. 2 stop 302 will strike the cam projection 387a of the lever 387 associated with contacts PEC (Figs. 23 and 24) causing these contacts to close. A circuit is then established through the solenoid EKS as follows: Line wire W1 (Fig. 35b), contacts CS4, solenoid EKS, switch AES, contacts PEC, and contacts CS1, to line wire W2. The eject key 233 is drawn down by solenoid EKS and the effect is the same as when the key is depressed manually. The sequence of operations will be the same as described in Section XXI except that relay R15 will be energized by closure of contacts B of relay R17 instead of by contacts EKC.

XXIII. *Automatic tabulating*

Entire fields comprising a plurality of columns may be skipped under control of a No. 1 stop placed in the first column position of a field to be skipped and a No. 6 stop in the last column position of a field to be skipped. Assume columns 40 to 50 are to be skipped. A No. 1 stop is placed in the column 40 position of rack 300 while a No. 6 stop is placed in the column 50 position.

When the carriage moves from the column 39 position to the column 40 position, contacts ATC will be closed by the action of the lug 302b on the lever 387 associated with contacts ATC (Fig. 24). This has the same effect, broadly speaking, as a depression of key 232 and establishes circuits as follows: Line wire W1 (Fig. 35b), contacts A of relay R15, wire W3, solenoid TKS; also contacts C of relay R17 and solenoid TS; contacts ATC and CS1, to line wire W2. Energization of solenoid TS causes the carriage to move as described in Section XXI until the No. 6 stop in column 50 is effective to arrest the carriage, close contacts SC and TEC, and cause an operation of the escapement magnet EM.

When a single column is to be spaced, a No. 3 stop is placed in the desired column, switch SS is opened, and the single spacing switch SCS is placed in solid line position. Assuming column 10 is to be skipped, the carriage in moving from the column 9 position to the column 10 position will cause contacts SCC to close by the action of the cam lug 302b of the No. 3 stop on the associated lever 387. Also escapement contacts EC1 reclose as the carriage reaches the column 10 position completing a circuit as follows: Line wire W1 (Fig. 35b), contacts A of relay R15, wire W3, contacts TSC, EC2, SCC (Fig. 35a), wire W15, switch SCS, wire W5 (Fig. 35b), magnet EM, and contacts LCC2, to line wire W2. Magnet EM operates the escapement mechanism as described in Section X causing the carriage to move to the column 11 position.

Each time the tabulating solenoid TS operates contacts TSC open to prevent operation of the solenoids KSS while the carriage is moving through the column positions to be skipped. This will be made clearer in the following section.

XXIV. Automatic printing

In order to explain the operation of automatic printing under control of the holes in the cards placed in the hopper 76, a very simple case where it is desired to interpret the holes in a single field will be explained. It will be assumed, therefore, that the cards are punched to represent alphabetical or numerical data in columns 11 to 45 and are not punched in the remaining columns. In order to skip columns 1 to 10 a No. 1 stop 302 is placed in the column 1 position of bar 300 and a No. 5 stop is placed in column 10 of the first field to be skipped. A No. 4 stop is placed in column 46 and, with the switches set as shown in Figs. 35a and 35b, the punched cards are placed in the hopper 76. The eject key 233 is depressed to cause an eject cycle to take place as described in Section XXI. During this eject cycle, the first punched card in hopper 76 will be brought within the control of the card carriage which will be in the column "1" position at the end of the eject cycle. The No. 1 stop in the column "1" position will cause the contacts ATC to close as the carriage is returned to the column 1 position during the eject cycle. However, due to the fact that relay R15 is kept energized during an eject cycle, the tabulating solenoid TS and tabulating key solenoid TKS will not be energized while the carriage is being returned. When cam contacts CS3 break near the end of the eject cycle, relay R15 will become deenergized thereby closing its contacts A. This will complete circuits for the tabulating key solenoid TKS and the tabulating solenoid TS through the contacts ATC and CS1. As a result, the carriage will be tabulated automatically to column 10 as soon as the eject cycles come to an end. During this period the contacts TSC are open and prevent circuits from being established through the brush relays R0 to R9, R11, R12. The No. 5 stop in column 10 will operate the contacts IRC causing them to open and thereby will insure that relay R14 is deenergized when the carriage moves to the column 11 position if the relay is not already deenergized. The No. 5 stop functions not only to stop the carriage, but also to interrupt the holding circuit for relay R14. Contacts EC2 also open during the escapement operation accompanying tabulating operation and prevent energization of any of the relays R0 to R9, R11, and R12 during the period when the carriage is moving from the column 10 to the column 11 position and the contacts TSC are reclosing. By the time the carriage reaches the column "11" position, contacts EC2 will reclose thereby permitting circuits to be established through the hole or holes in column 11 to the brush relays R0 to R9, and R11, R12.

It will be assumed that there is a "9" hole in column 11. When the contacts EC2 close, this permits a circuit to be established as follows: line wire W1, contacts A of relay R15, wire W3, contacts A of relay R18, contacts TSC, EC2, PC2, contacts B of relay R14, wire W6, contacts KIC, brush CB, contact roller CR, brush B9, cable C, relay R9, relays R10 and R13, wire W8, relay R21, wire W14, and the contacts of relay R22, to line wire W2. Relay R9 closes its contacts A to establish a holding circuit to wire W6 through wire W10, thereby shunting the brush B9. All of the contacts B of relay R9 also close. Since relays R0, R11, and R12 have not been energized due to lack of a hole in the 0, 11, or 12 positions of the card, a circuit can only be established from wire W6 through the "9" solenoid KSS, wire W9, contacts C of relays R0, R11, and R12 to line wire W2. The circuits for the solenoids KSS associated with the keys controlling the printing of the letters I, R, and Z will be kept open at the B contacts of relays R0, R11, and R12, thereby preventing energization of these solenoids. As a result, the "9" solenoid KSS will draw down the "9" key and cause the numeral 9 to be printed at the top of column 11. The escapement magnet EM will be energized, as described in section XXI, when contacts PC3 close, and the carriage will escape to column 12 automatically.

Had there been a pair of holes in column 11 designating a letter instead of a numeral, let us say, the combination of holes "0" and "9" which designate the letter Z (Fig. 22), the relay R0 would have been energized along with the relay R9 by a similar circuit through brush B0. This has the effect of establishing a circuit through the "Z" solenoid KSS instead of the "9" solenoid because the relay R0, by closing its contacts B would make the wire W0 "live," instead of the wire W9, whereby the "0" solenoid KSS would be energized instead of the "9" solenoid and the letter "Z" would be printed instead of the numeral "9".

In a similar manner the perforations in columns 12 to 45 control the relays R0 to R9, R11, and R12 to cause the data recorded by means of holes or combinations of holes to be printed along the top edge of the card. When the carriage escapes to column 46 the No. 4 stop will cause contacts ISC to close thereby energizing relay R14 by a circuit as follows: wire W1, contacts A of relay R15, contacts ISC, relay R14, and the contacts of relays R24, R22, to line wire W2. Relay R14 closes its contacts A and thereby establishes a holding circuit for itself through the contacts IRC. Contacts B of this relay open and prevent circuits through relays R0 to R9, R11, and R12. The card may now be ejected by depressing the eject key 233, whereby the next punched card will be brought within the control of the card carriage and the first punched card will be fed into the hopper 77, or further data may be printed manually.

If it were desired to print manually in columns 1 to 10, for instance, instead of skipping these columns, a No. 4 stop would be placed in the column 1 position. This would close contacts ISC and cause the relay R14 to become energized and its holding circuit established by contacts IRC when the carriage returns to the column 1 position during an eject cycle. The carriage will then remain stationary after the eject cycle and the operator may operate the keys to cause data to be printed in columns 1 to 10. The No. 4 stop has the effect, by causing relay R14 to become energized, of preventing automatic printing since the contacts B of the relay are in the common circuit for the relays R0 to R9, R11, and R12 to line wire W1. When a punched card is to be ejected immediately after an automatic printing operation a No. 2 stop may be used instead of a No. 4 stop. This would cause the carriage to be automatically tabulated to the last column position and an eject cycle to be initiated as described in Section XXII.

Of course a very simple case has been used as an illustration where only one field was to be automatically printed. In actual practice, it will frequently happen that a plurality of fields with intervening blank fields or blank columns may have to be printed automatically under control of the holes in such columns. In order to cause automatic printing under these circumstances, it is merely necessary to place a No. 4 stop in the first column position of each field to be printed and a No. 5 stop in the last column position of each field. However, when automatic printing is preceded by a tabulating operation, it is unnecessary to place a No. 4 stop in the first column of a field to be skipped but a No. 1 stop may be used instead, since the tabulating solenoid, by opening contacts TSC, prevents automatic printing operations in the event there are holes in the columns which are to be skipped.

When an automatic eject operation is to follow an automatic printing operation, it is likewise unnecessary to use a number "4" stop because the contacts TSC will again function to interrupt the automatic printing circuits. When automatic printing is to be followed by manual printing the number "4" stop should preferably be used although it will not ordinarily be required because in columns where manual printing is to be effected there are not likely to be any holes. However, there may be cases where it is desired to print at the top of the card data other than that recorded by means of holes in columns as, for instance, where special holes for control purposes are provided in the card. An example of this is where holes designating balance cards and other special cards are placed in predetermined columns and it would be undesirable to print at the top of the column the value of the special holes. It is thus possible to type descriptive material at the top of a card notwithstanding the presence of holes in such card. This feature is of advantage where cards are used as vouchers, such as store requisitions, employees piecework slips, and other similar purposes where some of the data is useful for record or filing purposes but does not have to be punched as it is not used as a basis for controlling the machines in which the perforated records will be used. In other words, a field which may be set aside to a group of control holes for special purposes, like class selection, designating debits and credits, and other special purposes may be used to record additional data which does not have to be punched but which it may be found desirable to record on the top edge of the card for convenience in reference. It will be seen, therefore, that it is possible in effect to record two kinds of data in the same columns of a field and to this extent the present invention offers an advantage over prior perforated card interpreters.

The key selecting solenoids KSS associated with the relays R2 to R7, which have been omitted from Fig. 35a for sake of simplicity, are connected to the brushes B2 to B7, and wires W9, W0, W11, and W12, according to the same system as the solenoids associated with relays R1, R8, R9. The right hand leads of solenoids KSS for the numerical keys 2 to 7 are all directly connected to wire W9. The solenoids KSS for the letters S, T, U, V, W, X are connected directly to the wire W0 and are selectively controlled by different contacts B of the relays R2 to R7, respectively. The solenoids KSS for the letters K, L, M, N, O, P, are connected to wire W11 and are also controlled by other contacts B of relays R2 to R7. Likewise to wire W12 are connected the solenoids KSS for the B, C, D, E, F, G keys and these solenoids are controlled by still other contacts B of relays R2 to R8.

This system will be easily understood by a specific example. The C solenoid KSS is connected to a pair of contacts B of relay R3 and to the wire W12 since this letter is represented by the combination of a "3" and a "12" hole (Fig. 26). The relay R3 is connected to wire W10 and relay R10 exactly like relay R9 in Fig. 35a. If the designations R9 and "1," "R," "Z," "9" on the coils of the four solenoids KSS associated with relay R9 are changed to "R3" and "C," "L," "T," "3," respectively, it will be easily seen how the system is followed for the brush relays not shown.

The solenoids KSS for the "0," "11," and "12" keys cannot be energized when a combination of holes is sensed by the card sensing brushes because relay R10 interrupts the connection of wire W13 to wire W10 whenever one of relays R1 to R9 is energized, relay R10 being in series parallel with relays R1 to R9. When "0," "11," and "12" holes occur alone, however, relay R10 is not energized, permitting closure of contacts A of relays R11 or R12 to energize the corresponding solenoids KSS by circuits from wires W10, W13, contacts A of the proper relays, and the solenoids KSS, to the wires W11 or W12. The case where "0" holes occur alone will be discussed hereinafter in Section XXVII, dealing with automatic suppression of zeros to the left of a significant figure.

The type bars associated with the "11" and "12" keys may be provided with any desired characters. Conveniently the type bar associated with the "11" key may print the character "/" while the "12" key may control the printing of the double quotation marks. One or more additional keys may be provided to cause printing of other characters such as the period, comma, or semi-colon. These additional keys are not provided with solenoids KSS since they are purely for convenience in manually typing data that is not perforated in the card.

XXV. *Automatic skipping of unperforated columns*

There are circumstances under which it might be found desirable to automatically skip single columns. It is not possible to use the tabulating mechanism for this purpose as tabulating mechanisms in general are not reliable where only a few columns are to be skipped. There are two conditions under which single column spacing is desired. In one case a predetermined column in the record card may be left unpunched and not used for any purpose. Since this column is always the same, it is possible to effect skipping thereof by means of a stop 302 placed on the stop bar 300, this stop controlling single column space contacts SCC which were described in Section XVII and controlled by a No. 3 stop placed in the appropriate column. When a carriage escapes to a column marked with such a stop, a circuit is closed through the escapement magnet EM as follows: line wire W1, contacts A of R15, contacts A of relay R18, contacts TSC, wire W4, contacts EC2, contacts SCC, wire W15, switch SCS, wire W5, magnet EM and contacts LCC2 to line wire W2. Magnet EM by operating the escapement as described above causes the carriage to be automatically spaced one additional column.

In fields containing alphabetic data such as names and addresses, for example, it is customary to leave unperforated spacing columns between the respective parts of a name and address, in order that when the card is run through the tabulating machine the parts of the name and address will be properly separated in the operation of printing the name and address. Since the lengths of the parts of a name and address and similar data recorded by alphabetic designations will vary, it is impossible to predict exactly where these unpunched columns will occur. For that reason, the skipping of these columns automatically cannot be accomplished by means of a No. 3 stop as described above. The relays R20 and R21 are provided for the purpose of causing the automatic spacing operation.

Relay R20 is a slow acting relay, being much slower in action than the relays R0 to R12 while relay R21 is a high speed relay operating at least as fast as relays R0 to R12. Contacts EC close at the end of each operation of the escapement mechanism and tend to energize relay R20 by circuit as follows: Line wire W1 (Fig. 35b), contacts A of relay 15, wire W3, contacts A of relay R18, contacts TSC, wire W4, contacts EC2, PC2 (Fig. 35a), contacts B of relay R14, wire W6, contacts KIC, wire W7, contacts CS2 (Fig. 35b), relay R20, wire W14, and the contacts of relays R24, R22 (Fig. 35a), to line wire W2. At the same time the brushes B0 to B12 are connected to line wire W1 over part of the circuit just traced.

If there is no hole in the column sensed by the brushes, relay R21 will remain dormant and the contacts of relay R20 will close, energizing magnet EM by a circuit from wire W6, wire W10, switch SS, the contacts of relays R21 and R20, magnet EM, and contacts LCC2, to line wire W2. Magnet EM operates the escapement once, causing contacts EC2 to open and deenergize relay R20 and the carriage will move one column space. When contacts EC2 reclose the same operations take place if the next column is blank. The carriage will be automatically spaced once for each unpunched column.

If there should be a hole in any column when the carriage comes to rest at the end of a previous column spacing or tabulating movement of the carriage, one at least of the relays R0 to R12 will be energized. Since all the relays R0 to R9, R11, and R12 are in series with relay R21, the latter will be energized and will open its contacts before the contacts of relay R20 can close, thereby preventing magnet EM from operating until the printing operation takes place. The contacts PC2 and EC2 both operate whenever a character is printed, the contacts EC2 remaining open until the carriage stops moving. This will deenergize both relays R20, R21 and keep them deenergized until the brushes B0 to B9, B11, and B12 are in registry with the next column of the master card.

XXVI. Card registration control

It may happen that for some reason or other a card fed from the hopper 76 fails to become seated firmly on top of the shoulder 60c whereby the "8" or "9" brushes do not cooperate with the corresponding index-point positions on the card, but instead bear on contact roller CR. Relays R22 and R24 are provided for the purpose of preventing the establishment of circuits through the brush relays R0 to R9, R11 and R12 under these conditions. The coils of relays R22 and R24 are connected through cable C to the brushes B8 and B9, respectively, whereby the relays R22 and R24 are energized whenever a circuit is established through the relays R8 and R9 respectively. During the normal operation of the machine the combination of an "8" hole and a "9" hole will never occur except by error in punching the cards. Consequently, while one or the other of these relays may be energized during normal operation of the machine in automatically printing under control of holes in the card, both of the relays will not be energized together; thus the circuits for the brush relays R0 to R9, R11, R12 may be established over wire W14 through contacts of one or the other of these relays, to the wire W2. If the card should fail to register properly, the contact roller CR will be exposed under both brushes B8 and B9 establishing a circuit through both relays R22 and R24, thereby interrupting the circuits through the brush relays and preventing automatic printing operations. Since continuation of the operation of the machine during automatic printing operation thereof is dependent upon the operation of the escapement magnet EM, which in turn is dependent upon the operation of type bars, it is evident that the energization of relays R22, R24 together has the effect of stopping the operation of the machine. This warns the operator that something is wrong and a glance at the card in process of feed will show the cause of the trouble as this card will either be crumpled in the guides, exposing the contact roller CR under the brushes B8 or B9, or will be torn, or it will have failed to feed properly so that it is not fully seated on the shoulders 60c. In the event no card is fed from the supply hopper 76, as by mis-operation of the feed mechanism or exhaustion of the hopper, relays R22, R24 will both be energized, since both brushes B8, B9 will be contacting the bare contact roller CR, and prevent the machine from operating indefinitely without cards when set for fully automatic operation.

XXVII. Automatic zero suppression

It is necessary in many cases to perforate zeros in the card to the left of the first significant digit, for instance, in the fields devoted to the reception of classification numbers commonly known as group numbers in the art, which are subsequently used to control the machine to cause it to take totals between groups. It is not desirable however that these zeros which are so vital to the operation of the tabulating machines be printed at the top of the card as they would be superfluous and misleading. The present invention has means for automatically suppressing zeros occurring under the above conditions including the relay R13 and certain contacts operated by the brush relay R0. The Nos. 4 and 5 stops are set as described above to cause automatic printing under control of the holes in a field in which the zeros occur along with a number. When the brushes B0 to B9, B11, B12 come to rest on the first column of this field, the brush B0 will sense the first zero hole which of course will occur alone. This establishes a circuit as follows: line wire W1, contacts A of relays R15 and R18, tabulating solenoid contacts TSC, wire W4, contacts EC2 and PC2, contacts B of relay R14, contacts KIC, brush CB, contact roll CR, brush B0, cable C, relay R0, wire W8, relay R21, wire W14, and contacts of relays R22, R24 to line wire W2. The relay R0 closes its contacts A thereby establishing a holding circuit for itself to line wire W10 as described above. The solenoid KSS associated with a zero key is not energized, however, since relay R13 is deenergized. Contacts D of relay R0 are closed and establish a supplemental circuit to the spacing magnet EM as follows: line wire W10, contacts of relay R10, wire W13, contacts D of relay R0, contacts B of relay R13, wire W5, magnet EM and contacts LCC2 to line wire W2.

It will be seen that the zero solenoid KSS is not energized but the magnet EM is energized to cause the carriage to escape to the next column. As long as zeros are sensed the same cycle of operation is repeated until one of the brushes senses a hole other than a zero hole. It will be assumed for convenience that a "1" hole occurs in the third column of a field with zeros in the first two columns. The "1" hole in the third column establishes the normal circuit through the brush B1 to the relay R1, this circuit extending through the relays R10 and R13 in series, thereby energizing relay R13; the numeral "1" is printed; and the carriage escapes to the fourth column in a normal manner. While relay R13 closes contacts C, this has no effect at this time as contacts D of relay R0 are open, this relay not having been energized. The closure of contacts A of relay R13 establishes a holding circuit as follows: line wire W1, contacts A of relay R15, wire W3, contacts IRC, wire W16, contacts A of relay R13, the holding coil for said relay, wire W14, and contacts of relays R22, R24 to line wire W2. This circuit is maintained as long as contacts IRC remain closed. If the "1" hole were followed by a "0" hole the brush B0 would establish a circuit through relay R0 in the normal way thereby closing a circuit through the zero solenoid KSS as follows: from line wire W10, contacts of relay R10, contacts D of relay R0, contacts C of relay R13, the "0" solenoid KSS, contacts B of relay R0, contacts C of relays R11 and R12, to line wire W2. Thus the "0" solenoid is energized and causes a "0" to be printed at the top of the card. Eventually, the last column of the field automatically printed will be sensed and the top of the card printed in accordance with the hole in such column. In passing from the last column of the field to be automatically printed to the next succeeding column, contacts ISC are closed by the action of the No. 4 stop thereby energizing relay R14 as described in Section XXIV to suppress further automatic printing. The opening of contacts IRC breaks the holding circuit for relay R13.

XXVIII. *Automatic "X" suppression*

Holes placed in the "11" position are commonly known in the art as "X" holes and are frequently used for special control purposes in tabulating machines. These "X" holes are very frequently placed in the same columns as holes which record numerical data. Obviously, if the brushes sensed the combination of an "X" hole with some other hole signifying a number, this would be interpreted as one of the alphabetic combinations and, instead of printing the numerical value at the top of the column, which is the result desired, the alphabetic interpretation would be printed. In order to prevent this from happening means is provided to confine the operation of the machine to printing the numeral identified with the hole occurring along with the "X" hole. This means includes the relay R23 (Fig. 35b) which is controlled by the contacts SCC. The "X" holes will always occur in a predetermined column since they control a definite part of the tabulating machine or other machine in which the cards are used. Switch SCS is placed in dotted line position and No. 3 stops are placed in the columnar positions on the bar 300 corresponding to those in which the "X" holes will appear in the cards. When the brush B11, in the course of an automatic printing operation, senses an "11" hole, the contacts SCC will have been previously closed by the No. 3 stop in moving to the column position in which the "X" hole appears. Relay R23 will be energized by a circuit as follows: line wire W1, contacts A of relays R15, R18, contacts TSC, wire W4, contacts EC2, SCC, switch SCS, relay R23 to line wire W2. Relay R23 opens the circuit to the relay R11 whereby a circuit cannot be set up through said relay by the brush B11 when the "X" hole is sensed whereby the operation of the "11" solenoid KSS is prevented. At the same time, one of the other brushes B0 to B9 will sense the hole designating a numeral which occurs in combination with the "11" hole and will establish the normal circuit through one of the relays R0 to R9 as described above, with the result that the numeral will be printed at the top of the column containing the "X" hole. If an "X" or "11" hole appears in combination with a "0" hole, the zero suppression control will become operative to suppress the printing of "0" as well as to suppress the operation of the type bar associated with the "11" hole, with the result that the carriage will be automatically spaced for a column containing the combination of a "0" and "11" hole.

The "X" and "0" suppression controls may be used together without interference with each other. Therefore, if, in a given record field, an "X" hole appears in any one of a group of columns to the left of a column containing a hole designating a significant figure, the "X" suppression control will be effective as well as the "0" suppression control with respect to the column containing the "X" hole while the "0" suppression control will be effective for all of the columns of the field to the left of the one containing a hole designating a significant figure.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, the combination of guiding means for a record containing data designations, a record sensing device for sensing data designations in said record when the record is in position in said guides, mechanism controlled by said sensing device for recording the data represented by said designations, and means controlled by a part of said sensing device for preventing operation of the recording means when the record is displaced laterally of said guide so as to no longer cooperate with said part of the sensing device.

2. In a machine of the class described, the combination with record guiding means, means to feed each record step-by-step through said guiding means, a record sensing device comprising a plurality of elements each for sensing a portion of said record, recording means controlled by the sensing device for recording data represented by designations in said record, and means controlled by a predetermined number of said elements for stopping the operation of the recording means when the record is displaced laterally of its line of feed so as to fail to register with the predetermined elements.

3. In a machine of the class described, the combination of a record feeding carriage, means to support and guide a record while it is being fed by said carriage, means to actuate the record feeding carriage step-by-step to bring successive columns of said record past a predetermined point, record sensing means cooperating with the record while it is being fed to sense columns in said record containing data designations successively moved by said carriage past a predetermined point, typing means controlled by the sensing means for typing the data designated in each column at the top of each column, and means controlled by a part of the sensing means for preventing further operation of the typing means when the record becomes displaced laterally of its line of feed in said support so as to no longer cooperate with said part of the sensing device.

4. In a machine controlled by records having fields comprising a plurality of columns in which numerical values are recorded by means of designations differentially disposed in the index point positions of said columns, means to sense said columns successively from the highest denominational column to the lowest denominational column, recording means, and means rendered ineffective by designations other than zero designations for suppressing the operation of the recording means under control of a zero designation until a designation representing a numerical value is sensed by the sensing means.

5. In a machine of the class described, a record sensing device adapted to sense one column of a card divided into a plurality of columns, said columns being arranged in fields each consisting of a plurality of contiguous columns, certain of which may contain designations representing numerical data and other designations which do not necessarily represent numerical data but have a special significance, means including a carriage to effect relative movement between the record sensing device and the card whereby the columns are sensed successively, a recording device controlled by the sensing device for recording the value represented by a data designation in said card, and means controlled by the movement of the carriage for rendering the recording means un-responsive to the special designation and responsive only to the data designations.

6. In a machine of the class described the combination of a plurality of electrical sensing elements for sensing data designations disposed in the columns of a record; contact means cooperating with said elements, said contact means being insulated from said sensing elements by the presence of a record therebetween and rendered current conducting with a sensing element by the presence of a designation in said record, one or more of said contact means being exposed to said sensing elements when the record becomes displaced longitudinally of the columns of a record; recording mechanism controlled by said sensing means, including a plurality of selector circuits connected to the several sensing elements; and means controlled by a plurality of said elements for preventing operation of the recording means when a record becomes displaced longitudinally of a column to an extent whereby a plurality of the sensing elements become exposed to the contact means.

7. In a machine controlled by records wherein data is recorded by means of designations differentially disposed in the index-point positions of fields comprising a plurality of columns of index-point positions; a record sensing device adapted to sense the index-point positions of a single column, said device including a series of elements registering with the index-point positions; means to cause a relative movement between the record and the sensing device whereby the latter traverses the record fields column-by-column, recording means controlled by the record sensing device to record the characters represented by the designations in each column as said column is sensed, and means controlled by a plurality of those elements of the sensing device which fail to register with the record for preventing operation of the recording means when the card is displaced from registry with said plurality of elements of the sensing device.

8. In a machine controlled by records in which numerical and alphabetical data is designated by single designations and by combinations of a plurality of designations, respectively, which are disposed in the columns of the records; means for sensing said designations column-by-column, recording mechanism controlled by the sensing means and normally operative to record numerical or alphabetical data according to the appearance of a single designation or a combination of designations in a single column, an element movable in step with the sensing of the record column-by-column, and means controlled by the said element for controlling the operation of the recording mechanism, said last named means being operative in a predetermined column to prevent one of a combination of designations from having any effect upon the recording mechanism.

9. A machine of the class described comprising means to successively sense the columns of a record field in which numerical data, such as a code number or serial number, is recorded by means of designations representing the respective digits of such number, the columns to the left of the designation for the highest significant digit being provided with zero designations; recording means controlled by the sensing means to record any of the numerals represented by designations in said columns, including the numeral zero; and means normally operative to prevent the recording means from recording zeros under control of zero designations whereby to prevent recording of zeros to the left of the first significant figure of an amount, said preventing means being controlled by the designations for significant figures and rendered ineffective, when such designations are sensed by the sensing means, whereby to condition the recording means for subsequently recording all zeros as well as the numerals for significant figures.

10. In a machine of the class described, a row of electrical sensing elements corresponding to the index-point positions of one column of a record field comprising a plurality of columns in which data designations are differentially disposed to represent characters; means to cause a relative movement between the record and the row of electrical sensing elements whereby said elements traverse the record field column-by-column, including a carriage having feeding fingers engaging the record and escapement mechanism for causing the carriage to move column-by-column; mechanism for recording the characters represented by the data designations column-by-column as said columns are sensed, including a plurality of character selecting circuits connected to said electrical sensing elements, one of said selecting circuits being normally interrupted; and means controlled by any one of a plurality of other selecting circuits for closing said one circuit.

11. In a machine of the class described the combination of a record sensing device, means to produce a relative movement between the record sensing device and the record to cause the record sensing device to sense designations in the record, said record sensing device including cooperating parts separated by the record and partly exposed to each other when the record becomes accidentally displaced laterally of the direction of relative movement between the record and the sensing device, recording mechanism controlled by the sensing device, and means controlled by the exposed portions of the sensing device when more than a predetermined amount of said device is exposed to prevent operation of the recording mechanism.

12. In a machine controlled by records wherein data is recorded by means of designations representing numerical values disposed in the columns of said records, a sensing device for successively sensing designations in the columns of a record by a relative movement between the records and the sensing device, recording means controlled by the sensing device for successively recording numerical values of the designations in said columns; means to normally prevent the recording mechanism from recording zeros under control of the sensing device, said preventing means being controlled by the sensing device so as to be rendered ineffective when the sensing device senses a designation other than zero in a column of a record; means to maintain the last named means in ineffective position, and means movable in step with the sensing of the record for rendering said maintaining means ineffective after a predetermined relative movement between the record and the sensing device.

13. In a machine of the class described, a device for sensing designations disposed in the columns of a record, means to cause a relative feeding movement between the record and the sensing device whereby the sensing device traverses the record column-by-column to sense the record columns successively, recording mechanism controlled by said sensing device for recording the values of designations in said columns, a device for preventing the recording mechanism from recording zeros under control of zero designations and operable to cause zeros to be recorded by the recording mechanism under control of zero designations, means controlled by designations other than zero designations through the sensing device for operating the preventing device to thereby enable the recording mechanism to record zeros under control of zero designations, means for maintaining the preventing device in operated condition, and an element movable in step with the relative feeding movement between the record and the sensing device for rendering said maintaining means ineffective.

ALBERT W. MILLS.